United States Patent
Shapiro et al.

(10) Patent No.: US 12,420,355 B2
(45) Date of Patent: Sep. 23, 2025

(54) LASER FABRICATION WITH BEAM DETECTION

(71) Applicant: Glowforge Inc., Seattle, WA (US)

(72) Inventors: Daniel Shapiro, Mercer Island, WA (US); Mark Gosselin, Seattle, WA (US); Jared Kofron, Vashon, WA (US); Matthew Sarnoff, Seattle, WA (US); Eva Kloiber, Seattle, WA (US); Nicodemus Empyrean Paradiso, Seattle, WA (US)

(73) Assignee: Glowforge Inc., Seattle, WA (US)

( * ) Notice: Subject to any disclaimer, the term of this patent is extended or adjusted under 35 U.S.C. 154(b) by 252 days.

(21) Appl. No.: 17/903,034

(22) Filed: Sep. 5, 2022

(65) Prior Publication Data

US 2023/0105870 A1   Apr. 6, 2023

Related U.S. Application Data

(63) Continuation-in-part of application No. 17/720,400, filed on Apr. 14, 2022, and a continuation-in-part of
(Continued)

(51) Int. Cl.
*B23K 26/08* (2014.01)
*B23K 26/035* (2014.01)
(Continued)

(52) U.S. Cl.
CPC .......... *B23K 26/042* (2015.10); *B23K 26/035* (2015.10); *B23K 26/0643* (2013.01);
(Continued)

(58) Field of Classification Search
CPC ................ B23K 26/042; B23K 26/035; B23K 26/0643; B23K 26/08; B23K 26/082;
(Continued)

(56) References Cited

U.S. PATENT DOCUMENTS

| | | |
|---|---|---|
| 3,721,811 A | 3/1973 | Taylor et al. |
| 3,967,176 A | 6/1976 | Wagener et al. |

(Continued)

FOREIGN PATENT DOCUMENTS

| | | |
|---|---|---|
| CN | 1364033 A | 8/2002 |
| CN | 101095033 A | 12/2007 |

(Continued)

OTHER PUBLICATIONS

Dazhong Wu et al. "Cloud Manufacturing: Drivers, Current Status, and Future Trends." vol. 2. Systems; Micro and Nano Technologies Sustainable Manufacturing. Jun. 10, 2013. Retrieved on May 10, 2016. 11 pages.
(Continued)

*Primary Examiner* — Charles Cai
(74) *Attorney, Agent, or Firm* — Lee Sullivan Shea & Smith LLP

(57) ABSTRACT

A computer-numerically-controlled (CNC) machine is configured to (i) measure a power of a beam of electromagnetic energy at a location between a source of the electromagnetic energy and a destination in the CNC machine, the beam of electromagnetic energy traveling from the source to the destination being susceptible to one or more interferences, and the one or more interferences being capable of altering the power of the beam of electromagnetic energy by at least diverting, away from an intended path for the beam of electromagnetic energy, at least a portion of the beam of electromagnetic energy, (ii) detect, based at least on the measured power of the beam of electromagnetic energy being less than a threshold value, an interference of the beam of electromagnetic energy, and (iii) in response to detecting the interference of the beam of electromagnetic energy, perform one or more actions.

20 Claims, 34 Drawing Sheets

Related U.S. Application Data application No. 17/699,386, filed on Mar. 21, 2022, now abandoned, and a continuation-in-part of application No. 17/682,942, filed on Feb. 28, 2022, now Pat. No. 11,747,193, which is a continuation of application No. 16/814,820, filed on Mar. 10, 2020, now Pat. No. 11,262,236, said application No. 17/699,386 is a continuation of application No. 16/717,730, filed on Dec. 17, 2019, now Pat. No. 11,281,189, which is a continuation of application No. 15/823,513, filed on Nov. 27, 2017, now Pat. No. 10,551,824, application No. 17/903,034 is a continuation-in-part of application No. 15/823,499, filed on Nov. 27, 2017, now Pat. No. 11,433,477, said application No. 17/720,400 is a continuation-in-part of application No. 15/823,512, filed on Nov. 27, 2017, now Pat. No. 11,305,379.

(60) Provisional application No. 62/833,540, filed on Apr. 12, 2019, provisional application No. 62/426,438, filed on Nov. 25, 2016, provisional application No. 62/426,424, filed on Nov. 25, 2016, provisional application No. 62/426,427, filed on Nov. 25, 2016.

(51) Int. Cl.
| | | |
|---|---|---|
| *B23K 26/042* | (2014.01) | |
| *B23K 26/06* | (2014.01) | |
| *B23K 26/082* | (2014.01) | |
| *B23K 26/38* | (2014.01) | |
| *B23K 37/02* | (2006.01) | |

(52) U.S. Cl.
CPC ............ *B23K 26/08* (2013.01); *B23K 26/082* (2015.10); *B23K 26/0876* (2013.01); *B23K 26/38* (2013.01); *B23K 37/0211* (2013.01); *B23K 37/0235* (2013.01)

(58) Field of Classification Search
CPC ............... B23K 26/0876; B23K 26/38; B23K 37/0211; B23K 37/0235; B23K 26/0869; B23K 26/127; B23K 26/705; B23K 26/706; B23K 37/006; B23K 26/043; F16P 3/06; F16P 3/08; F16P 3/142; F16P 3/144

See application file for complete search history.

(56) References Cited

U.S. PATENT DOCUMENTS

| | | | |
|---|---|---|---|
| 4,055,787 | A | 10/1977 | Beadle et al. |
| 4,138,718 | A | 2/1979 | Toke et al. |
| 4,383,762 | A | 5/1983 | Burkert |
| 4,518,843 | A | 5/1985 | Antol et al. |
| 4,589,729 | A | 5/1986 | Bridges et al. |
| 4,650,287 | A | 3/1987 | Kudo et al. |
| 4,723,219 | A | 2/1988 | Beyer et al. |
| 4,863,538 | A | 9/1989 | Deckard |
| 4,894,831 | A | 1/1990 | Alfrey |
| 4,901,359 | A | 2/1990 | Bruder |
| 4,918,611 | A | 4/1990 | Shyu et al. |
| 4,998,260 | A | 3/1991 | Taniura |
| 5,136,160 | A | 8/1992 | Nakane et al. |
| 5,298,843 | A | 3/1994 | Miyajima et al. |
| 5,355,250 | A | 10/1994 | Grasso et al. |
| 5,396,279 | A | 3/1995 | Vossen |
| 5,475,521 | A | 12/1995 | Heidemann |
| 5,585,018 | A | 12/1996 | Kanaoka et al. |
| 5,682,319 | A | 10/1997 | Boland et al. |
| 5,756,961 | A | 5/1998 | Sato et al. |
| 6,031,200 | A | 2/2000 | Whitehouse |
| 6,085,122 | A | 7/2000 | Manning |
| 6,087,625 | A | 7/2000 | Iso |
| 6,284,999 | B1 | 9/2001 | Virtanen et al. |
| 6,326,586 | B1 | 12/2001 | Heyerick et al. |
| 6,420,674 | B1 | 7/2002 | Cole, III et al. |
| 6,420,675 | B1 | 7/2002 | Lizotte et al. |
| 6,483,596 | B1 | 11/2002 | Philippi et al. |
| 6,498,653 | B1 | 12/2002 | Wang |
| 6,528,758 | B2 | 3/2003 | Shaffer |
| 6,609,044 | B1 | 8/2003 | Basista et al. |
| 6,628,322 | B1 | 9/2003 | Cerruti |
| 6,696,667 | B1 | 2/2004 | Flanagan |
| 7,005,606 | B2 | 2/2006 | Legge et al. |
| 7,456,372 | B2 | 11/2008 | Hiramatsu |
| 8,111,904 | B2 | 2/2012 | Wallack et al. |
| 8,136,432 | B2 | 3/2012 | Travez et al. |
| 8,786,928 | B2 | 7/2014 | Dolleris et al. |
| 8,809,780 | B2 | 8/2014 | Wollenhaupt et al. |
| 8,921,734 | B2 | 12/2014 | Yerazunis et al. |
| 9,020,628 | B2 | 4/2015 | Fagan |
| 9,114,478 | B2 | 8/2015 | Scott et al. |
| 9,235,205 | B2 | 1/2016 | Prestidge et al. |
| 9,469,338 | B2 | 10/2016 | Norberg Ohlsson |
| 9,618,926 | B1 | 4/2017 | Louette et al. |
| 9,734,419 | B1 | 8/2017 | Ye et al. |
| 9,772,067 | B2 | 9/2017 | Bunz et al. |
| 9,782,906 | B1 | 10/2017 | Aminpour et al. |
| 9,912,915 | B2 | 3/2018 | Sinclair |
| 9,987,798 | B2 | 6/2018 | Tyler |
| 10,106,864 | B2 | 10/2018 | Zeng et al. |
| 10,234,260 | B2 | 3/2019 | Siercks et al. |
| D850,528 | S | 6/2019 | Gosselin et al. |
| 10,340,654 | B2 | 7/2019 | Nogiwa et al. |
| 10,379,517 | B2 | 8/2019 | Shapiro et al. |
| 10,509,390 | B2 | 12/2019 | Shapiro et al. |
| 10,557,701 | B2 | 2/2020 | Jiang et al. |
| 10,578,851 | B2 | 3/2020 | Fletcher et al. |
| 10,642,251 | B2 | 5/2020 | Platts et al. |
| 10,737,355 | B2 | 8/2020 | Shapiro et al. |
| 10,898,970 | B2 | 1/2021 | Ishiguro et al. |
| 10,919,111 | B2 | 2/2021 | Rubens et al. |
| 10,942,327 | B2 | 3/2021 | Okubo |
| 10,950,471 | B2 | 3/2021 | Shionoya |
| 10,953,496 | B2 | 3/2021 | Mauersberger |
| 11,262,236 | B2 | 3/2022 | Shapiro et al. |
| 2001/0012973 | A1 | 8/2001 | Wehrli et al. |
| 2002/0129485 | A1 | 9/2002 | Mok et al. |
| 2002/0144987 | A1 | 10/2002 | Tomlinson et al. |
| 2003/0049373 | A1 | 3/2003 | Van De Rijdt et al. |
| 2004/0029493 | A1 | 2/2004 | Tricard et al. |
| 2004/0060910 | A1 | 4/2004 | Schramm |
| 2004/0207831 | A1 | 10/2004 | Aoyama |
| 2004/0223165 | A1 | 11/2004 | Kurokawa et al. |
| 2004/0245227 | A1 | 12/2004 | Grafton-Reed et al. |
| 2004/0264523 | A1* | 12/2004 | Posamentier ......... H01S 5/0683 372/38.07 |
| 2005/0051523 | A1 | 3/2005 | Legge et al. |
| 2005/0069682 | A1 | 3/2005 | Tseng |
| 2005/0071020 | A1 | 3/2005 | Yamazaki et al. |
| 2005/0115941 | A1 | 6/2005 | Sukhman et al. |
| 2005/0142701 | A1 | 6/2005 | Yamaguchi et al. |
| 2005/0187651 | A1 | 8/2005 | Kimura et al. |
| 2006/0022379 | A1 | 2/2006 | Wicker et al. |
| 2006/0043615 | A1 | 3/2006 | Zheng et al. |
| 2006/0119699 | A1 | 6/2006 | Detmers et al. |
| 2007/0000889 | A1 | 1/2007 | Yamazaki et al. |
| 2007/0032733 | A1 | 2/2007 | Burton |
| 2007/0034615 | A1 | 2/2007 | Kleine |
| 2007/0181544 | A1 | 8/2007 | Sukhman et al. |
| 2007/0223544 | A1 | 9/2007 | Yamazaki et al. |
| 2008/0058734 | A1 | 3/2008 | Hanft et al. |
| 2008/0100829 | A1 | 5/2008 | Watson |
| 2008/0101687 | A1 | 5/2008 | Goeller |
| 2008/0149604 | A1 | 6/2008 | Varriano-Marston et al. |
| 2008/0160254 | A1 | 7/2008 | Arnold |
| 2008/0218735 | A1 | 9/2008 | Atsumi et al. |
| 2008/0243299 | A1 | 10/2008 | Johnson et al. |
| 2008/0249653 | A1 | 10/2008 | Ichikawa |
| 2009/0060386 | A1 | 3/2009 | Cooper et al. |
| 2009/0120914 | A1 | 5/2009 | Lawrence |
| 2009/0250445 | A1 | 10/2009 | Yamaguchi et al. |
| 2009/0308851 | A1 | 12/2009 | Harnisch et al. |

(56) References Cited

U.S. PATENT DOCUMENTS

| | | |
|---|---|---|
| 2010/0063603 A1 | 3/2010 | Chandhoke |
| 2010/0081971 A1 | 4/2010 | Allison |
| 2010/0149337 A1 | 6/2010 | Porcino |
| 2010/0193482 A1 | 8/2010 | Ow et al. |
| 2010/0193483 A1 | 8/2010 | Chen et al. |
| 2010/0274379 A1 | 10/2010 | Hehl |
| 2010/0292947 A1 | 11/2010 | Buk |
| 2010/0301023 A1 | 12/2010 | Unrath et al. |
| 2010/0326962 A1 | 12/2010 | Calla et al. |
| 2011/0005458 A1 | 1/2011 | Cunningham |
| 2011/0080476 A1 | 4/2011 | Dinauer et al. |
| 2011/0108533 A1 | 5/2011 | Boettcher et al. |
| 2011/0127333 A1 | 6/2011 | Veksland et al. |
| 2011/0127697 A1 | 6/2011 | Milne |
| 2011/0135208 A1 | 6/2011 | Atanassov et al. |
| 2011/0193943 A1 | 8/2011 | Campbell |
| 2011/0286007 A1 | 11/2011 | Pangrazio et al. |
| 2011/0316977 A1 | 12/2011 | Pienaar |
| 2012/0026249 A1 | 2/2012 | Kihira et al. |
| 2012/0035745 A1 | 2/2012 | Mori et al. |
| 2012/0074110 A1* | 3/2012 | Zediker .......... E21B 10/60 219/121.72 |
| 2012/0117787 A1 | 5/2012 | Sun et al. |
| 2012/0120232 A1 | 5/2012 | Nishikawa |
| 2012/0197427 A1 | 8/2012 | Gallucci et al. |
| 2012/0293821 A1 | 11/2012 | Chiba |
| 2013/0158957 A1 | 6/2013 | Lee et al. |
| 2013/0178972 A1 | 7/2013 | Goldsmith et al. |
| 2013/0190898 A1 | 7/2013 | Shilpiekandula et al. |
| 2013/0200053 A1 | 8/2013 | Bordatchev |
| 2013/0211391 A1 | 8/2013 | BenYakar et al. |
| 2013/0304248 A1 | 11/2013 | Lange et al. |
| 2014/0005804 A1 | 1/2014 | Brand |
| 2014/0018779 A1 | 1/2014 | Worrell et al. |
| 2014/0039707 A1 | 2/2014 | Curtis et al. |
| 2014/0046131 A1 | 2/2014 | Morita et al. |
| 2014/0071330 A1 | 3/2014 | Zhang et al. |
| 2014/0071486 A1 | 3/2014 | Van Bauwel |
| 2014/0071502 A1 | 3/2014 | Liu |
| 2014/0160273 A1 | 6/2014 | Jedynak et al. |
| 2014/0168293 A1 | 6/2014 | Moreau et al. |
| 2014/0168302 A1 | 6/2014 | Ngo et al. |
| 2014/0268607 A1 | 9/2014 | Wicker et al. |
| 2014/0299586 A1 | 10/2014 | Sawabe et al. |
| 2014/0310122 A1 | 10/2014 | Danielson et al. |
| 2014/0327687 A1 | 11/2014 | Murakami |
| 2014/0330424 A1 | 11/2014 | Garaas et al. |
| 2014/0368348 A1 | 12/2014 | Lin |
| 2014/0371895 A1 | 12/2014 | Sadusk et al. |
| 2015/0030821 A1 | 1/2015 | Costin, Sr. et al. |
| 2015/0107033 A1 | 4/2015 | Chang et al. |
| 2015/0108095 A1 | 4/2015 | Kruer et al. |
| 2015/0112470 A1 | 4/2015 | Chang et al. |
| 2015/0127137 A1 | 5/2015 | Brandt et al. |
| 2015/0136949 A1 | 5/2015 | De Nooij et al. |
| 2015/0154453 A1 | 6/2015 | Wilf |
| 2015/0158121 A1 | 6/2015 | Di Cairano et al. |
| 2015/0158311 A1 | 6/2015 | Ogasawara et al. |
| 2015/0185091 A1 | 7/2015 | Hasegawa et al. |
| 2015/0197064 A1 | 7/2015 | Walker et al. |
| 2015/0212421 A1 | 7/2015 | deVilliers et al. |
| 2015/0228069 A1 | 8/2015 | Fresquet et al. |
| 2015/0245549 A1 | 8/2015 | Kurita et al. |
| 2015/0301327 A1 | 10/2015 | Okugawa et al. |
| 2015/0301444 A1 | 10/2015 | Singh et al. |
| 2015/0355621 A1 | 12/2015 | Ikeda et al. |
| 2015/0360318 A1 | 12/2015 | Aubry |
| 2015/0378348 A1 | 12/2015 | Gupta et al. |
| 2016/0023486 A1 | 1/2016 | Priyadarshi |
| 2016/0059371 A1 | 3/2016 | Chang et al. |
| 2016/0084649 A1 | 3/2016 | Yamazaki et al. |
| 2016/0093540 A1 | 3/2016 | Liu et al. |
| 2016/0147213 A1 | 5/2016 | Murakami |
| 2016/0156771 A1 | 6/2016 | Lee |
| 2016/0193698 A1 | 7/2016 | Hildebrand et al. |
| 2016/0199945 A1 | 7/2016 | McDowell et al. |
| 2016/0210737 A1 | 7/2016 | Straub et al. |
| 2016/0271718 A1 | 9/2016 | Fagan |
| 2016/0303845 A1 | 10/2016 | Arce |
| 2016/0325541 A1 | 11/2016 | Lavrentyev et al. |
| 2016/0349038 A1 | 12/2016 | Ohtsuka et al. |
| 2016/0360409 A1 | 12/2016 | Singh |
| 2016/0367336 A1 | 12/2016 | Lv et al. |
| 2016/0368089 A1 | 12/2016 | Grapov et al. |
| 2016/0372349 A1 | 12/2016 | Hyakumura |
| 2017/0008127 A1 | 1/2017 | Hyatt et al. |
| 2017/0045877 A1 | 2/2017 | Shapiro et al. |
| 2017/0045879 A1 | 2/2017 | Yang et al. |
| 2017/0051429 A1 | 2/2017 | Sachs et al. |
| 2017/0057008 A1* | 3/2017 | Liu .......... G06T 7/0004 |
| 2017/0123362 A1 | 5/2017 | Masui et al. |
| 2017/0203390 A1 | 7/2017 | Kato |
| 2017/0235293 A1 | 8/2017 | Shapiro et al. |
| 2017/0235294 A1 | 8/2017 | Shapiro et al. |
| 2017/0243374 A1 | 8/2017 | Matsuzawa |
| 2017/0304897 A1 | 10/2017 | Walrand et al. |
| 2017/0307495 A1* | 10/2017 | Corbett .......... G01N 15/0211 |
| 2017/0341183 A1 | 11/2017 | Buller et al. |
| 2018/0001565 A1 | 1/2018 | Hocker |
| 2018/0113434 A1 | 4/2018 | Shapiro et al. |
| 2018/0147657 A1 | 5/2018 | Shapiro |
| 2018/0147658 A1 | 5/2018 | Shapiro |
| 2018/0147659 A1 | 5/2018 | Shapiro |
| 2018/0150047 A1 | 5/2018 | Shapiro |
| 2018/0150055 A1 | 5/2018 | Shapiro |
| 2018/0150058 A1 | 5/2018 | Shapiro |
| 2018/0150062 A1 | 5/2018 | Shapiro |
| 2018/0311762 A1 | 11/2018 | Van Der Stam et al. |
| 2018/0369964 A1 | 12/2018 | Grapov et al. |
| 2019/0014307 A1 | 1/2019 | McNamer et al. |
| 2019/0058870 A1 | 2/2019 | Rowell et al. |
| 2019/0148028 A1 | 5/2019 | Ravenhall et al. |
| 2019/0232357 A1 | 8/2019 | Angerer et al. |
| 2019/0278250 A1 | 9/2019 | Clement et al. |
| 2019/0310604 A1 | 10/2019 | Shapiro et al. |
| 2019/0383727 A1 | 12/2019 | Stewart et al. |
| 2020/0039002 A1 | 2/2020 | Sercel et al. |
| 2020/0056938 A1 | 2/2020 | Barkhurst et al. |
| 2020/0064806 A1 | 2/2020 | Shapiro et al. |
| 2020/0073362 A1 | 3/2020 | Shapiro et al. |
| 2020/0086424 A1 | 3/2020 | Jones et al. |
| 2020/0089184 A1 | 3/2020 | Shapiro et al. |
| 2020/0089185 A1 | 3/2020 | Shapiro et al. |
| 2020/0125071 A1 | 4/2020 | Shapiro et al. |
| 2020/0150544 A1 | 5/2020 | Prochnau et al. |
| 2020/0192332 A1 | 6/2020 | Jacobs et al. |
| 2020/0398457 A1 | 12/2020 | Zhang et al. |
| 2021/0007901 A1 | 1/2021 | Piantoni et al. |
| 2021/0010803 A1 | 1/2021 | Okuma |
| 2021/0026252 A1 | 1/2021 | Treubel et al. |
| 2021/0046546 A1 | 2/2021 | Madigan et al. |
| 2021/0060698 A1 | 3/2021 | Inoue |
| 2021/0063712 A1 | 3/2021 | Lambert et al. |
| 2021/0066082 A1 | 3/2021 | Ito et al. |
| 2021/0075180 A1 | 3/2021 | Hudek |
| 2021/0078103 A1 | 3/2021 | von der Heydt et al. |
| 2021/0094127 A1 | 4/2021 | Sercel et al. |
| 2021/0094128 A1 | 4/2021 | Nomaru |
| 2021/0101228 A1 | 4/2021 | Sbetti et al. |
| 2021/0197313 A1 | 7/2021 | Onoda |
| 2021/0323071 A1 | 10/2021 | Mark |
| 2021/0341281 A1 | 11/2021 | Schumann |
| 2021/0354245 A1 | 11/2021 | Kang et al. |

FOREIGN PATENT DOCUMENTS

| | | |
|---|---|---|
| CN | 101283362 A | 10/2008 |
| CN | 201253852 Y | 6/2009 |
| CN | 101559513 A | 10/2009 |
| CN | 101733558 A | 6/2010 |
| CN | 101837517 A | 9/2010 |
| CN | 205958834 U | 2/2017 |
| CN | 106670656 A | 5/2017 |
| DE | 102014214058 A1 | 1/2016 |

(56) References Cited

FOREIGN PATENT DOCUMENTS

| | | |
|---|---|---|
| EP | 0050425 A2 | 4/1982 |
| EP | 0954125 A2 | 11/1999 |
| EP | 1309108 A1 | 5/2003 |
| EP | 1645925 A1 | 4/2006 |
| EP | 2471625 A2 | 7/2012 |
| EP | 2808123 A1 | 12/2014 |
| FR | 2748562 A1 | 11/1997 |
| JP | H03254380 A | 11/1991 |
| JP | 04244347 A | 9/1992 |
| JP | H05205051 A | 8/1993 |
| JP | H06196557 A | 7/1994 |
| JP | 2001330413 A | 11/2001 |
| JP | 2002123306 A | 4/2002 |
| JP | 2006187782 A | 7/2006 |
| JP | 2006329751 A | 12/2006 |
| JP | 2008119718 A | 5/2008 |
| JP | 4311856 B2 | 8/2009 |
| WO | 199403302 A1 | 2/1994 |
| WO | 199623240 A1 | 8/1996 |
| WO | 200176250 A1 | 10/2001 |
| WO | 2016131019 A1 | 8/2016 |
| WO | 2016131022 A1 | 8/2016 |

OTHER PUBLICATIONS

Gao, Rong et al. "Human-Machine Collaborative Workshop Digital Manufacturing." ICICTA. 2010 IEEE. May 11, 2010. pp. 445-448.
International Bureau, International Search Report and Written Opinion mailed on Apr. 19, 2018, issued in connection with International Application No. PCT/US2017/063192, filed on Nov. 24, 2017, 12 pages.
European Patent Office, Extended Search Report mailed on Jul. 1, 2020, issued in connection with European Application No. 16709185.9, 5 pages.
Chinese Patent Office, First Office Action and Translation mailed on Apr. 10, 2019, issued in connection with Chinese Application No. 201680021337.8, 11 pages.
European Patent Office, European EPC Article 94.3 mailed on Oct. 27, 2021, issued in connection with European Application No. 16709185.9, 5 pages.
Inmagine Group. Vectr Free Online Vector Graphics Software. 3 pages, [Retrieved Mar. 22, 2021] https://vectr.com/.
International Bureau, International Search Report and Written Opinion mailed on May 27, 2016, issued in connection with International Application No. PCT/US2016/017900, filed on Feb. 12, 2016, 16 pages.
International Bureau, International Search Report and Written Opinion mailed on Jun. 3, 2016, issued in connection with International Application No. PCT/US2016/017901, filed on Feb. 12, 2016, 13 pages.
International Bureau, International Search Report and Written Opinion mailed Jun. 1, 2016, issued in connection with International Application No. PCT/US2016/017903, filed on Feb. 12, 2016, 15 pages.
International Bureau, International Search Report and Written Opinion mailed May 23, 2016, issued in connection with International Application No. PCT/US2016/017904, filed on Feb. 12, 2016, 19 pages.
International Bureau, International Search Report and Written Opinion mailed Apr. 3, 2018, issued in connection with International Application No. PCT/US2017/063187, filed on Nov. 24, 2017, 11 pages.
International Bureau, International Search Report and Written Opinion mailed Feb. 16, 2018, issued in connection with International Application No. PCT/US2017/063188, filed on Nov. 24, 2017, 14 pages.
International Bureau, International Search Report and Written Opinion mailed May 2, 2018, issued in connection with International Application No. PCT/US2017/063189, filed on Nov. 24, 2017, 22 pages.
International Bureau, International Search Report and Written Opinion mailed May 3, 2018, issued in connection with International Application No. PCT/US2017/063190, filed on Nov. 24, 2017, 18 pages.
International Bureau, International Search Report and Written Opinion mailed Mar. 21, 2018, issued in connection with International Application No. PCT/US2017/063191, filed on Nov. 24, 2017, 12 pages.
International Bureau, International Search Report and Written Opinion mailed Feb. 16, 2018, issued in connection with International Application No. PCT/US2017/063193, filed on Nov. 24, 2017, 12 pages.
Chinese Patent Office, Second Office Action and Translation mailed on Nov. 4, 2019, issued in connection with Chinese Application No. 201680021337.8, 7 pages.
Chinese Patent Office, Third Office Action and Translation mailed on Jul. 23, 2020, issued in connection with Chinese Application No. 201680021337.8, 31 pages.
Hattuniemi et al. A calibration method of triangulation sensors for thickness measurement, 2009 IEEE Instrumentation and Measurement Technology Conference, (I2MTC) May 5-7, 2009 Singapore, Singapore, IEEE, XP031492700, 4 pages.
Robertson, D. et al., CAD and Cognitive Complexity: Beyond the Drafting Board Metaphor, Manufacturing Review, American Society of Mechanical Engineers, Sep. 1991, vol. 4, No. 3, 11 pages.
Sass, L. (2007), "Synthesis of design production with integrated digital fabrication", Automation in Construction, Elsevier, Amsterdam, NL, vol. 16, No. 3, Feb. 7, 2020, pp. 298-310. Retrieved from the Internet: <www.elsevier.com/locate/autcon>.
Sliwinski, P., A Simple Model for on-Sensor Phase-Detection Autofocusing Algorithm. Journal of Computer and Communications, vol. 1, No. 6, pp. 11-17, Sep. 2013, Retrieved from the Internet: <http://www.scirp.org/journal/jcc>.
Barbosa, W. et al., Samba Reception Desk: Compromising Aesthetics, Fabrication and Structural Performance in the Design Process, Digital Aids to Design Creativity, vol. 2, eCAADe 30, Jan. 1, 2012, pp. 245-254. XP055844557, [retrieved on Sep. 24, 2021]. Retrieved from the Internet: <http:// papers.cumincad .org/data/works/att/ecaade2012_163.content.pdf>.
Hartmann, M. et al., CutCAD User Guide, Feb. 27, 2014, 71 pages. XP055844537, [retrieved on Sep. 24, 2021]. Retrieved from the Internet: URL:https://hci.rwth-aachen.de/index.php?option=com_attachments&task-download&id=2059.
European Patent Office, European Extended Search Report mailed on Oct. 7, 2021, issued in connection with European Application No. 21180624.5, 13 pages.
European Patent Office, European Extended Search Report mailed on Oct. 8, 2021, issued in connection with European Application No. 21182408.1, 14 pages.
Chinese Patent Office, First Office Action and Translation mailed on Sep. 9, 2021, issued in connection with Chinese Application No. 201780084613.X, pages.

\* cited by examiner

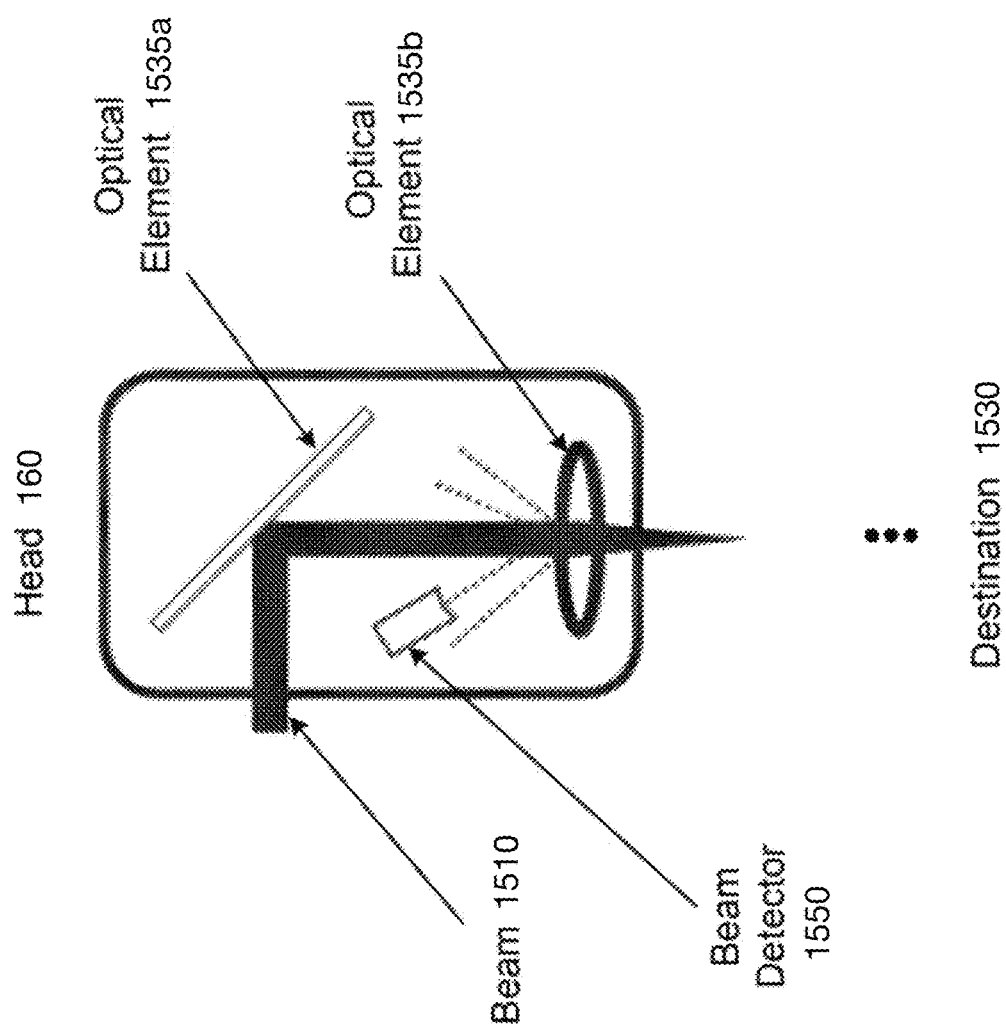

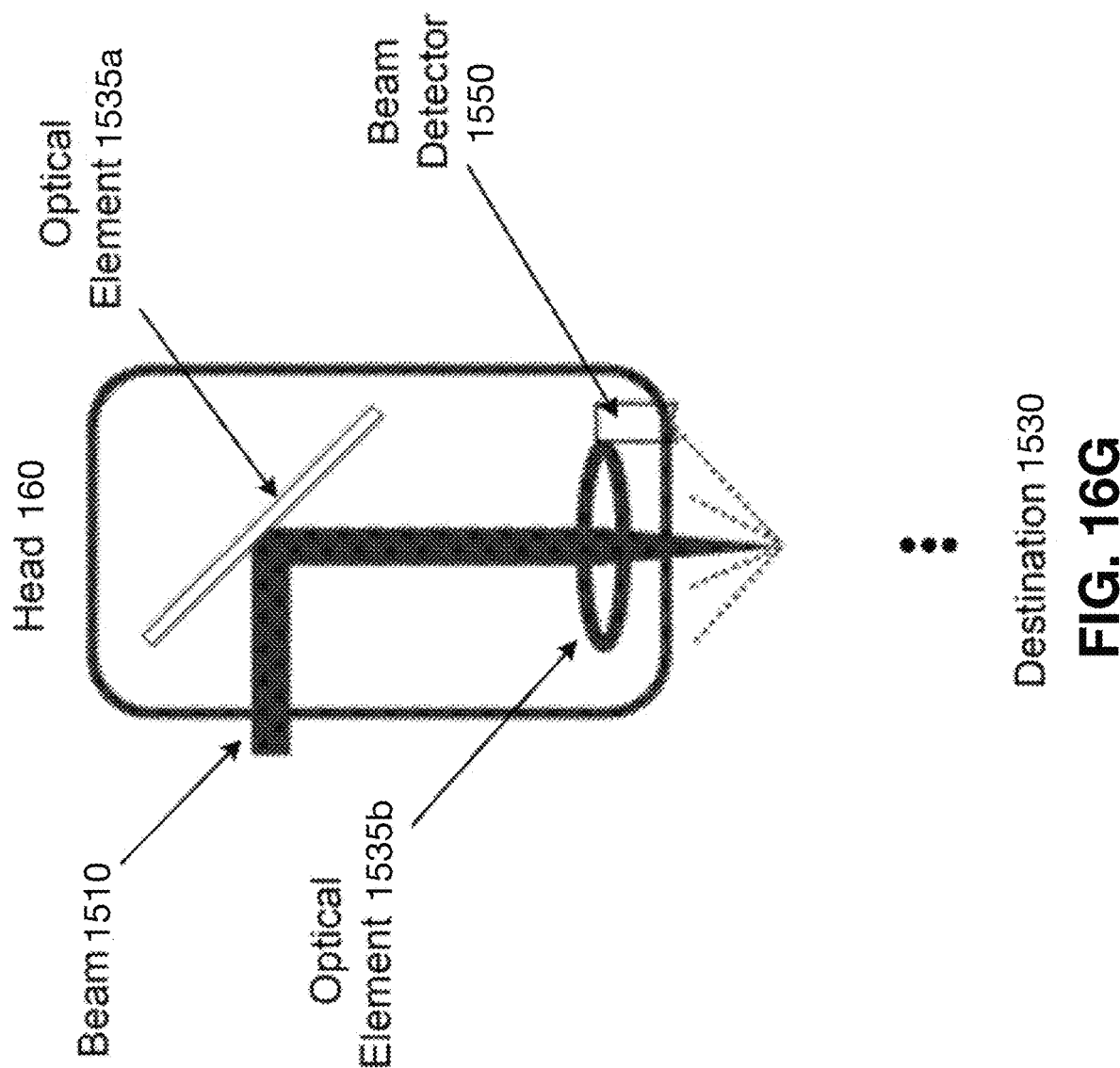

LASER FABRICATION WITH BEAM DETECTION

CROSS REFERENCE TO RELATED APPLICATIONS

This application is a continuation-in-part of U.S. patent application Ser. No. 17/720,400, which is a continuation of U.S. patent application Ser. No. 15/823,512, now issued as U.S. Pat. No. 11,305,379, which claims the benefit of priority to U.S. Provisional Patent Application No. 62/426,438 filed on Nov. 25, 2016, each of which is incorporated herein by reference in its entirety for all purposes.

This application is also a continuation-in-part of U.S. patent application Ser. No. 17/699,386, which is a continuation of U.S. patent application Ser. No. 16/717,730, now issued as U.S. Pat. No. 11,281,189, which is a continuation of U.S. patent application Ser. No. 15/823,513, now issued as U.S. Pat. No. 10,551,824, which claims the benefit of priority to U.S. Provisional Application No. 62/426,427 filed on Nov. 25, 2016, each of which is incorporated herein by reference in its entirety for all purposes.

This application is also a continuation-in-part of U.S. patent application Ser. No. 17/682,942, which is a continuation of U.S. patent application Ser. No. 16/814,820, now issued as U.S. Pat. No. 11,262,236, which claims the benefit of priority to U.S. Provisional Application No. 62/833,540 filed on Apr. 12, 2019, each of which is incorporated herein by reference in its entirety for all purposes.

This application is also a continuation-in-part of U.S. patent application Ser. No. 15/823,499, which claims the benefit of priority to U.S. Provisional Application No. 62/426,424 filed on Nov. 25, 2016, each of which is incorporated herein by reference in its entirety for all purposes.

TECHNICAL FIELD

The subject matter described herein relates to an optical system constructed with optical components that resist misalignment by an end user.

The subject matter described herein also relates to computerized processes for implementing motion commands in a computer-numerically-controlled machine.

The subject matter described herein also relates to manufacturing processes implementing, or aided by, a computer numerically controlled machine with mechanisms for detecting an interference of electromagnetic energy.

The subject matter described herein also relates to systems and methods for providing a housing having at least side parts and/or bottom parts made substantially of plastic to encase a computer-numerically-controlled machine with an added material layer providing improved confinement of laser energy.

BACKGROUND

Optical systems, for example laser-based, computer numerically controlled (CNC) machines, can include one or more optical elements to guide or focus a laser beam. The orientation and optical components can determine where the laser is directed to and the degree to which the laser is focused. In some configurations, optical systems can be adjustable, either by a user or by virtue of their construction. Further, CNC machines operate by moving a tool, such as a laser, drill bit, or the like, over a material to be machined. The tool can be a light source such as, for example, a laser and/or the like, that is configured to deliver electromagnetic energy to one or more locations along the material. The tool is moved by motors, belts, or other actuators in response to commands received from a control system. The speed of a tool can be a function of physical machine inertia, the particular commands given, the size of a motion step for the tool, or the like. Additionally, CNC machines can be used to create complicated items where traditional manufacturing techniques like moldings or manual assembly fail. Such automated methods operate based on instructions that specify the cuts, layers, patterns, and other actions to be performed. The instructions can be in the form of computer files transferred to the memory of a computer controller for the machine and interpreted at run-time to provide a series of steps in the manufacturing process.

SUMMARY

In one aspect, a system includes a moveable head of a computer numerically controlled (CNC) machine configured to deliver electromagnetic energy sufficient to cause a change in a material at least partially contained within an interior space of the CNC machine. The system also includes optical elements in the CNC machine. The optical elements are oriented at a fixed angle to each other to deliver the electromagnetic energy from a laser to the material.

Implementations of this subject matter can provide one or more advantages. Fixed optical components can prevent or reduce misalignment of an optical system, for example, during shipping or assembly. Also, fixed optical components can sometimes prevent or reduce an unintentional misalignment by a user, for example, during system setup or during use.

In one aspect, a control unit of a CNC machine receives, from a general purpose computer that is housed separately from a CNC machine, a motion plan defining operations for causing movement of a moveable component of the CNC machine. In response to a command received at the CNC machine, a first execution rate of the operations is altered to a second execution rate of the operations to change a rate of movement of the movable component.

Implementations of this subject matter can provide one or more advantages. For example, controlled deceleration can enable a smooth halting and resumption of CNC machine operations. This can allow for materials being worked to have a minimum of undesired effects that can sometimes occur when a machining operation is interrupted. While there are existing approaches that can enable certain aspects of controlled deceleration of CNC components, the current subject matter can, among other advantages, make use of a "clock stretching" technique, which allows deceleration and subsequent re-acceleration to occur in a controlled manner such that a material being worked on during a needed stoppage or deceleration can be processed despite the stoppage or deceleration such that an end product produced by a work flow including the controlled deceleration.

Systems, methods, and articles of manufacture, including apparatuses, are provided for disabling a computer numerically controlled machine in response to a misdirected electromagnetic beam. In one aspect, there is provided a method that includes: delivering, to a destination in a computer numerically controlled machine, a beam of electromagnetic energy; measuring a power of the beam of electromagnetic energy at a location between a source of the electromagnetic energy and the destination, the beam of electromagnetic energy traveling from the source to the destination being susceptible to one or more interferences, and the one or more interferences being capable of altering the power of the beam of electromagnetic energy by at least diverting, away from an intended path for the beam of electromagnetic energy, at least a portion of the beam of electromagnetic energy; detecting, based at least on the power of the beam of electromagnetic energy being less than a threshold value, an interference of the beam of electromagnetic energy; and in response to detecting the interference of the beam of electromagnetic energy, performing one or more actions.

In some variations, one or more features disclosed herein including the following features can optionally be included in any feasible combination. The power of the beam of electromagnetic energy may be measured by a beam detector. The beam detector may be disposed at a head of the computer numerically controlled machine.

In some variations, the head of the computer numerically controlled machine may be configured to steer, to the destination, the beam of electromagnetic energy from the source of the electromagnetic energy.

In some variations, the beam detector may be configured to measure the power of the beam of electromagnetic energy by least measuring a power of a backscatter from the beam of electromagnetic energy interacting with one or more components at the head of the computer numerically controlled machine.

In some variations, the beam detector may be configured to measure the power of the beam of electromagnetic energy by at least measuring a power of one or more divergent rays scattered from the beam of electromagnetic energy.

In some variations, the beam detector may be configured to measure the power of the beam of electromagnetic energy by least measuring a power of a backscatter from the beam of electromagnetic energy delivered at the destination.

In some variations, the beam detector may be configured to measure the power of the beam of electromagnetic energy by least measuring a power of a portion of the beam of electromagnetic energy.

In some variations, the portion of the beam of electromagnetic energy may be diverted to the beam detector by a bypass that enables the portion of the beam of electromagnetic energy to pass through an optical element configured to steer the beam of electromagnetic energy.

In some variations, the portion of the beam of electromagnetic energy may be diverted to the beam detector by an optical element and/or an optical obstacle inserted along the intended path of the beam of electromagnetic energy.

In some variations, the method may further include: determining an expected power of the beam of electromagnetic energy at the location between the source of the electromagnetic energy and the destination; and detecting the interference of the beam of electromagnetic energy further based on a difference between the power of the beam of electromagnetic energy and the expected power of the beam of electromagnetic energy exceeding another threshold value.

In some variations, the threshold value and/or the other threshold value may be determined based at least on a maximum permissible exposure (MPE) associated with the beam of electromagnetic energy.

In some variations, the expected power of the beam of electromagnetic energy may be determined based at least on an initial power of the beam of electromagnetic energy at the source of the electromagnetic energy and/or an attenuation of the power of the beam of electromagnetic energy as the beam of electromagnetic energy propagates from the source to the destination.

In some variations, the measuring of the power of the beam of electromagnetic energy may include: generating, by a first sensor oriented towards the source of the electromagnetic energy, a first measurement; generating, by a second sensor oriented away from the source of the electromagnetic energy, a second measurement; and determining, based at least on a difference between the first measurement and the second measurement, the power of the beam of electromagnetic energy, the difference between the first measurement and the second measurement corresponding to a contribution from an ambient noise, and the power of the beam of electromagnetic energy being determined by at least removing the contribution from the ambient noise.

In some variations, the measuring the power of the beam of electromagnetic energy may include filtering a signal detected by the first sensor and/or the second sensor to remove the contribution from the ambient noise.

In some variations, the first sensor and/or the second sensor may be configured to detect electromagnetic energy in a far infrared region of the electromagnetic spectrum.

In some variations, the first sensor and/or the second sensor may be thermopiles.

In some variations, the one or more actions may include at least one of generating an alarm, sending a notification to a user, disabling the source of the electromagnetic energy, and engaging an interlock of the computer numerically controlled machine.

In some variations, the one or more actions may include sending, to a cloud-based server, data collected by one or more sensors onboard the computer numerically controlled machine. The data may be over a time period during which the interference of the electromagnetic energy occurred at the computer numerically controlled machine.

In some variations, the one or more interferences may include an absence and/or a malfunction of an optical element configured to direct the beam of electromagnetic energy to the destination.

In some variations, the one or more interferences may include an obstacle introduced to an unprotected portion of the intended path between the source of the electromagnetic energy and the destination.

In another aspect, there is provided an apparatus that includes: a head configured to steer, to a destination, a beam of electromagnetic energy from a source of electromagnetic energy; a beam detector disposed at the head, the beam detector configured to measure a power of the beam of electromagnetic energy at a location between the source of the electromagnetic energy and the destination, the beam of electromagnetic energy traveling from the source to the destination being susceptible to one or more interferences, and the one or more interferences being capable of altering the power of the beam of electromagnetic energy by at least diverting, away from an intended path for the beam of electromagnetic energy, at least a portion of the beam of electromagnetic energy; and a controller configured to detect, based at least on the power of the beam of electromagnetic energy being less than a threshold value, an interference of the beam of electromagnetic energy, and respond to detecting the interference of the beam of electromagnetic energy by performing one or more actions.

In some variations, one or more features disclosed herein including the following features can optionally be included in any feasible combination. The beam detector may be configured to measure the power of the beam of electromagnetic energy by least measuring a power of a backscatter from the beam of electromagnetic energy delivered at the destination and/or the beam of electromagnetic energy interacting with one or more components at the head of the computer numerically controlled machine.

In some variations, the beam detector may be configured to measure the power of the beam of electromagnetic energy by at least measuring a power of one or more divergent rays scattered from the beam of electromagnetic energy.

In some variations, the beam detector may be configured to measure the power of the beam of electromagnetic energy by least measuring a power of a portion of the beam of electromagnetic energy. The portion of the beam of electromagnetic energy may be diverted to the beam detector by a bypass, an optical element, and/or an optical obstacle.

In some variations, the beam detector may include a first sensor oriented towards the source of electromagnetic energy and a second sensor oriented away from the source of electromagnetic energy. A difference between a first measurement generated by the first sensor and a second measurement generated by the second sensor may correspond to a contribution from an ambient noise. The beam detector may be configured to determine the power of the beam of electromagnetic energy by at least removing the contribution from the ambient noise.

In one aspect, a computer-numerically-controlled machine includes a light source configured to deliver electromagnetic energy at a location on a material at least partially disposed within the computer-numerically-controlled machine. A housing surrounds the sides and, optionally, the bottom of an interior space and the location. The housing includes a structural material defining at least a portion of the interior space. The housing also has a protective material protecting the plastic at least on the side parts (also referred to as sides) and/or bottom parts (also referred to as the bottom). The protective material can, among other possible benefits, dissipate, absorb, and/or scatter electromagnetic energy emitted by the laser to prevent the electromagnetic energy from escaping the housing. The dissipating, scattering, and/or absorbing has the effect of reducing a permeability of the housing to electromagnetic energy relative to the structural material alone (e.g., without the protective material).

Implementations of this subject matter can provide one or more advantages, such as for example providing improved safety for operators of a CNC machine and/or preventing or reducing the potential for material damage due to electromagnetic energy escaping from the housing. A housing as described herein provides benefits in manufacturing cost savings, resiliency, durability, and the like.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to preset optical components in a CNC machine, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 16A depicts a block diagram illustrating an example configuration of a beam detector, consistent with implementations of the current subject matter;

FIG. 16G depicts a block diagram illustrating another example configuration of a beam detector, consistent with implementations of the current subject matter;

When practical, similar reference numbers denote similar structures, features, or elements.

DETAILED DESCRIPTION

Figure 1:
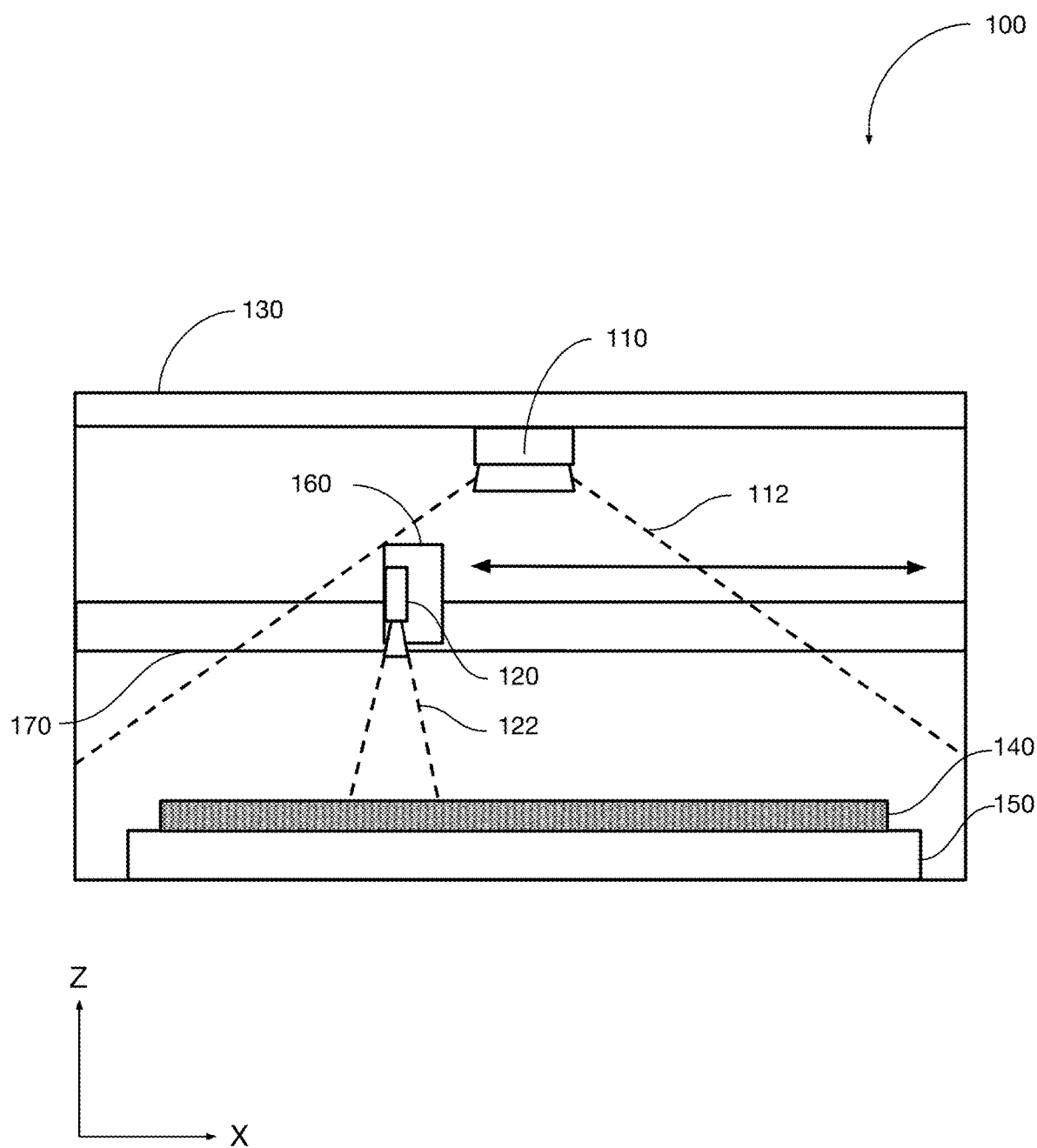
FIG. 1 is an elevational view of a CNC machine with a camera positioned to capture an image of the entire material bed and another camera positioned to capture an image of a portion of the material bed, consistent with some implementations of the current subject matter.

The details of one or more variations of the subject matter described herein are set forth in the accompanying drawings and the description below. Other features and advantages of the subject matter described herein will be apparent from the description and drawings, and from the claims. While certain features of the currently disclosed subject matter may be described for illustrative purposes in relation to using machine-vision for aiding automated manufacturing processes (e.g., a CNC process), it should be readily understood that such features are not intended to be limiting.

As used herein, the term "cutting" can generally refer to altering the appearance, properties, and/or state of a material. Cutting can include, for example, making a through-cut, engraving, bleaching, curing, burning, etc. Engraving, when specifically referred to herein, indicates a process by which a CNC machine modifies the appearance of the material without fully penetrating it. For example, in the context of a laser cutter, it can mean removing some of the material from the surface, or discoloring the material e.g. through an application of focused electromagnetic radiation delivering electromagnetic energy as described below.

As used herein, the term "laser" includes any electromagnetic radiation or focused or coherent energy source that (in the context of being a cutting tool) uses photons to modify a substrate or cause some change or alteration upon a material impacted by the photons. Lasers (whether cutting tools or diagnostic) can be of any desired wavelength, including for example, microwave, lasers, infrared lasers, visible lasers, UV lasers, X-ray lasers, gamma-ray lasers, or the like.

Also, as used herein, "cameras" includes, for example, visible light cameras, black and white cameras, IR or UV sensitive cameras, individual brightness sensors such as photodiodes, sensitive photon detectors such as a photomultiplier tube or avalanche photodiodes, detectors of infrared radiation far from the visible spectrum such as microwaves, X-rays, or gamma rays, optically filtered detectors, spectrometers, and other detectors that can include sources providing electromagnetic radiation for illumination to assist with acquisition, for example, flashes, UV lighting, etc.

Also, as used herein, reference to "real-time" actions includes some degree of delay or latency, either programmed intentionally into the actions or as a result of the limitations of machine response and/or data transmission. "Real-time" actions, as used herein, are intended to only approximate an instantaneous response, or a response performed as quickly as possible given the limits of the system, and do not imply any specific numeric or functional limitation to response times or the machine actions resulting therefrom.

Also, as used herein, unless otherwise specified, the term "material" is the material that is on the bed of the CNC machine. For example, if the CNC machine is a laser cutter, lathe, or milling machine, the material is what is placed in the CNC machine to be cut, for example, the raw materials, stock, or the like. In another example, if the CNC machine is a 3-D printer, then the material is either the current layer, or previously existent layers or substrate, of an object being crafted by the 3-D printing process. In yet another example, if the CNC machine is a printer, then the material can be the paper onto which the CNC machine deposits ink.

INTRODUCTION

A computer numerical controlled (CNC) machine is a machine that is used to add or remove material under the control of a computer. There can be one or more motors or other actuators that move one or more heads that perform the adding or removing of material. For CNC machines that add material, heads can incorporate nozzles that spray or release polymers as in a typical 3D printer. In some implementations, the heads can include an ink source such as a cartridge or pen. In the case of 3-D printing, material can be built up layer by layer until a fully realized 3D object has been created. In some implementations, the CNC machine can scan the surface of a material such as a solid, a liquid, or a powder, with a laser to harden or otherwise change the material properties of said material. New material may be deposited. The process can be repeated to build successive layers. For CNC machines that remove material, the heads can incorporate tools such as blades on a lathe, drag knives, plasma cutters, water jets, bits for a milling machine, a laser for a laser cutter/engraver, etc.

Figure 2:
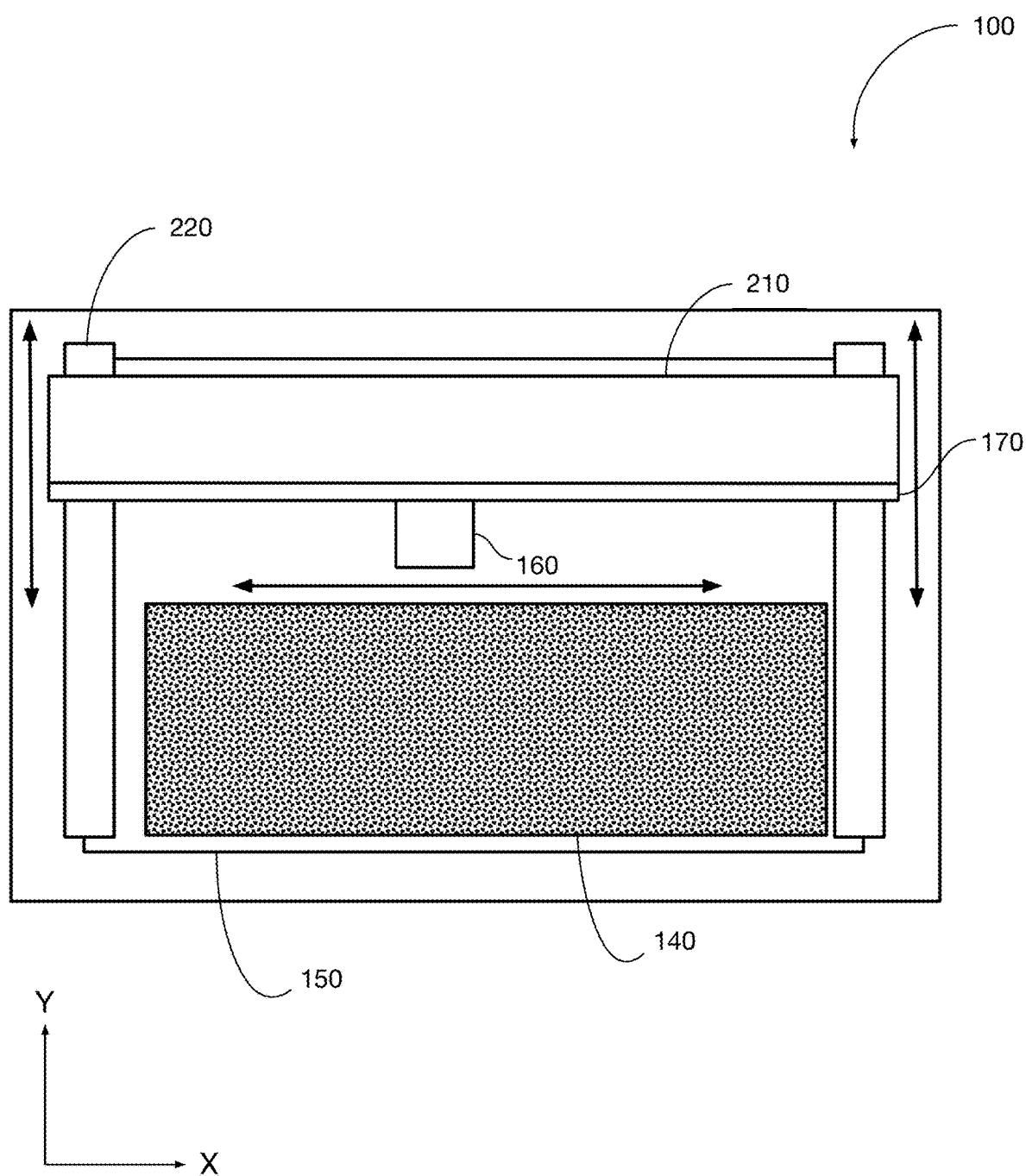
FIG. 2 is a top view of the implementation of the CNC machine shown in FIG. 1.

FIG. 1 is an elevational view of a CNC machine 100 with a camera positioned to capture an image of an entire material bed 150 and another camera positioned to capture an image of a portion of the material bed 150, consistent with some implementations of the current subject matter. FIG. 2 is a top view of the implementation of the CNC machine 100 shown in FIG. 1.

The CNC machine 100 shown in FIG. 1 corresponds to one implementation of a laser cutter. While some features are described in the context of a laser cutter, this is by no means intended to be limiting. Many of the features described below can be implemented with other types of CNC machines. The CNC machine 100 can be, for example, a lathe, engraver, 3D-printer, milling machine, drill press, saw, etc.

While laser cutter/engravers share some common features with CNC machines, they have many differences and present particularly challenging design constraints. A laser cutter/engraver is subject to regulatory guidelines that restrict the egress of electromagnetic radiation from the unit when operating, making it challenging for light to enter or escape the unit safely, for example to view or record an image of the contents.

The beam of a laser cutter/engraver must be routed from the emitter to the area to be machined, potentially requiring a series of optical elements such as lenses and mirrors. A variety of optical elements and configurations may give rise to the desired size, shape, and other considerations of the machining work area, and more broadly CNC machine function.

The beam of a laser cutter/engraver is easily misdirected, with a small angular deflection of any component relating to the beam path potentially resulting in the beam escaping the intended path, potentially with undesirable consequences.

A laser beam may be capable of causing material destruction if uncontrolled. A laser cutter/engraver may require high voltage and/or radio frequency power supplies to drive the laser itself. Liquid cooling is common in laser cutter/engravers to cool the laser, requiring fluid flow considerations. Airflow is important in laser cutter/engraver designs, as air may become contaminated with byproducts of the laser's interaction with the material such as smoke, which may in turn damage portions of the machine for example fouling optical systems. The air exhausted from the machine may contain undesirable byproducts such as smoke that must be routed or filtered, and the machine may need to be designed to prevent such byproducts from escaping through an unintended opening, for example by sealing components that may be opened. Unlike most machining tools, the kerf—the amount of material removed during the operation—is both small and variable depending on the material being processed, the power of the laser, the speed of the laser, and other factors, making it difficult to predict the final size of the object. Also unlike most machining tools, the output of the laser cutter/engraver is very highly dependent on the speed of operation; a momentary slowing can destroy the workpiece by depositing too much laser energy. In many machining tools, operating parameters such as tool rotational speed and volume of material removed are easy to continuously predict, measure, and calculate, while laser cutter/engravers are more sensitive to material and other conditions. In many machining tools, fluids are used as coolant and lubricant; in laser cutter/engravers, the cutting mechanism does not require physical contact with the material being affected, and air or other gasses may be used to aid the cutting process in a different manner, by facilitating combustion or clearing debris, for example.

The CNC machine 100 can have a housing surrounding an enclosure or interior area defined by the housing. The housing can include walls, a bottom, and one or more openings to allow access to the CNC machine 100, etc. There can be a material bed 150 that can include a top surface on which the material 140 generally rests.

In the implementation of FIG. 1, the CNC machine can also include an openable barrier as part of the housing to allow access between an exterior of the CNC machine and an interior space of the CNC machine. The openable barrier can include, for example, one or more doors, hatches, flaps, and the like that can actuate between an open position and a closed position. The openable barrier can attenuate the transmission of light between the interior space and the exterior when in a closed position. Optionally, the openable barrier can be transparent to one or more wavelengths of light or be comprised of portions of varying light attenuation ability. One type of openable barrier can be a lid 130 that can be opened or closed to put material 140 on the material bed 150 on the bottom of the enclosure. Various example implementations discussed herein include reference to a lid. It will be understood that absent explicit disclaimers of other possible configurations of the operable barrier or some other reason why a lid cannot be interpreted generically to mean any kind of openable barrier, the use of the term lid is not intended to be limiting. One example of an openable barrier can be a front door that is normally vertical when in the closed position and can open horizontally or vertically to allow additional access. There can also be vents, ducts, or other access points to the interior space or to components of the CNC machine 100. These access points can be for access to power, air, water, data, etc. Any of these access points can be monitored by cameras, position sensors, switches, etc. If they are accessed unexpectedly, the CNC machine 100 can execute actions to maintain the safety of the user and the system, for example, a controlled shutdown. In other implementations, the CNC machine 100 can be completely open (i.e. not having a lid 130, or walls). Any of the features described herein can also be present in an open configuration, where applicable.

As described above, the CNC machine 100 can have one or more movable heads that can be operated to alter the material 140. In some implementations, for example the implementation of FIG. 1, the movable head can be the head 160. There may be multiple movable heads, for example two or more mirrors that separately translate or rotate to locate a laser beam, or multiple movable heads that operate independently, for example two mill bits in a CNC machine capable of separate operation, or any combination thereof. In the case of a laser-cutter CNC machine, the head 160 can include optical components, mirrors, cameras, and other electronic components used to perform the desired machining operations. Again, as used herein, the head 160 typically is a laser-cutting head, but can be a movable head of any type.

The head 160, in some implementations, can be configured to include a combination of optics, electronics, and mechanical systems that can, in response to commands, cause a laser beam or electromagnetic radiation to be delivered to cut or engrave the material 140. The CNC machine 100 can also execute operation of a motion plan for causing movement of the movable head. As the movable head moves, the movable head can deliver electromagnetic energy to effect a change in the material 140 that is at least partially contained within the interior space. In one implementation, the position and orientation of the optical elements inside the head 160 can be varied to adjust the position, angle, or focal point of a laser beam. For example, mirrors can be shifted or rotated, lenses translated, etc. The head 160 can be mounted on a translation rail 170 that is used to move the head 160 throughout the enclosure. In some implementations the motion of the head can be linear, for example on an X axis, a Y axis, or a Z axis. In other implementations, the head can combine motions along any combination of directions in a rectilinear, cylindrical, or spherical coordinate system.

A working area for the CNC machine 100 can be defined by the limits within which the movable head can cause delivery of a machining action, or delivery of a machining medium, for example electromagnetic energy. The working area can be inside the interior space defined by the housing. It should be understood that the working area can be a generally three-dimensional volume and not a fixed surface. For example, if the range of travel of a vertically oriented laser cutter is a 10"×10" square entirely over the material bed 150, and the laser from the laser beam comes out of the laser cutter at a height of 4" above the material bed of the CNC machine, that 400 in$^2$ volume can be considered to be the working area. Restated, the working area can be defined by the extents of positions in which material 140 can be worked by the CNC machine 100, and not necessarily tied or limited by the travel of any one component. For example, if the head 160 could turn at an angle, then the working area could extend in some direction beyond the travel of the head 160. By this definition, the working area can also include any surface, or portion thereof, of any material 140 placed in the CNC machine 100 that is at least partially within the working area, if that surface can be worked by the CNC machine 100. Similarly, for oversized material, which may extend even outside the CNC machine 100, only part of the material 140 might be in the working area at any one time.

The translation rail 170 can be any sort of translating mechanism that enables movement of the head 160 in the X-Y direction, for example a single rail with a motor that slides the head 160 along the translation rail 170, a combination of two rails that move the head 160, a combination of circular plates and rails, a robotic arm with joints, etc.

Components of the CNC machine 100 can be substantially enclosed in a case or other enclosure. The case can include, for example, windows, apertures, flanges, footings, vents, etc. The case can also contain, for example, a laser, the head 160, optical turning systems, cameras, the material bed 150, etc. To manufacture the case, or any of its constituent parts, an injection-molding process can be performed. The injection-molding process can be performed to create a rigid case in a number of designs. The injection molding process may utilize materials with useful properties, such as strengthening additives that enable the injection molded case to retain its shape when heated, or absorptive or reflective elements, coated on the surface or dispersed throughout the material for example, that dissipate or shield the case from laser energy. As an example, one design for the case can include a horizontal slot in the front of the case and a corresponding horizontal slot in the rear of the case. These slots can allow oversized material to be passed through the CNC machine 100.

Optionally, there can be an interlock system that interfaces with, for example, the openable barrier, the lid 130, door, and the like. Such an interlock is required by many regulatory regimes under many circumstances. The interlock can then detect a state of opening of the openable barrier, for example, whether a lid 130 is open or closed. In some implementations, an interlock can prevent some or all functions of the CNC machine 100 while an openable barrier, for example the lid 130, is in the open state (e.g., not in a closed state). The reverse can be true as well, meaning that some functions of the CNC machine 100 can be prevented while in a closed state. There can also be interlocks in series where, for example, the CNC machine 100 will not operate unless both the lid 130 and the front door are both closed. Furthermore, some components of the CNC machine 100 can be tied to states of other components of the CNC machine, such as not allowing the lid 130 to open while the laser is on, a movable component moving, a motor running, sensors detecting a certain gas, etc. In some implementations, the interlock can prevent emission of electromagnetic energy from the movable head when detecting that the openable barrier is not in the closed position.

Converting Source Files to Motion Plans

A traditional CNC machine accepts a user drawing, acting as a source file that describes the object the user wants to create or the cuts that a user wishes to make. Examples of source files are:

1) .STL files that define a three-dimensional object that can be fabricated with a 3D printer or carved with a milling machine,
2) .SVG files that define a set of vector shapes that can be used to cut or draw on material,
3) .JPG files that define a bitmap that can be engraved on a surface, and
4) CAD files or other drawing files that can be interpreted to describe the object or operations similarly to any of the examples above.

Figures 3A, 3B, 3C:
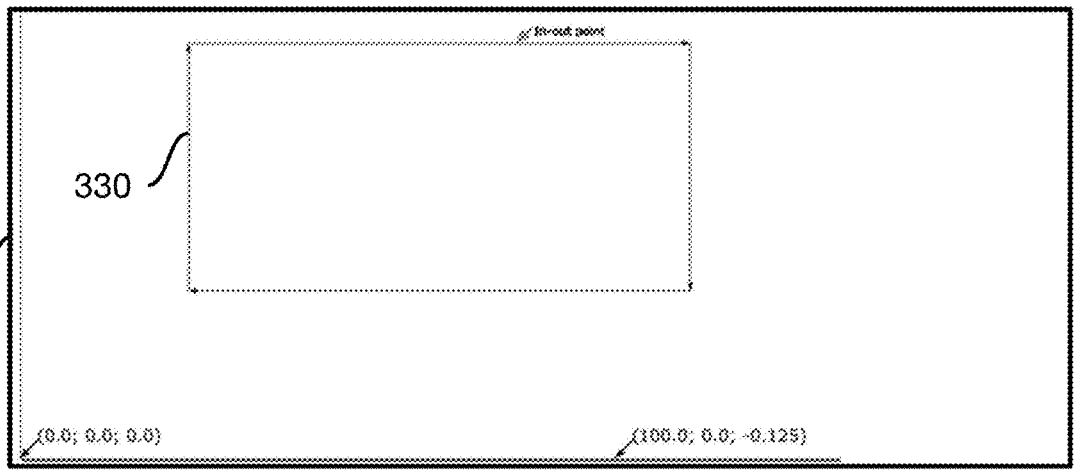
FIG. 3A is a diagram illustrating one example of an SVG source file, consistent with some implementations of the current subject matter.
FIG. 3B is an example of a graphical representation of the cut path in the CNC machine, consistent with some implementations of the current subject matter.
FIG. 3C is a diagram illustrating the machine file corresponding to the cut path and the source file, consistent with some implementations of the current subject matter.

FIG. 3A is a diagram illustrating one example of an SVG source file 310, consistent with some implementations of the current subject matter. FIG. 3B is an example of a graphical representation 320 of the cut path 330 in the CNC machine, consistent with some implementations of the current subject matter. FIG. 3C is a diagram illustrating the machine file 340 that would result in a machine creating the cut path 330, created from the source file 310, consistent with some implementations of the current subject matter. The example source file 310 represents a work surface that is 640×480 units with a 300×150 unit rectangle whose top left corner is located 100 units to the right and 100 units down from the top-left corner of the work surface. A computer program can then convert the source file 310 into a machine file 340 that can be interpreted by the CNC machine 100 to take the actions illustrated in FIG. 3B. The conversion can take place on a local computer where the source files reside on the CNC machine 100, etc.

The machine file 340 describes the idealized motion of the CNC machine 100 to achieve the desired outcome. Take, for example, a 3D printer that deposits a tube-shaped string of plastic material. If the source file specifies a rectangle, the machine file can instruct the CNC machine to move along a snakelike path that forms a filled in rectangle, while extruding plastic. The machine file can omit some information, as well. For example, the height of the rectangle may no longer be directly present in the machine file; the height will be as tall as the plastic tube is high. The machine file can also add some information, for example, the instruction to move the print head from its home position to a corner of the rectangle to begin printing. The instructions can even depart from the directly expressed intent of the user. A common setting in 3D printers, for example, causes solid shapes to be rendered as hollow in the machine file to save on material cost.

As shown by the example of FIGS. 3A-C, the conversion of the source file 310 to the machine file 340 can cause the CNC machine to move the cutting tool from (0,0) (in FIG. 3B) to the point at which cutting is to begin, activate the cutting tool (for example lower a drag knife or energize a laser), trace the rectangle, deactivate the cutting tool, and return to (0,0).

Once the machine file has been created, a motion plan for the CNC machine 100 can be generated. The motion plan contains the data that determines the actions of components of the CNC machine 100 at different points in time. The motion plan can be generated on the CNC machine 100 itself or by another computing system. A motion plan can be a stream of data that describes, for example, electrical pulses that indicate exactly how motors should turn, a voltage that indicates the desired output power of a laser, a pulse train that specifies the rotational speed of a mill bit, etc. Unlike the source files and the machine files such as G-code, motion plans are defined by the presence of a temporal element, either explicit or inferred, indicating the time or time offset at which each action should occur. This allows for one of the key functions of a motion plan, coordinated motion, wherein multiple actuators coordinate to have a single, pre-planned affect.

The motion plan renders the abstract, idealized machine file as a practical series of electrical and mechanical tasks. For example, a machine file might include the instruction to "move one inch to the right at a speed of one inch per second, while maintaining a constant number of revolutions per second of a cutting tool." The motion plan must take into consideration that the motors cannot accelerate instantly, and instead must "spin up" at the start of motion and "spin down" at the end of motion. The motion plan would then specify pulses (e.g., sent to stepper motors or other apparatus for moving the head or other parts of a CNC machine) occurring slowly at first, then faster, then more slowly again near the end of the motion.

The machine file is converted to the motion plan by the motion controller/planner. Physically, the motion controller can be a general or special purpose computing device, such as a high performance microcontroller or single board computer coupled to a Digital Signal Processor (DSP). The job of the motion controller is to take the vector machine code and convert it into electrical signals that will be used to drive the motors on the CNC machine 100, taking in to account the exact state of the CNC machine 100 at that moment (e.g., "since the machine is not yet moving, maximum torque must be applied, and the resulting change in speed will be small") and physical limitations of the machine (e.g., accelerate to such-and-such speed, without generating forces in excess of those allowed by the machine's design). The signals can be step and direction pulses fed to stepper motors or location signals fed to servomotors, among other possibilities, which create the motion and actions of the CNC machine 100, including the operation of elements like actuation of the head 160, moderation of heating and cooling, and other operations. In some implementations, a compressed file of electrical signals can be decompressed and then directly output to the motors. These electrical signals can include binary instructions similar to 1's and 0's to indicate the electrical power that is applied to each input of each motor over time to effect the desired motion.

In the most common implementation, the motion plan is the only stage that understands the detailed physics of the CNC machine 100 itself and translates the idealized machine file into implementable steps. For example, a particular CNC machine 100 might have a heavier head, and require more gradual acceleration. This limitation is modeled in the motion planner and affects the motion plan. Each model of CNC machine can require precise tuning of the motion plan based on its measured attributes (e.g., motor torque) and observed behavior (e.g., belt skips when accelerating too quickly). The CNC machine 100 can also tune the motion plan on a per-machine basis to account for variations from CNC machine to CNC machine.

The motion plan can be generated and fed to the output devices in real-time, or nearly so. The motion plan can also be pre-computed and written to a file instead of streamed to a CNC machine, and then read back from the file and transmitted to the CNC machine 100 at a later time. Transmission of instructions to the CNC machine 100, for example, portions of the machine file or motion plan, can be streamed as a whole or in batches from the computing system storing the motion plan. Batches can be stored and managed separately, allowing pre-computation or additional optimization to be performed on only part of the motion plan. In some implementations, a file of electrical signals, which may be compressed to preserve space and decompressed to facilitate use, can be directly output to the motors. The electrical signals can include binary instructions similar to 1's and 0's to indicate actuation of the motor.

The motion plan can be augmented, either by precomputing in advance or updating in real-time, with the aid of machine vision. Machine vision is a general term that describes the use of sensor data, and not only limited to optical data, in order to provide additional input to machine operation. Other forms of input can include, for example, audio data from an on-board sound sensor such as a microphone, or position/acceleration/vibration data from an on-board sensor such as a gyroscope or accelerometer. Machine vision can be implemented by using cameras to provide images of, for example, the CNC machine 100, the material being operated on by the CNC machine, the environment of the CNC machine 100 (if there is debris accumulating or smoke present), or any combination of these. These cameras can then route their output to a computer for processing. By viewing the CNC machine 100 in operation and analyzing the image data it can, for example, be determined if the CNC machine 100 is working correctly, if the CNC machine 100 is performing optimally, the current status of the CNC machine 100 or subcomponents of the CNC machine 100, etc. Similarly, the material can be imaged and, for example, the operation of the CNC machine 100 can be adjusted according to instructions, users can be notified when the project is complete, or information about the material can be determined from the image data. Error conditions can be identified, such as if a foreign body has been inadvertently left in the CNC machine 100, the material has been inadequately secured, or the material is reacting in an unexpected way during machining.

Camera Systems

Cameras can be mounted inside the CNC machine 100 to acquire image data during operation of the CNC machine 100. Image data refers to all data gathered from a camera or image sensor, including still images, streams of images, video, audio, metadata such as shutter speed and aperture settings, settings or data from or pertaining to a flash or other auxiliary information, graphic overlays of data superimposed upon the image such as GPS coordinates, in any format, including but not limited to raw sensor data such as a .DNG file, processed image data such as a .JPG file, and data resulting from the analysis of image data processed on the camera unit such as direction and velocity from an optical mouse sensor. For example, there can be cameras mounted such that they gather image data from (also referred to as 'view' or 'image') an interior portion of the CNC machine 100. The viewing can occur when the lid 130 is in a closed position or in an open position or independently of the position of the lid 130. In one implementation, one or more cameras, for example a camera mounted to the interior surface of the lid 130 or elsewhere within the case or enclosure, can view the interior portion when the lid 130 to the CNC machine 100 is a closed position. In particular, in some preferred embodiments, the cameras can image the material 140 while the CNC machine 100 is closed, for example, while machining the material 140. In some implementations, cameras can be mounted within the interior space and opposite the working area. In other implementations, there can be a single camera or multiple cameras attached to the lid 130. Cameras can also be capable of motion such as translation to a plurality of positions, rotation, and/or tilting along one or more axes. One or more cameras mounted to a translatable support, such as a gantry 210, which can be any mechanical system that can be commanded to move (movement being understood to include rotation) the camera or a mechanism such as a mirror that can redirect the view of the camera, to different locations and view different regions of the CNC machine. The head 160 is a special case of the translatable support, where the head 160 is limited by the track 220 and the translation rail 170 that constrain its motion.

Lenses can be chosen for wide angle coverage, for example for extreme depth of field so that both near and far objects may be in focus, or one or more of many other considerations. The cameras may be placed to additionally capture the user so as to document the building process, or placed in a location where the user can move the camera, for example on the underside of the lid 130 where opening the CNC machine 100 causes the camera to point at the user. Here, for example, the single camera described above can take an image when the lid is not in the closed position. Such an image can include an object, such as a user, that is outside the CNC machine 100. Cameras can be mounted on movable locations like the head 160 or lid 130 with the intention of using video or multiple still images taken while the camera is moving to assemble a larger image, for example scanning the camera across the material 140 to get an image of the material 140 in its totality so that the analysis of image data may span more than one image.

As shown in FIG. 1, a lid camera 110, or multiple lid cameras, can be mounted to the lid 130. In particular, as shown in FIG. 1, the lid camera 110 can be mounted to the underside of the lid 130. The lid camera 110 can be a camera with a wide field of view 112 that can image a first portion of the material 140. This can include a large fraction of the material 140 and the material bed or even all of the material 140 and material bed 150. The lid camera 110 can also image the position of the head 160, if the head 160 is within the field of view of the lid camera 110. Mounting the lid camera 110 on the underside of the lid 130 allows for the user to be in view when the lid 130 is open. This can, for example, provide images of the user loading or unloading the material 140, or retrieving a finished project. Here, a number of sub-images, possibly acquired at a number of different locations, can be assembled, potentially along with other data like a source file such as an SVG or digitally rendered text, to provide a final image. When the lid 130 is closed, the lid camera 110 rotates down with the lid 130 and brings the material 140 into view.

Also as shown in FIG. 1, a head camera 120 can be mounted to the head 160. The head camera 120 can have a narrower field of view 122 and take higher resolution images of a smaller area, of the material 140 and the material bed, than the lid camera 110. One use of the head camera 120 can be to image the cut made in the material 140. The head camera 120 can identify the location of the material 140 more precisely than possible with the lid camera 110.

Other locations for cameras can include, for example, on an optical system guiding a laser for laser cutting, on the laser itself, inside a housing surrounding the head 160, underneath or inside of the material bed 150, in an air filter or associated ducting, etc. Cameras can also be mounted outside the CNC machine 100 to view users or view external features of the CNC machine 100.

Multiple cameras can also work in concert to provide a view of an object or material 140 from multiple locations, angles, resolutions, etc. For example, the lid camera 110 can identify the approximate location of a feature in the CNC machine 100. The CNC machine 100 can then instruct the head 160 to move to that location so that the head camera 120 can image the feature in more detail.

While the examples herein are primarily drawn to a laser cutter, the use of the cameras for machine vision in this application is not limited to only that specific type of CNC machine 100. For example, if the CNC machine 100 were a lathe, the lid camera 110 can be mounted nearby to view the rotating material 140 and the head 160, and the head camera 120 located near the cutting tool. Similarly, if the CNC machine 100 were a 3D printer, the head camera 120 can be mounted on the head 160 that deposits material 140 for forming the desired piece.

An image recognition program can identify conditions in the interior portion of the CNC machine 100 from the acquired image data. The conditions that can be identified are described at length below, but can include positions and properties of the material 140, the positions of components of the CNC machine 100, errors in operation, etc. Based in part on the acquired image data, instructions for the CNC machine 100 can be created or updated. The instructions can, for example, act to counteract or mitigate an undesirable condition identified from the image data. The instructions can include changing the output of the head 160. For example, for a CNC machine 100 that is a laser cutter, the laser can be instructed to reduce or increase power or turn off. Also, the updated instructions can include different parameters for motion plan calculation, or making changes to an existing motion plan, which could change the motion of the head 160 or the gantry 210. For example, if the image indicates that a recent cut was offset from its desired location by a certain amount, for example due to a part moving out of alignment, the motion plan can be calculated with an equal and opposite offset to counteract the problem, for example for a second subsequent operation or for all future operations. The CNC machine 100 can execute the instructions to create the motion plan or otherwise effect the changes described above. In some implementations, the movable component can be the gantry 210, the head 160, or an identifiable mark on the head 160. The movable component, for example the gantry 210, can have a fixed spatial relationship to the movable head. The image data can update software controlling operation of the CNC machine 100 with a position of the movable head and/or the movable component with their position and/or any higher order derivative thereof.

Because the type of image data required can vary, and/or because of possible limitations as to the field of view of any individual camera, multiple cameras can be placed throughout the CNC machine 100 to provide the needed image data. Camera choice and placement can be optimized for many use cases. Cameras closer to the material 140 can be used for detail at the expense of a wide field of view. Multiple cameras may be placed adjacently so that images produced by the multiple cameras can be analyzed by the computer to achieve higher resolution or wider coverage jointly than was possible for any image individually. The manipulation and improvement of images can include, for example, stitching of images to create a larger image, adding images to increase brightness, differencing images to isolate changes (such as moving objects or changing lighting), multiplying or dividing images, averaging images, rotating images, scaling images, sharpening images, and so on, in any combination. Further, the system may record additional data to assist in the manipulation and improvement of images, such as recordings from ambient light sensors and location of movable components. Specifically, stitching can include taking one or more sub-images from one or more cameras and combining them to form a larger image. Some portions of the images can overlap as a result of the stitching process. Other images may need to be rotated, trimmed, or otherwise manipulated to provide a consistent and seamless larger image as a result of the stitching. Lighting artifacts such as glare, reflection, and the like, can be reduced or eliminated by any of the above methods. Also, the image analysis program can perform edge detection and noise reduction or elimination on the acquired images. Edge detection can include performing contrast comparisons of different parts of the image to detect edges and identify objects or features in the image. Noise reduction can involve averaging or smoothing of one or more images to reduce the contribution of periodic, random, or pseudo-random image noise, for example that due to CNC machine 100 operation such as vibrating fans, motors, etc.

Figure 4A:
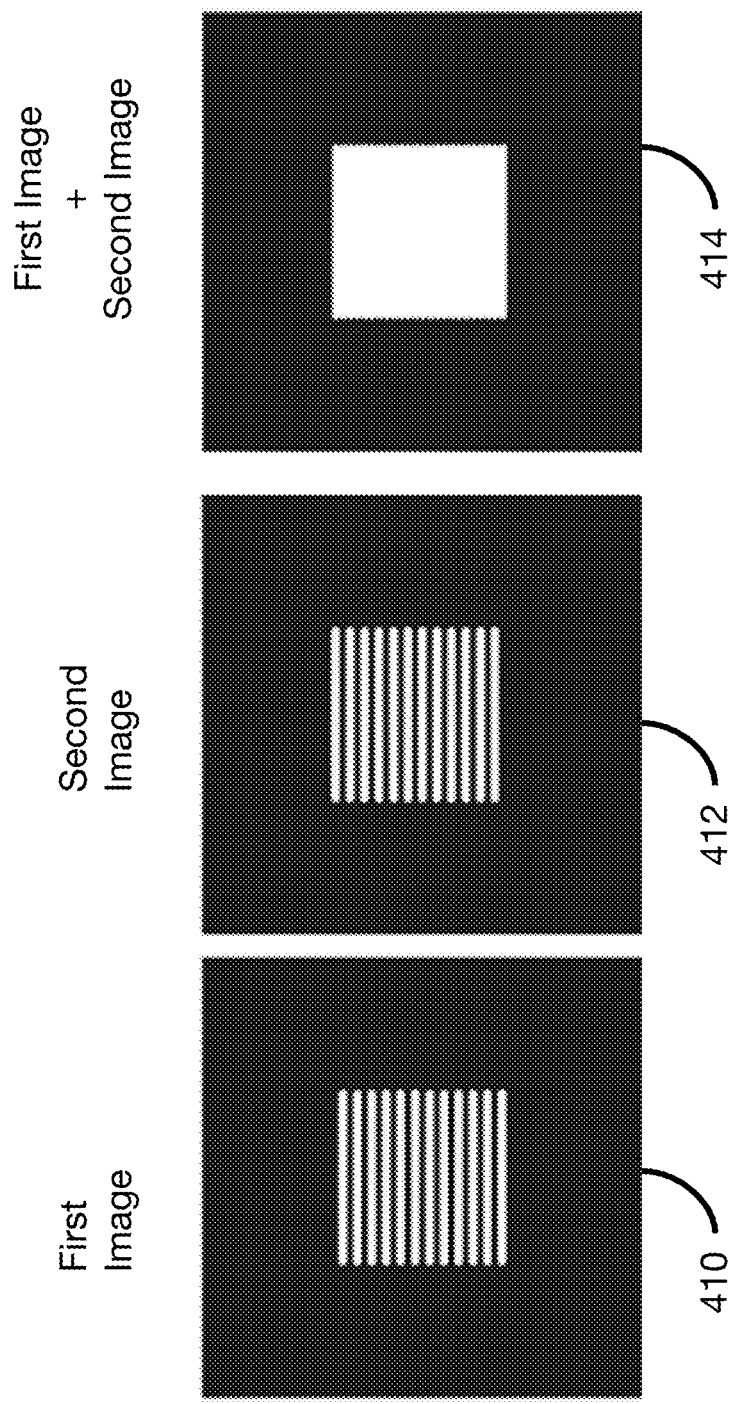
FIG. 4A is a diagram illustrating the addition of images, consistent with some implementations of the current subject matter.

FIG. 4A is a diagram illustrating the addition of images, consistent with some implementations of the current subject matter. Images taken by the cameras can be added, for example, to increase the brightness of an image. In the example of FIG. 4A, there is a first image 410, a second image 412, and a third image 414. First image 410 has horizontal bands (shown in white against a black background in the figure). The horizontal bands can conform to a more brightly lit object, though the main point is that there is a difference between the bands and the background. Second image 412 has similar horizontal bands, but offset in the vertical direction relative to those in the first image 410. When the first image 410 and second image 412 are added, their sum is shown in by the third image 414. Here, the two sets of bands interleave to fill in the bright square as shown. This technique can be applied to, for example, acquiring many image frames from the cameras, possibly in low light conditions, and adding them together to form a brighter image.

Figure 4B:
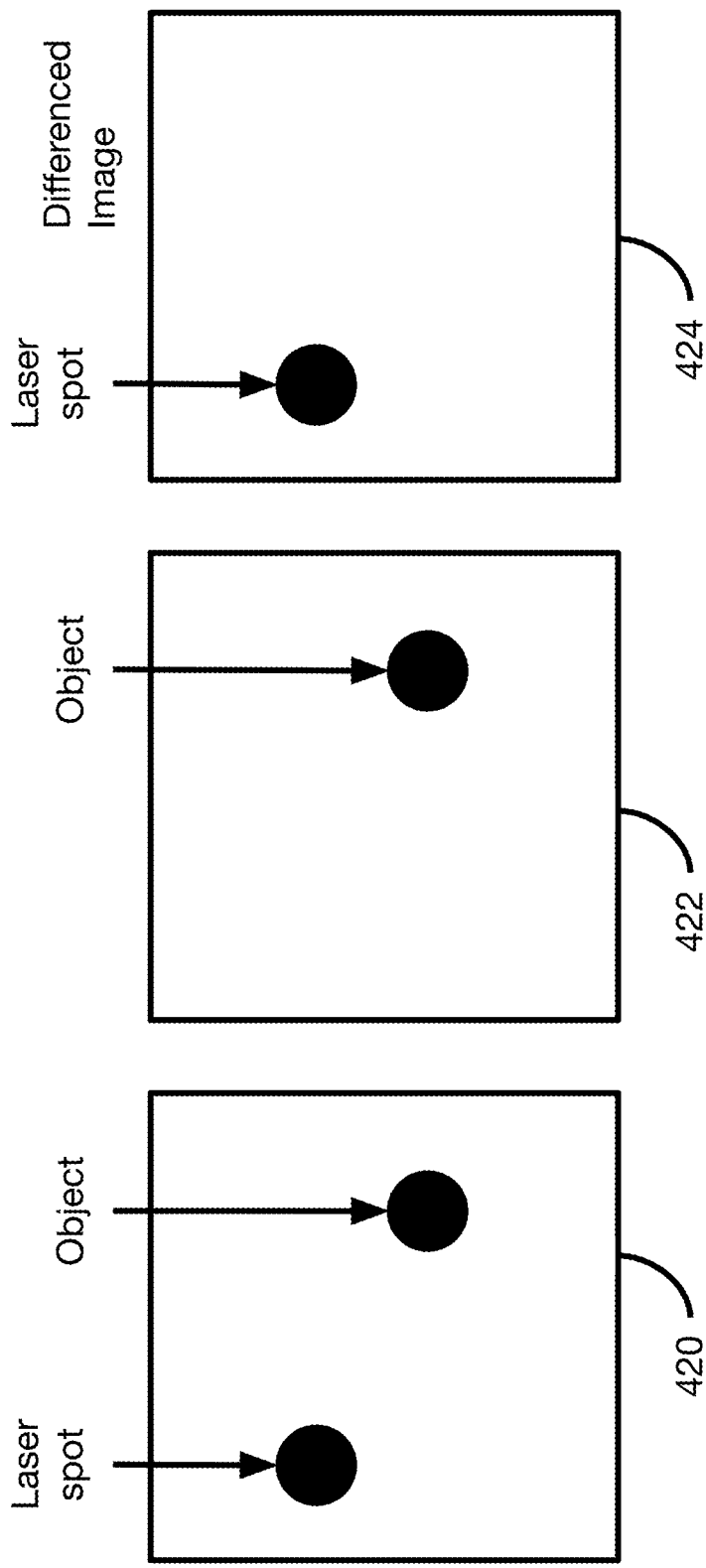
FIG. 4B is a diagram illustrating the subtraction of images, consistent with some implementations of the current subject matter.

FIG. 4B is a diagram illustrating the subtraction of images, consistent with some implementations of the current subject matter. Image subtraction can be useful to, for example, isolate dim laser spot from a comparatively bright image. Here, a first image 420 shows two spots, one representative of a laser spot and the other of an object. To isolate the laser spot, a second image 422 can be taken with the laser off, leaving only the object. Then, the second image 422 can be subtracted from the first image 420 to arrive at the third image 424. The remaining spot in the third image 424 is the laser spot.

Figure 4C:
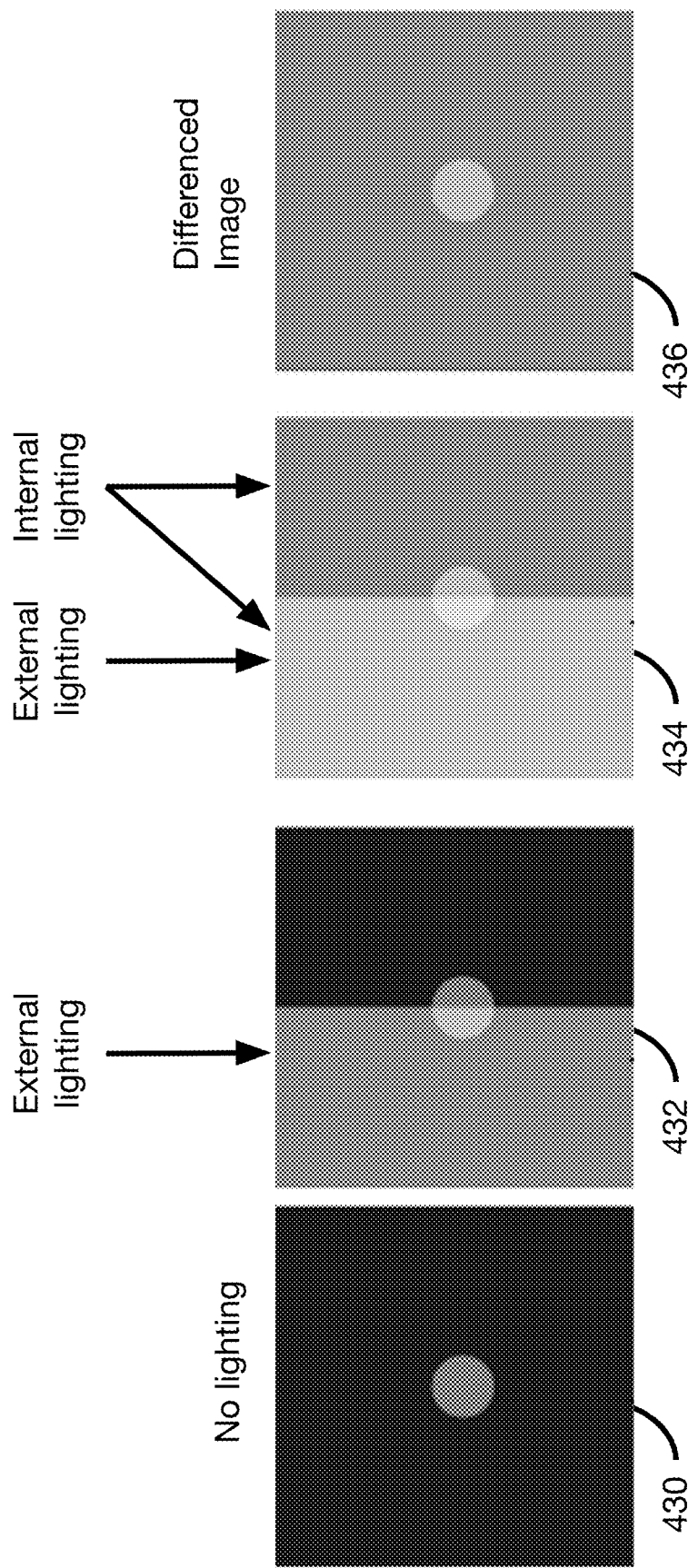
FIG. 4C is a diagram illustrating the differencing of images to isolate a simulated internal lighting effect, consistent with some implementations of the current subject matter.

FIG. 4C is a diagram illustrating the differencing of images to isolate a simulated internal lighting effect, consistent with some implementations of the current subject matter. There can be an object in the CNC machine 100, represented as a circle in first image 430. This could represent, for example an object on the material bed 150 of the CNC machine 100. If, for example, half of the material bed 150 of the CNC machine 100 was illumined by outside lighting, such as a sunbeam, a second image 432 might appear as shown, with the illuminated side brighter than the side without the illumination. It can sometimes be advantageous to use internal lighting during operation, for example to illuminate a watermark, aid in image diagnostics, or simply to better show a user what is happening in the CNC machine. Even if none of these reasons apply, however, internal lighting allows reduction or elimination of the external lighting (in this case the sunbeam) via this method. This internal lighting is represented in the third image 434 by adding a brightness layer to the entire second image 432. To isolate the effect of the internal lighting, the second image 432 can be subtracted from the third image 434 to result in a fourth image 436. Here, the fourth image 436 shows the area, and the object, as it would appear under only internal lighting. This differencing can allow image analysis to be performed as if only the controlled internal lighting were present, even in the presence of external lighting contaminants.

Machine vision processing of images can occur at, for example, the CNC machine 100, on a locally connected computer, or on a remote server connected via the internet. In some implementations, image processing capability can be performed by the CNC machine 100, but with limited speed. One example of this can be where the onboard processor is slow and can run only simple algorithms in real-time, but which can run more complex analysis given more time. In such a case, the CNC machine 100 could pause for the analysis to be complete, or alternatively, execute the data on a faster connected computing system. A specific example can be where sophisticated recognition is performed remotely, for example, by a server on the internet. In these cases, limited image processing can be done locally, with more detailed image processing and analysis being done remotely. For example, the camera can use a simple algorithm, run on a processor in the CNC machine 100, to determine when the lid 130 is closed. Once the CNC machine 100 detects that the lid 130 is closed, the processor on the CNC machine 100 can send images to a remote server for more detailed processing, for example, to identify the location of the material 140 that was inserted. The system can also devote dedicated resources to analyzing the images locally, pause other actions, or diverting computing resources away from other activities.

In another implementation, the head 160 can be tracked by onboard, real-time analysis. For example, tracking the position of the head 160, a task normally performed by optical encoders or other specialized hardware, can be done with high resolution, low resolution, or a combination of both high and low resolution images taken by the cameras. As high-resolution images are captured, they can be transformed into lower resolution images that are smaller in memory size by resizing or cropping. If the images include video or a sequence of still images, some may be eliminated or cropped. A data processor can analyze the smaller images repeatedly, several times a second for example, to detect any gross misalignment. If a misalignment is detected, the data processor can halt all operation of the CNC machine 100 while more detailed processing more precisely locates exactly the head 160 using higher resolution images. Upon location of the head 160, the head 160 can be adjusted to recover the correction location. Alternatively, images can be uploaded to a server where further processing can be performed. The location can be determined by, for example, looking at the head 160 with the lid camera, by looking at what the head camera 120 is currently imaging, etc. For example, the head 160 could be instructed to move to a registration mark. Then the head camera 120 can then image the registration mark to detect any minute misalignment.

Basic Camera Functionality

The cameras can be, for example, a single wide-angle camera, multiple cameras, a moving camera where the images are digitally combined, etc. The cameras used to image a large region of the interior of the CNC machine 100 can be distinct from other cameras that image a more localized area. The head camera 120 can be one example of a camera that, in some implementations, images a smaller area than the wide-angle cameras.

There are other camera configurations that can be used for different purposes. A camera (or cameras) with broad field of view can cover the whole of the machine interior, or a predefined significant portion thereof. For example, the image data acquired from one or more of the cameras can include most (meaning over 50%) of the working area. In other embodiments, at least 60%, 70%, 80%, 90%, or 100% of the working area can be included in the image data. The above amounts do not take into account obstruction by the material 140 or any other intervening objects. For example, if a camera is capable of viewing 90% of the working area without material 140, and a piece of material 140 is placed in the working area, partially obscuring it, the camera is still considered to be providing image data that includes 90% of the working area. In some implementations, the image data can be acquired when the interlock is not preventing the emission of electromagnetic energy.

In other implementations, a camera mounted outside the machine can see users and/or material 140 entering or exiting the CNC machine 100, record the use of the CNC machine 100 for sharing or analysis, or detect safety problems such as an uncontrolled fire. Other cameras can provide a more precise look with limited field of view. Optical sensors like those used on optical mice can provide very low resolution and few colors, or greyscale, over a very small area with very high pixel density, then quickly process the information to detect material 140 moving relative to the optical sensor. The lower resolution and color depth, plus specialized computing power, allow very quick and precise operation. Conversely, if the head is static and the material is moved, for example if the user bumps it, this approach can see the movement of the material and characterize it very precisely so that additional operations on the material continue where the previous operations left off, for example resuming a cut that was interrupted before the material was moved.

Video cameras can detect changes over time, for example comparing frames to determine the rate at which the camera is moving. Still cameras can be used to capture higher resolution images that can provide greater detail. Yet another type of optical scanning can be to implement a linear optical sensor, such as a flatbed scanner, on an existing rail, like the sliding gantry 210 in a laser system, and then scan it over the material 140, assembling an image as it scans.

To isolate the light from the laser, the laser may be turned off and on again, and the difference between the two measurements indicates the light scattered from the laser while removing the effect of environmental light. The cameras can have fixed or adjustable sensitivity, allowing them to operate in dim or bright conditions. There can be any combination of cameras that are sensitive to different wavelengths. Some cameras, for example, can be sensitive to wavelengths corresponding to a cutting laser, a range-finding laser, a scanning laser, etc. Other cameras can be sensitive to wavelengths that specifically fall outside the wavelength of one or more lasers used in the CNC machine 100. The cameras can be sensitive to visible light only, or can have extended sensitivity into infrared or ultraviolet, for example to view invisible barcodes marked on the surface, discriminate between otherwise identical materials based on IR reflectivity, or view invisible (e.g., infrared) laser beams directly. The cameras can even be a single photodiode that measures e.g., the flash of the laser striking the material 140, or which reacts to light emissions that appear to correlate with an uncontrolled fire. The cameras can be used to image, for example, a beam spot on a mirror, light escaping an intended beam path, etc. The cameras can also detect scattered light, for example if a user is attempting to cut a reflective material. Other types of cameras can be implemented, for example, instead of detecting light of the same wavelength of the laser, instead detecting a secondary effect, such as infrared radiation (with a thermographic camera) or x-rays given off by contact between the laser and another material.

The cameras may be coordinated with lighting sources in the CNC machine 100. The lighting sources can be positioned anywhere in the CNC machine 100, for example, on the interior surface of the lid 130, the walls, the floor, the gantry 210, etc. One example of coordination between the lighting sources and the cameras can be to adjust internal LED illumination while acquiring images of the interior portion with the cameras. For example, if the camera is only capable of capturing images in black and white, the internal LEDs can illuminate sequentially in red, green, and blue, capturing three separate images. The resulting images can then be combined to create a full color RGB image. If external illumination is causing problems with shadows or external lighting effects, the internal lighting can be turned off while a picture is taken, then turned on while a second picture is taken. By subtracting the two on a pixel-by-pixel basis, ambient light can be cancelled out so that it can be determined what the image looks like when illuminated only by internal lights. If lighting is movable, for example on the translation arm of the CNC machine 100, it can be moved around while multiple pictures are taken, then combined, to achieve an image with more even lighting. The brightness of the internal lights can also be varied like the flash in a traditional camera to assist with illumination. The lighting can be moved to a location where it better illuminates an area of interest, for example so it shines straight down a slot formed by a cut, so a camera can see the bottom of the cut. If the internal lighting is interfering, it can be turned off while the camera takes an image. Optionally, the lighting can be turned off for such a brief period that the viewer does not notice (e.g., for less than a second, less than $\frac{1}{60}^{th}$ of a second, or less than $\frac{1}{120}^{th}$ of a second). Conversely, the internal lighting may be momentarily brightened like a camera flash to capture a picture. Specialized lights may be used and/or engaged only when needed; for example, an invisible but UV-fluorescent ink might be present on the material. When scanning for a barcode, UV illumination might be briefly flashed while a picture is captured so that any ink present would be illuminated. The same technique of altering the lighting conditions can be performed by toggling the range-finding and/or cutting lasers as well, to isolate their signature and/or effects when imaging. If the object (or camera) moves between acquisitions, then the images can be cropped, translated, expanded, rotated, and so on, to obtain images that share common features in order to allow subtraction. This differencing technique is preferably done with automatic adjustments in the cameras are overridden or disabled. For example, disabling autofocus, flashes, etc. Features that can ideally be held constant between images can include, for example, aperture, shutter speed, white balance, etc. In this way, the changes in the two images are due only to differences from the lighting and not due to adjustment in the optical system.

Multiple cameras, or a single camera moved to different locations in the CNC machine 100, can provide images from different angles to generate 3D representations of the surface of the material 140 or an object. The 3D representations can be used for generating 3D models, for measuring the depth that an engraving or laser operation produced, or providing feedback to the CNC machine 100 or a user during the manufacturing process. It can also be used for scanning, to build a model of the material 140 for replication.

The camera can be used to record photos and video that the user can use to share their progress. Automatic "making of" sequences can be created that stitch together various still and video images along with additional sound and imagery, for example the digital rendering of the source file or the user's picture from a social network. Knowledge of the motion plan, or even the control of the cameras via the motion plan directly, can enable a variety of optimizations. In one example, given a machine with two cameras, one of which is mounted in the head and one of which is mounted in the lid, the final video can be created with footage from the head camera at any time that the gantry is directed to a location that is known to obscure the lid camera. In another example, the cameras can be instructed to reduce their aperture size, reducing the amount of light let in, when the machine's internal lights are activated. In another example, if the machine is a laser cutter/engraver and activating the laser causes a camera located in the head to become overloaded and useless, footage from that camera may be discarded when it is unavailable. In another example, elements of the motion plan may be coordinated with the camera recording for optimal visual or audio effect, for example fading up the interior lights before the cut or driving the motors in a coordinated fashion to sweep the head camera across the material for a final view of the work result. In another example, sensor data collected by the system might be used to select camera images; for example, a still photo of the user might be captured from a camera mounted in the lid when an accelerometer, gyroscope, or other sensor in the lid detects that the lid has been opened and it has reached the optimal angle. In another example, recording of video might cease if an error condition is detected, such as the lid being opened unexpectedly during a machining operation. The video can be automatically edited using information like the total duration of the cut file to eliminate or speed up monotonous events; for example, if the laser must make 400 holes, then that section of the cut plan could be shown at high speed. Traditionally, these decisions must all be made by reviewing the final footage, with little or no a priori knowledge of what they contain. Pre-selecting the footage (and even coordinating its capture) can allow higher quality video and much less time spent editing it. Video and images from the production process can be automatically stitched together in a variety of fashions, including stop motion with images, interleaving video with stills, and combining video and photography with computer-generated imagery, e.g., a 3D or 2D model of the item being rendered. Video can also be enhanced with media from other sources, such as pictures taken with the user's camera of the final product.

Additional features that can be included individually, or in any combination, are described in the sections below.

Sealed Optical System

Figure 5:
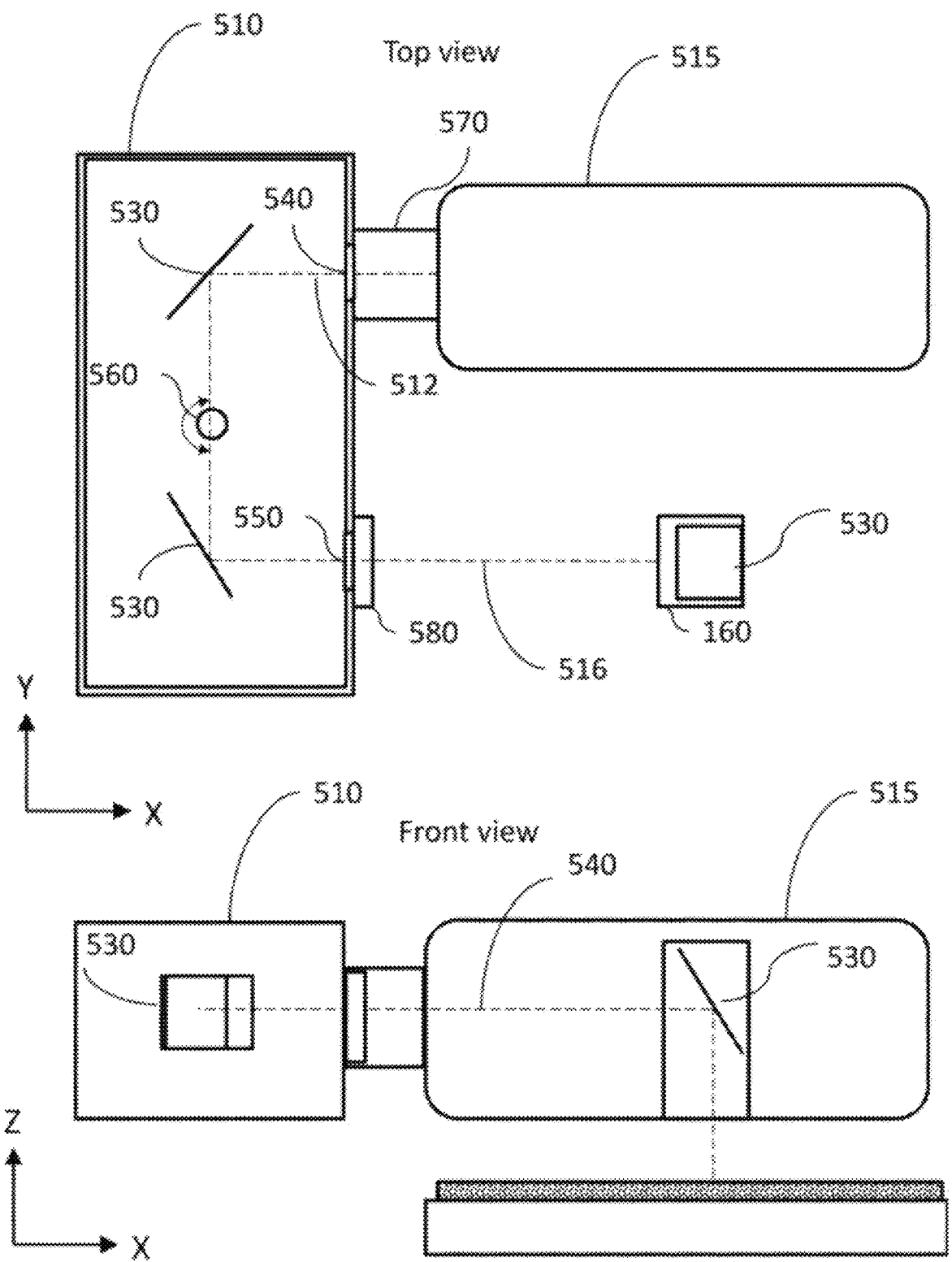
FIG. 5 is a diagram illustrating a sealed optical system, consistent with some implementations of the current subject matter.

FIG. 5 is a diagram illustrating a sealed optical system 510, consistent with some implementations of the current subject matter. The top portion of FIG. 5 illustrates a top view and the bottom portion of FIG. 5 illustrates a bottom view where the laser beam is directed down from the head to the material. In one implementation, for example where the CNC machine 100 acts as a laser cutter, there can be a sealed optical system 510 to guide the laser beam 516 from the laser 515 to the head 160. As described below, the sealed optical system 510 can be combined with the laser 515 to result in a closed system where one or more of the turning mirrors or laser optics are prevented from being exposed to outside (or otherwise contaminated) air, with the possible exception of the outermost optic, which can be a flat aperture acting as a window that can be easily accessed and cleaned. The outermost optic could also be a lens.

While some implementations describe two turning mirrors in a sealed optical system, other implementations can include any number of turning mirrors, lenses, or other optical components fixed in non-adjustable positions. Such implementations can be in a sealed optical system, but can also be in an optical system that is not sealed from the remainder of the CNC machine interior volume. For example, the non-adjustable optical components can be not enclosed by anything other than the CNC machine housing.

In one implementation, the sealed optical system 510 can include an entry aperture 540, a housing, two turning mirrors 530 oriented at a fixed angle to each other which in one implementation is 90°, and a window attached to an exit aperture 580. The sealed optical system 510 can also include one or more pivots, possibly on different axes, to allow the sealed optical system 510 to rotate, thus changing the angle of the fixed turning mirrors 530 relative to the incoming laser beam 512. The mirrors can also be mounted so that they are independently adjustable within the sealed optical system 510. In the example shown where the axis of the pivot is perpendicular to the diagram and the angle of the mirrors is 90°, by adjusting the angle of the sealed optical system 510, the separation of the incoming laser beam 512 and the outgoing laser beam 516 can be adjusted without affecting the angle of the final beam 516, as would occur if a single mirror 530 was adjusted independently. Because in this example the turning mirrors 530 are oriented to always result in a 180 degree turn regardless of the angle of the sealed optical system 510, rotating the sealed optical system 510 only translates the outgoing laser beam 516 while retaining parallelism between the incoming laser beam 512 and the outgoing laser beam 516. Such a translation can be adjusted to align the laser beam to optical elements in the head 160.

Strategies for Engineering Robustness into Sealed Optical Systems

Minimization of Beam Path

In an extension to the above implementation, a strategy for minimizing laser beam alignment errors, may involve engineering or optimizing the system such that the beam path is as short as possible. Reducing the length of the beam path may achieve benefits including better overall alignment of the optical system, due to the corresponding reduction in (even small) error propagation over shorter distances. As an example, the laser tube and its associated beam path may be housed or affixed directly to the moving rail of the CNC machine and moved in tandem.

Use of Fixed and/or Partially-Fixed Mirrors

Another extension to the above implementation, is the use of fixed or partially-fixed mirrors (i.e., mirrors that may be able to rotate in one dimension but not two) which may be exploited to reduce or remove the hazardous requirements for users to perform manual mirror alignments or adjustments (e.g., misalignments that may occur from CNC machine vibration during shipping, transportation, operations or other movements). Removal of the dependence on manual adjustability of the laser, thus increases the importance of reliable and robust manufacturing. Consequently, a variety of novel engineering approaches that are intended to endure for much of the life of the machine may be implemented to improve the quality of the product by reducing manufacturing variability, tolerances, etc. For example, one implementation for increasing the rigidity of a mirror's position, may involve the use of at least one fixture designed for this purpose; one such example may include a fixture that a mirror slides into and is held in a fixed place, for example by a spring. In a different approach, an adjustable fixture may be used, but the adjustment mechanisms are permanently fixed at the factory, preventing both drift due to mechanical stress and user-initiated adjustments.

Figure 6:
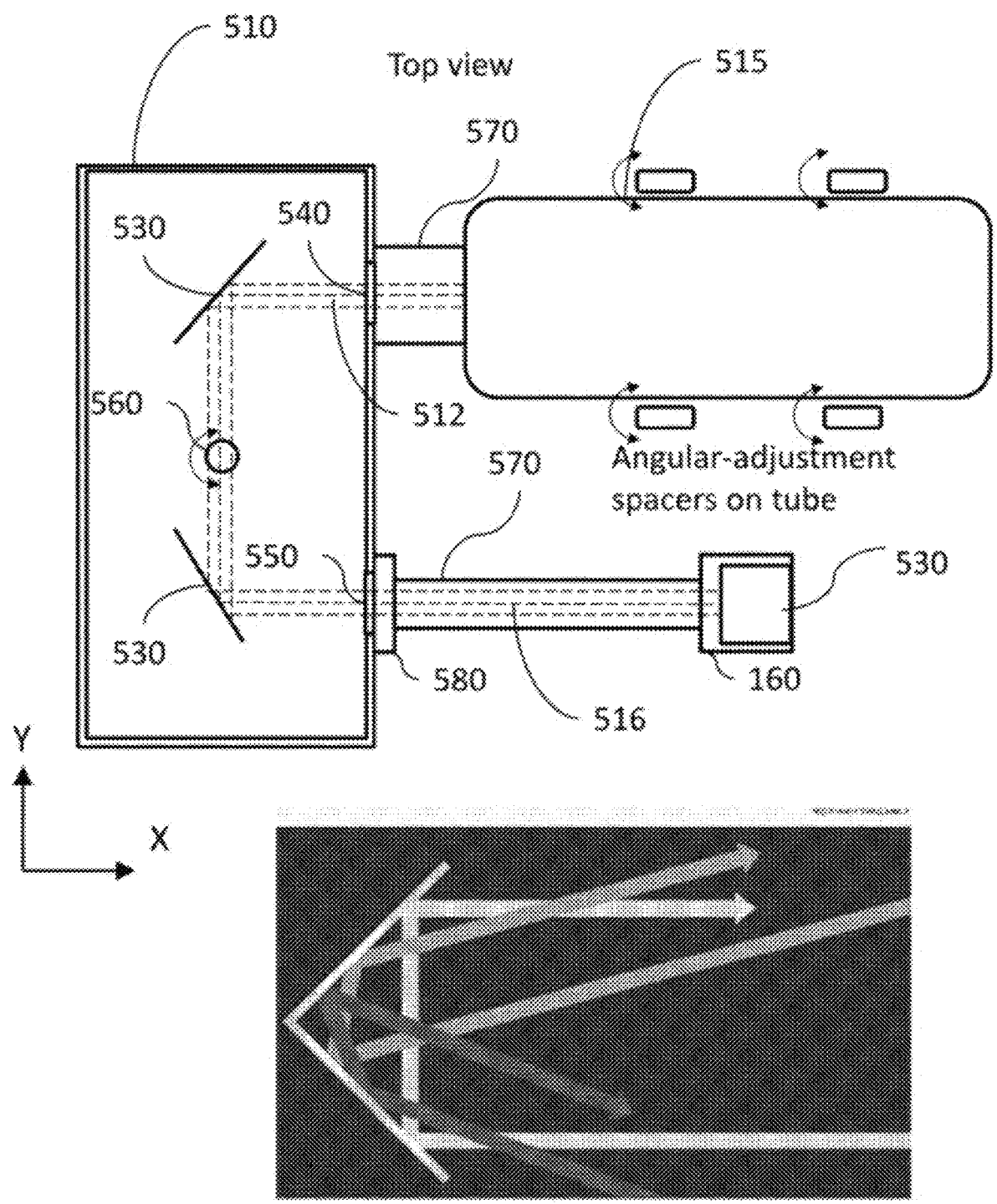
FIG. 6 is a diagram illustrating optical components acting as a retroreflector, consistent with some implementations of the current subject matter.

FIG. 6 is a diagram illustrating optical components acting as a retroreflector, consistent with some implementations of the current subject matter. Another non-encompassing example involves the exit aperture from the laser tube; in the present implementation, the beam is engineered to exit in parallel, however location of the exit aperture may vary due to manufacturing variations, (e.g., laser tube defects). This is illustrated in the top portion of FIG. 6, by the multiple possible beam paths that could result from a misalignment. In this instance, the angle of the tube may be the subject of angular corrections, for example via the use of spacers or other such fittings that serve to maintain parallelism of the beam and the rail. These spacers can adjust offsets or angular displacements of the laser or other optical components. In some implementations, the spacers can pivot, as shown in FIG. 6. In other implementations, the spacers can be linearly offset to position the laser at a particular angle. For example, the right pair set of spacers can be offset in the +Y direction from the left pair of spacers. This would give the laser an angular tilt resulting in the laser housing having an angle going down and to the left. Such an adjustment can be implemented to correct for a laser tube or lens that was causing the laser to have an undesired angle up and to the left, when exiting the laser housing.

In combining several of the above approaches, it is possible to exploit fixed the relationships between the beam, the rail and the head to achieve robust optical alignment and positioning. For instance, utilization of 90 degree angles between components, as shown earlier in FIG. 6, creates a retroreflector, which ensures that the exiting beam is parallel to the incoming beam. A simplified example of a retroreflector is shown in the bottom portion of FIG. 6, where two mirrors oriented at 90 degrees relative to each other maintain parallelism between incoming and outgoing light rays. Introduction of a pivot point within the precise center of the retroreflector permits single-axis rotation, allowing for translation of the beam. The combination of these approaches ensures the beam coming out of the laser tube is parallel to rail, and re-confirms this parallelism to the rail and head after the turning mirrors direct the desired turn back into the laser work area.

Figure 7:
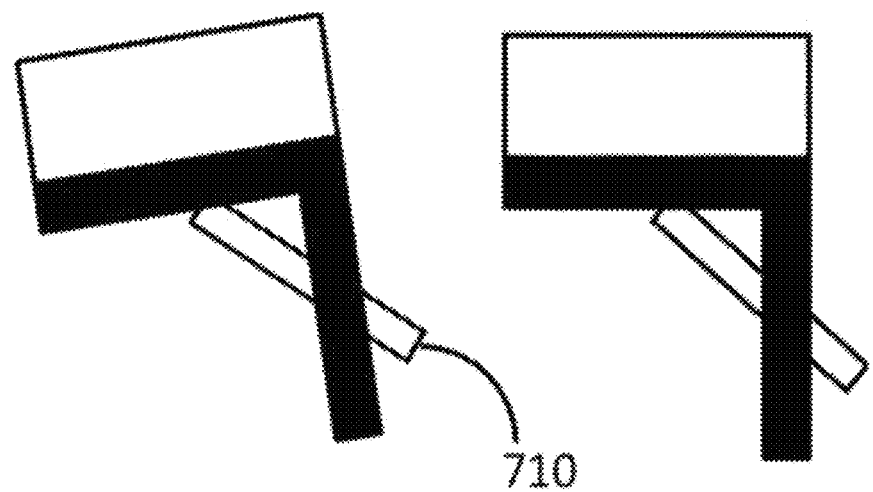
FIG. 7 is a diagram illustrating a correction mechanism to adjust vertical tilt on a retroreflector, consistent with some implementations of the current subject matter.

FIG. 7 is a diagram illustrating a correction mechanism to adjust vertical tilt on a retroreflector, consistent with some implementations of the current subject matter. In some implementations, there can be a two-mirror retroreflector, guaranteeing that the beam comes out parallel to the incoming beam in the X plane. However, it can still tilt up and down in the Y plane. To remedy this, the mirrors can be mounted on a folded bracket that is manufactured to an incorrect angle, and includes a screw 710 that can be used to drive the bracket to the correct angle. The bracket can be driven to the correct angle at the factory, and the screw may be locked in place with adhesive.

In other implementations, instead of a two-mirror retroreflector, three mirrors may be arranged as in the corner of a cube. In this case, the exiting laser beam is guaranteed to be parallel to the incoming laser beam both horizontally and vertically, and this adjustment is not required.

Optical Windows

The windows can be any sort of removable optical window suitable for the transmission of laser light from the sealed optical system 510 to the head 160. In one example, the laser light wavelength can be 10.6 microns emitted from a carbon dioxide laser, and the window can be Zinc Selenide (ZnSe). The windows can act to substantially seal the sealed optical system 510 against air which can contain dust, smoke, or other contaminants that can coat any of the other optical elements in the sealed optical system 510 or in the laser 515. In place of a window, in the laser 515 or head 160, pressurized air can be introduced by means of a fan or a compressed air line, preventing contaminants from entering by maintaining positive pressure in the enclosure. Alternatively, the exit aperture 550 can simply be extended, optionally with baffles, to prevent contaminants from migrating into the sealed optical system 510. Other techniques can be used to reduce or eliminate contamination of the output window including, the direction of clean air at the window, the design of airflow in the system so that dirty air is not directly routed at the window, and other measures.

Additional Strategies for Establishing Optical Alignment

As described above, there can be any number of turning mirrors, or other optical elements, oriented at a fixed angle to each other to deliver electromagnetic energy from a laser to the material. In some implementations, at least one of the turning mirrors can be mounted at the fixed angle, for example, by adding one or more spacers until a correct angle is achieved. Also, for the turning mirrors mounted at the fixed angle, they cannot be adjusted to change the fixed angle after being mounted. For example, the mirror can be mounted in a particular position or orientation during the manufacturing or assembly process, but thereafter, it cannot be adjusted without removing or damaging the turning mirror or the mounting holding the turning mirror. In other implementations, each of the turning mirrors cannot be adjusted to change the fixed angle after the mounting of each of the turning mirrors.

In some implementations, a turning mirror can be in a mount formed from the housing of the computer numerically controlled machine. In other implementations, the turning mirror can be in a removable mount fixedly attached to the computer numerically controlled machine and is not adjustable to change the fixed angle. For example, a turning mirror can be placed into a mount that can be attached to the CNC machine with fasteners, magnetic retainers, compression fittings, or the like. The mount and turning mirror can be removed from the CNC machine, but when fully and properly mounted, can have an orientation and position that only results in the fixed angle.

In yet other implementations, there can be an adjustment mechanism configured to adjust a position or an orientation of the turning mirrors simultaneously without changing the fixed angle. For example, the sealed optical system contains a pivot that allows the sealed optical system to rotate about the pivot. As a result, the relative orientation of the turning mirrors in the sealed optical system does not change as the angle between the turning mirrors can remain fixed. In other examples, it is possible to rotate about a point which is coaxial with the desired optical center of the system.

In another implementation, one or more of the turning mirrors can be at a fixed angle relative to some, but not necessarily all, of the other turning mirrors or optical elements. For example, referring to FIG. 5, the laser head can move horizontally relative to the turning mirror closest to it. This horizontal movement does not change the fixed angle between a coplanar turning mirror in the laser head (not shown, but for example used to direct the laser beam downward). However, this horizontal movement can change the angle with the other turning mirror because the horizontal movement is not on the line directly connecting the two mirrors. More generally, in some implementations, the turning mirrors can be fixed at an angle relative to only one adjacent turning mirror. Similarly, in other implementations, the turning mirrors can be fixed at an angle relative to all adjacent optical elements that provide or receive light to or from the particular turning mirror.

In some implementations, there can also be an adjustment mechanism configured to adjust a position or an orientation of the plurality of optical elements simultaneously without changing the fixed angle. The adjustment mechanism can include a pivot located at a center of the optical elements and the optical elements are configured to act as a retroreflector.

The optical components can be affixed in the computer numerically controlled machine that is not adjustable to change an angle or a position of the plurality of optical components after affixing. The affixing can include at least one of welding, screwing, bolting, and gluing.

Additional Strategies for Maintaining Optical Alignment

Over time and repeated use, factors that lead to system wear and tear (including mechanical vibration consistent with normal operation of a CNC machine), can impact the optical alignment system, and may for example, result in misalignment. Engineering strategies that improve the robustness of the system can be adopted to enhance system longevity, reduce servicing requirements, etc.

In one such implementation, this concept extends to engineering the CNC machine's optical components so that the mechanical axis is coincidental with the optical axis. In some cases, this may be achieved by altering the center of mass of optical system components to prevent asymmetric distribution of stress on the overall system that may be caused over time by normal machine vibration. If the center of mass is not directly over the optical axis, the system will pivot around the center of mass, resulting in an asymmetric flexing. The amount of flex (i.e., the moment of inertia around that axis) will be proportional to the differential between the center of mass and the optical axis; if that difference is negligible, then the moment of inertia is effectively zero.

Figure 8:
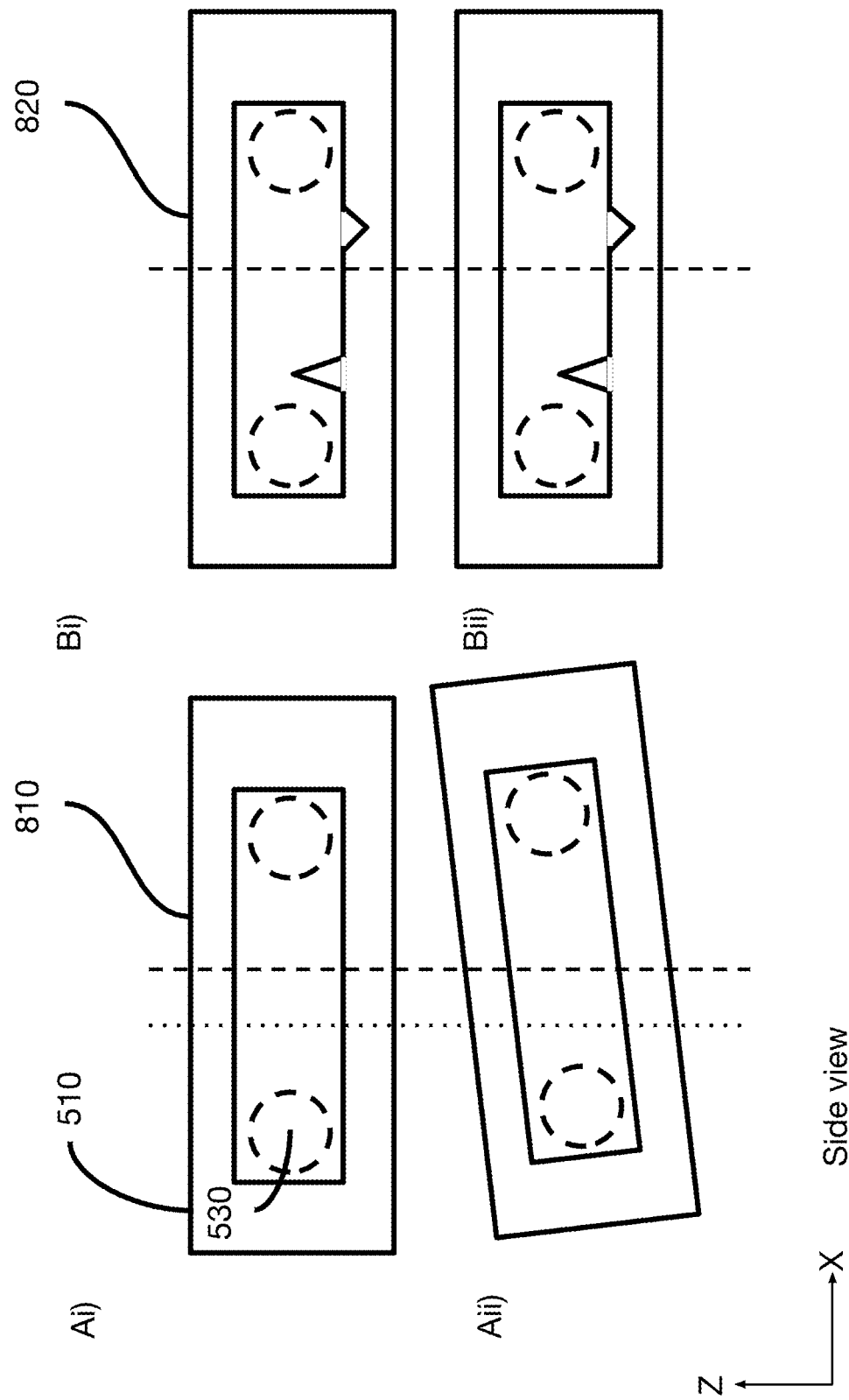
FIG. 8 is a diagram illustrating how the center of mass of optical components may be engineered to minimize its differential from the optical axis, consistent with some implementations of the current subject matter.

FIG. 8 illustrates this concept using the example of a first mirror mount 810, which has a different center of mass than the optical system 510. This differential in the center of mass between the first mirror mount 810 and the optical system 510 may cause mechanical stress on the optical system 510, for instance, as one side of the first mirror mount 810 pivots about its center of mass and rotates downward over time, thereby causing beam misalignment. In such a case, the mirrors 530 may still operation as a retroflector, but the optical system 510 will no longer be correctly aligned.

FIG. 8 further illustrates an example of an engineering strategy for maintaining the alignment of the optical system 510. For instance, the alignment of the optical system 510 may be maintained by redistributing the weight of a second mirror mount 820 such that the center of mass of the second mirror mount 820 is aligned with that of the optical system 510. This may be achieved by a variety of strategies including, for example, machining the second mirror mount 820 in a manner that reduces the overall weight of the second mirror mount 820 is reduced. As shown in FIG. 8, the second mirror mount 820 may include strategic cutouts that reduce the overall weight of the second mirror mount 820. Alternatively and/or additionally, the second mirror mount 820 may be machined to achieve a desired center of mass, for example, which aligns with that of the optical system 510.

Other strategies may be employed to prevent cases of beam misalignment. In one implementation, an auto-alert system may be used to automatically detect system failures over time. For example, a system that measures the height of internal components (such as by taking absolute or relative measurements with respect to other components) and monitors for values within accepted bounds is one such strategy that may be employed to flag to users when routine servicing or maintained may be needed. For example, a variety of sensors may be used to determine the positioning of the end-plate either with respect to known parameters (e.g., the distance from the machine bed determined by height sensors, or whether the end-plate is parallel by leveling sensors).

In another implementation, the use of flexible or less-rigid fixtures that resist deforming under mechanical stress may be used. For example, the mirror mount may be composed, in whole or in part, of an elastic mount structure. Alternatively, the use of hinge joints or other mechanisms that reduce the strain on the plate itself may be employed for such a purpose. In yet another implementation, the use of strategically-placed cut-outs on the mirror-plate itself may be engineered such that any distribution of stress acts in a symmetrical way on such fixtures.

While the above features are described with regards to turning mirrors, similar fixed mountings can be applied to any other components of the CNC machine as well, for example, lenses, optical filters, polarizers, components of the laser, the entire laser, the laser head, or the like.

In various implementations of the current subject matter, a system can include a head of a computer numerically controlled machine configured to deliver electromagnetic energy sufficient to cause a change in a material at least partially contained within an interior space of the computer numerically controlled machine. The system can further include an optical system comprising a plurality of optical elements in the computer numerically controlled machine, the plurality of optical elements oriented at a fixed angle to each other to deliver the electromagnetic energy from the head to the material.

The plurality of optical elements can include at least one of a mirror and a lens. At least one of the plurality of optical elements can be mounted at the fixed angle and cannot be adjusted to change the fixed angle after the mounting. Each of the plurality of optical elements cannot be adjusted to change the fixed angle after the mounting of each of the plurality of optical elements. The at least one of the plurality of optical elements can be mounted at the fixed angle at least by adding one or more spacers until a correct angle is achieved. The least one of the plurality of optical elements can be in a mount formed from the housing of the computer numerically controlled machine.

The system may further include an adjustment mechanism configured to adjust a position or an orientation of the plurality of optical elements simultaneously without changing the fixed angle. The adjustment mechanism can include a pivot located at a center of the plurality of optical elements, wherein the plurality of optical elements are configured to act as a retroreflector.

The plurality of optical components can be affixed in the computer numerically controlled machine such that an angle or a position of the plurality of optical components cannot be adjusted after the affixing. The affixing can include at least one of welding, screwing, bolting, and gluing.

The head can be coupled with a moving rail of the computer numerically controlled machine. The head and the moving rail can be configured to move in tandem in order to minimize a path of the electromagnetic energy. The optical system can be associated with a first center of mass. The plurality of optical elements can be associated with a second center of mass. The first center of mass can be aligned with the second center of mass. A weight of at least one of the plurality of optical elements can be reduced in order to align the first center of mass with the second center of mass. The weight of the at least one of the plurality of optical elements can be reduced by at least reducing a weight of a mount housing the at least one of the plurality of optical elements. The weight of the mount can be reduced by machining the mount to include one or more cutouts. At least one of the plurality of optical elements can be housed in an elastic mount configured to reduce mechanical stress against the optical system.

Real-Time Motion Planner

Figure 9:
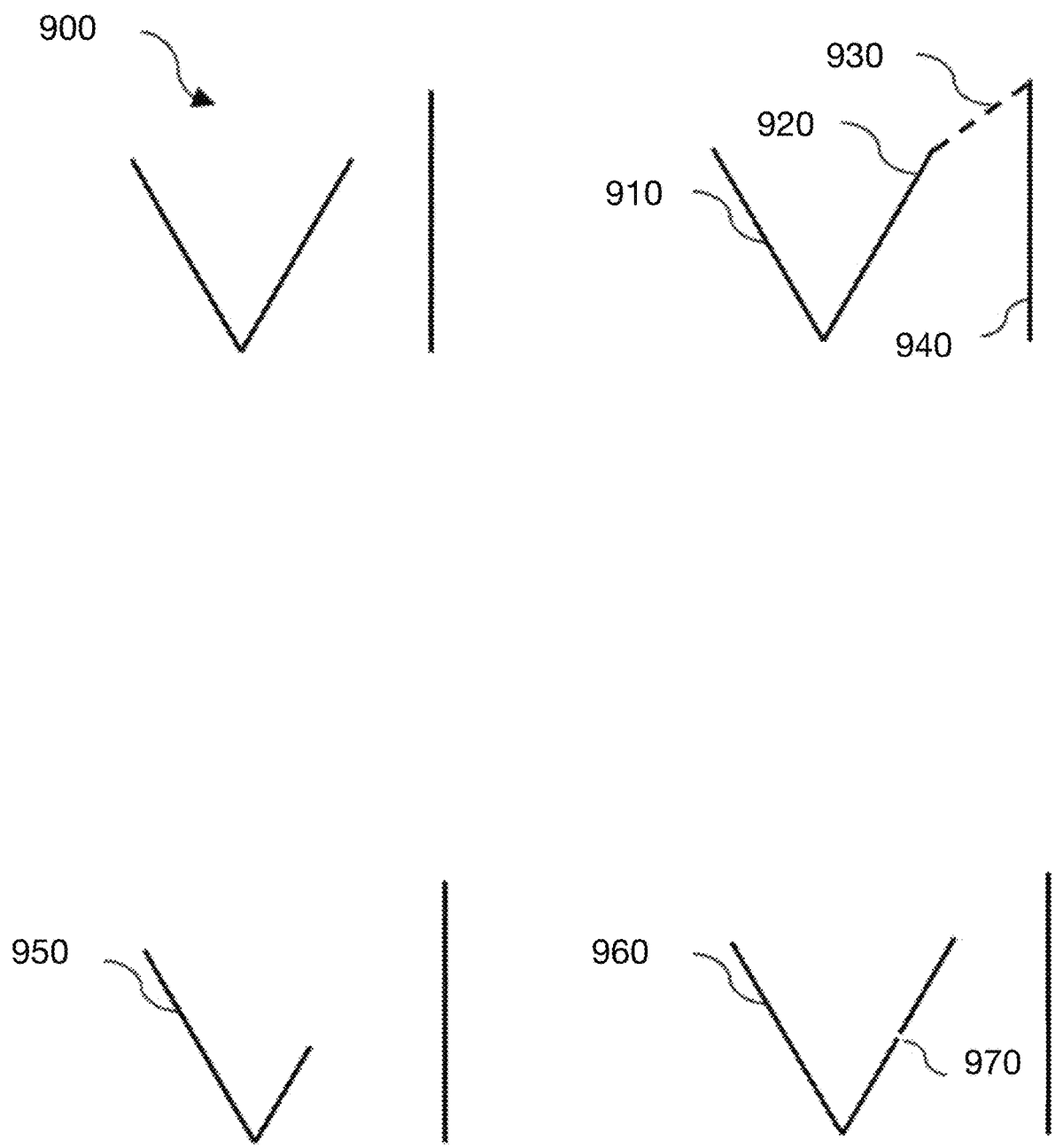
FIG. 9 is a diagram illustrating an example of determination of a safe pause point in a motion and/or execution plan for a CNC machine, consistent with some implementations of the current subject matter.

FIG. 9 is a diagram illustrating an example of determination of a safe pause point in a motion and/or execution plan for a CNC machine consistent with some implementations of the current subject matter. Currently available CNC machines typically operate by having a machine file, for example in the G-code language, loaded on to it. A motion planner executing on the CNC machine calculates the motions required by the actuators (such as steppers and servomotors) based on the machine file and causes execution of these motions in realtime or near-realtime. The execution of such a motion planner must be fast enough that it can generate new elements of the motion plan as quickly as the machine can execute them, and will often make tradeoffs in accuracy to ensure that it presents the next set of output data to the actuators when required. While there may be a small buffer in case of instantaneous delay, the design assumes that the motion planner is fast enough and coupled closely enough to the actual CNC machine that a loss of connection between the motion planner and CNC machine is not possible.

An alternate approach in which the CNC machine and the motion planner are separated is possible consistent with implementations of the current subject matter. In this case, the CNC machine and the one or more processors implementing the motion planner may be connected by a cable such as a USB cable or a network such as the Internet, a local area network, a wide area network, or the like. In such a configuration, the data connection between the motion planner and the CNC machine may be cut, data transmission may be slow or lossy (e.g., data packets might be delayed or lost), and/or other issues may affect reliability and timeliness of receipt of commands from the motion planner at the CNC machine.

Use of a motion planner implemented on a computing device separate from the CNC machine can present a number of challenges, including but not limited to handling of a connectivity difficulty between the two machines (CNC and motion planner) that occurs midway through a fabrication operation. Such an occurrence is unlikely in conventional approaches in which the motion planner is integrated into the CNC machine. In contrast, it is virtually guaranteed to occur when the motion planner is connected to the CNC via a network. When the motion planner is integrated in the CNC machine, an interrupted motion plan would result in the work aborting and tremendous manual effort required to restart it, with a likely outcome that the fabrication process does not turn out entirely as intended. For example, the laser might turn off suddenly, and realigning it so it can be restarted can be a manual undertaking that may result in noticeable imperfections.

Despite these challenges, a configuration consistent with implementations of the current subject matter in which the motion planner is not implemented on a same machine or on machine that is directly connected to the CNC machine can be highly desirable. CNC machines that incorporate the motion planner must include the motion planner in their cost, which can be a substantial price, especially for advanced motion planners that calculate second, third, fourth, and higher order derivatives of position and forces on the machine in order to minimize wear and provide optimal results. If the motion planner is connected via the Internet, it may be a resource that is shared among many machines. In another improvement that may be possible with one or more implementations of the current subject matter, CNC machines that integrate the motion planner generally impose a realtime requirement. In other words, they must include sufficient processing power to keep up with the motion of the machine. As a result, such motion planners can require a tradeoff between accuracy (performing more calculations per unit of time) and cost (including a more expensive processor that can complete those calculations). In another improvement that may be possible with one or more implementations of the current subject matter, using a separate motion planner can allow repurposing of a general-purpose computer, such as a high powered workstation or server in a cloud hosting provider, temporarily for the execution of the machining operation, before returning it to other, non-machining-related tasks.

The following describes two example approaches to addressing challenges that may arise with implementations of the current subject matter in which the motion planner and CNC machine are separated.

In a first approach, the motion planner can calculate the motion plan in motion plan or execution plan segments. Each segment contains the instructions to perform a series of useful machining operations, and then instructions to put the CNC machine in a state where it may be safely paused and then resumed. This state is referred to elsewhere herein as a safe pause point, and can optionally include a state in which a moveable head of the CNC device is not moving and/or moving but not cutting. Optionally, the safe pause point can be an end of the motion plan. A motion or execution plan segment consistent with this implementation of the current subject matter can be limited to the size of a buffer present on the CNC machine, so it may be loaded into that buffer in its entirety. A segment may contain the entirety of a machining operation, or it may contain a portion of it and the instructions to reach a next safe pause point.

A simple example is illustrated in the diagram of FIG. 9, which shows features of a machining operation that uses a laser cutter/engraver to engrave the letters "v1" 900. The required operations are as follows:

1) laser turn on instruction
2) downward-right line 910
3) upward-right line 920
4) laser turn off instruction
5) upward-right line 930
6) laser turn on
7) downward line 940
8) laser turn off Note that these are inputs to the motion planner. The output of the motion planner—the motion plan—is a series of instructions such as electrical impulses that can be used to direct the motors' and other actuators' operations. A typical motion planner would calculate the electrical impulses to implement these commands and send them to the machine in real-time. If the motion planner was suddenly disconnected from the laser during upward-right line 920, the material might be wasted. It might be possible to order the machine to continue the motion plan from the downward-right line 910, but then part of the plan would be performed twice, resulting in possible damage to the material as the laser revisited the already-processed material; alternately, the motion plan might be instructed to resume from the downward line 940, resulting in an incomplete machining operation 950.

While an interruption in communication between the motion planner and the CNC machine is relatively unlikely in the typical case of a motion planner integrated into the CNC machine, it can be a relatively frequent occurrence if the CNC machine and motion planner are not integrated.

A segmented file consistent with implementations of the current subject matter can be created based on a consideration of a maximum buffer capacity of the CNC machine, which in the case of this example might hold the electrical impulses needed to implement the first six commands. Rather than sending the motion plan for all six commands to the laser, the motion planner can instead identify a point (or points) at which the execution of the motion plan could be paused and resumed without affecting the final output. In this example, that would be anywhere during the upward-right line 930 that occurs when the laser is off. The motion planner can therefore create a segment with the impulses for the first five commands and send this segment to the CNC machine. The CNC machine would wait until the motion plan for all five commands were stored in its buffer (e.g., until the full segment was received), and then execute the commands in the segment. Under normal operation, the motion planner would prepare and the machine would receive a second segment, completing the machining operation, before the first one was complete. However, if the motion planner were slow, for example an underpowered computer, or if the second segment were delayed, for example by network traffic, a network disconnection or failure (for example by someone tripping over the cable), then the CNC machine can be able to pause in a resumable condition safely, with the laser off, awaiting further commands. It can be possible to include more data past the end of the segment, for example the start of the next segment, as long as the safe pausing point—the termination of the segment—is clearly identified should the full next segment not be received before reaching the end of the prior segment.

A second approach besides segmenting is also within the scope of the current subject matter. Instead of segmenting the motion or execution plan into one or more segments with a safe pause point, the CNC machine can be optimized to allow pausing and resuming at any point. This approach may still result in some perceptible physical effects of pausing and resuming in the final product. However, when applied carefully consistent with implementations of the current subject matter, such errors can be minimized.

To implement this second approach, the motion plan can be streamed from the motion planner in the usual fashion. However, if there is an interruption, the CNC machine can take responsibility for arranging for a "graceful" pause and subsequent resumption of operations. One or more of a number of tactics may be used to optimize this outcome. First, the machine may precisely note the time of the data interruption or identify the last instruction executed or the final piece of motion plan data fed to the motors. A sufficiently capable motion planner knows a great deal of information about the system at every instant: e.g., position, velocity, laser tube output power, etc. Provided with nothing more than the time at which data ceased to arrive or final instruction, it may be capable of calculating a new motion plan that can resume the machining operation with minimal disruption. For example, in the case of a laser, the motion planner may command a replay of the entirety of the motion plan up to the moment of interruption with the laser off, then turn on the laser very close if not precisely at the point in the motion plan at which the interruption occurred. Alternately, the motion planner may truncate the majority of the motion plan, and instead arrange for the moveable components to achieve the correct position, speed, and other parameters necessary to resume the cut. Note that lasers affect materials based on their speed as well as their power, so it is not sufficient to simply locate the original position.

Second, with contact with the motion planner interrupted, the CNC machine may use a locally-generated or pre-calculated motion plan to bring the machine to a safe stop.

This approach can include turning off the laser in the case of a laser cutter. A sudden stop can cause problems such as missed steps on a stepper motor, so the machine might instead bring the moveable components to a gradual stop.

Third, at some point after the pause occurs, the CNC machine may use onboard sensors to detect a state of the system. For example, the CNC machine may use a camera to detect where the cutline ended, or position sensors to detect where the head is after shutdown, or other parameters that would assist with the system restart. Finally, a revised motion plan can be created and executed that, as closely as possible, resumes the state of the laser at the moment when the last data was executed. This approach may suffer from minor defects, such as a small break 970 on the right side of the 'v' in cut 960 as the resumed motion was not able to perfectly align with the previously terminated motion, but it can come close, in many cases imperceptibly so.

This approach may also be used for interruptions not caused by a disconnection from the motion planner. For example, existing laser cutters will shut off the laser immediately if their safety interlock is tripped, for example if the door is open. However, they do not have the ability to resume seamlessly if the user closes the interlock. The same safe-pause techniques may be used to arrange for a graceful resumption of machining after a user-induced stop.

Lasers are particularly well suited for this type of behavior, because they can turn off the laser at a moment's notice. Other types of machines may be able to implement this functionality by, for example, having a mill bit halt or retract quickly, having a waterjet shut off, or similar immediate cessation of operation.

Interruptions that may occur during processing typically require a halt to all processing. Halting operations may be achieved via numerous methods, including issuing an instruction to arrest actions and/or remove power from systems (although this may cause mechanical strain or misalignment), calculating a new motion plan or looking up a suitable motion plan from a remote or local processer and attempting to, for example, execute it rapidly to effect a controlled halt to operations, or by changing the speed at which the existing motion plan is followed, for example decreasing the playback speed of a precomputed motion plan so as to bring it to a halt in a controlled fashion.

Changing Speed of an Existing Motion Plan for Safe Pause and Resumption

Figure 10:
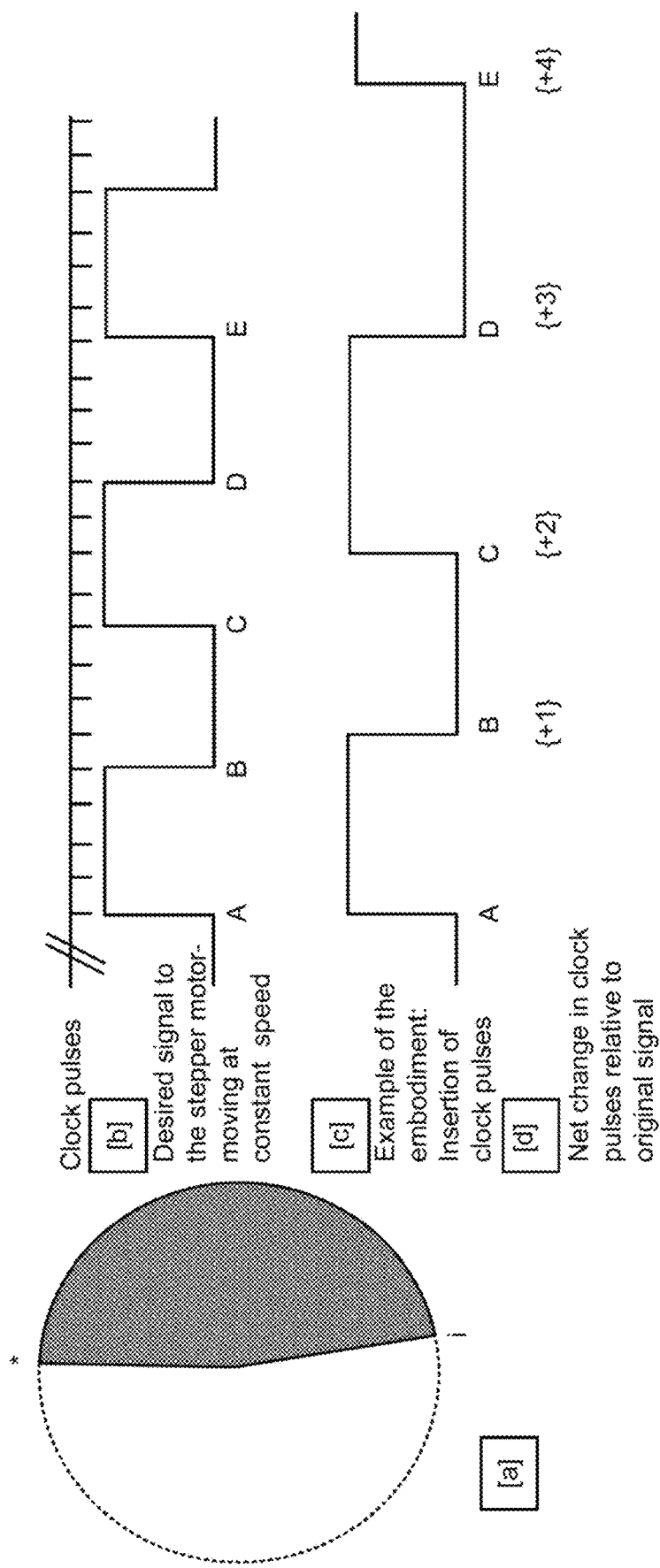
FIG. 10 is a diagram illustrating an example of altering a rate of execution of a motion and/or execution plan for a CNC machine, consistent with some implementations of the current subject matter.

FIG. 10 is a diagram illustrating an example of altering a rate of execution of a motion and/or execution plan for a CNC machine, consistent with some implementations of the current subject matter. In some implementations, the CNC machine can determine that a moveable component needs to halt, slow, or otherwise be interrupted from execution of the normal motion plan (e.g., a safety interlock triggering indicating a user has opened the machine during processing). In response, in some implementations, the motion plan can incorporate a "delay factor" associated with one or more types of operational instructions. This can effectively cause a reduction in motion plan implementation speed. Accordingly, the consideration of the delay factor can cause a reduction in speed, velocity, or higher order derivatives of the motion of the moveable component. As the delay factor approaches infinity, this can have the effect of creating a "safe pause," that is a cessation of motion in a known state without exceeding operational constraints such as maximum speed and acceleration, without the requirement for any motion plan re-computation. In this way, the temporal component of operational instructions (e.g., pulsed instructions), may be altered in this manner without requiring re-calculation by the motion plan when changing circumstances make the original motion plan suboptimal.

In some implementations, shown by the example in FIG. 10, a system can have a component that can be moved by a stepper motor and used to cause a desired change in a material, shown as tracing a circular path by FIG. 10[*a*]. The circle illustrates that the circular motion of the moveable component begins at the top of the circle, marked with a * in FIG. 10[*a*]. The motion plan executes normally until an interrupt is executed at position i on the circle. The dashed line indicates the uncompleted part of the motion plan after the point of interruption. In this example, an interruption (e.g., sudden opening of the lid) can require the stepper motor to be halted (as shown at point i in FIG. 10[*a*]).

FIG. 10 [*b*] illustrates an example signal to the stepper motor when the motor is moving at a steady speed along the X axis of motion. In FIG. 10 [*b*], a train of clock pulses are shown which indicate the times at which transitions may be requested of the stepper motor signal line. The signal line transitions are labeled A-E, where, for example, A indicates a low-to-high to the step line of the stepper motor driver, for example instructing the motor to take one step. The high input remains for 4 clock pulses. Then, at B, the signal to the stepper motor goes low, for example having no effect except to prepare the line for the next transition. The low input remains for 4 clock pulses, and so on.

A delay factor can be any kind of delay or time factor associated with motion of the moveable component. In the example of FIG. 10, the delay factor is implemented relative to clock pulses associated with or generated by a processor. A clock pulse can be generated at a given time interval, such as a second, millisecond, or the like. In other implementations, a clock pulse can be a periodic output of another device, such as a processor, timer, circuit, or the like. In the specific example of FIG. 10 [*b*], the time constant is 4 clock pulses. According to the original motion plan, this can cause a step to occur every 4 clock pulses.

FIG. 10 [*c*] illustrates an example of lengthening the intervals between signals sent to the stepper motor by repeating the designated signal for a number of additional clock cycles designated by the delay factor. In some implementations, a time constant associated with movement of the moveable component, for example a stepper motor, can be altered. The altering can be based on, for example, increasing or decreasing a time constant between signals sent to the stepper motor by the amount of the delay factor.

In one example, a constant positive delay factor slows machine operation by a constant amount. An increasing positive delay factor decelerates machine operation as long as the delay factor increases. A constant negative delay factor speeds machine operation by a constant amount. A decreasing negative delay factor accelerates machine operation as long as the delay factor decreases.

FIG. 10 [*d*] illustrates a steadily increasing delay factor. The delay factor can be lengthened by, for example, repeating instructions a number of times per signal line transition, skipping a number of pulses per signal line transition, slowing the frequency of clock pulses, or any other mechanism that has the effect of slowing playback of the signal line. This can cause an increasingly extended period between each pulsed operation. As a result this can cause gradual slowing of the motion of the stepper motor, for example, to a point where a stepper motor clamp can be safely applied to retain the stepper motor in a halted position. In the example of FIG. 10, instead of signal transition B occurring 4 clock cycles after A, an instruction can be repeated for an additional clock cycle per signal transition as shown in FIG. 10 [*d*], resulting in the signal pattern shown in FIG. 10 [*c*]. Similarly, two repetitions can be inserted between execution of B and C, effectively adding a delay of 2 clock cycles.

In another implementation, rather than inserting additional instructions with the same clock to slow down operation, the existing clock and signal may be delayed by a delay factor. For example, as shown in FIG. 10 [*e*], the clock and signal may be instructed to omit a clock cycle for the first two transitions, then two cycles for the next two transitions, etc. If the step signal is driven by the clock, then simply delaying the clock has the desired effect; if the step signal and clock are generated independently, then both must be delayed.

In another implementation, the frequency of the clock may be slowed, for example changing from 1 kHz to 10 Hz continuously or discontinuously over the course of a minute.

These are only intended as an example; any mechanism for speeding up or slowing down the playback of the motion plan can have the desired effect.

While one stepper line and its associated clock is shown for clarity, it should be understood that this technique may be applied to multiple motors as well as the tool control (for example the laser enable signal in a laser cutter) and other systems to effect the desired behavior of a change of whole system execution speed.

As a result, in some implementations, changing the speed of the stepper motor can be achieved while preserving the intended path of the stepper motor. This can be performed without data-intensive calculations of acceleration curves, etc. In other implementations, when the delay factor (describing the increased number of clock pulses or other method of delaying execution of the motion plan) is calculated (for example in advance), this can provide a gradual enough deceleration of the moving that strain limits are not exceeded for the system. This can have the beneficial effect that the system being controlled, e.g., the stepper motor does not exceed operating parameters, for example, miss a step and land in an unknown position. This approach also conveys the advantage of allowing the system to determine and record the precise state of the system both at the time of the interruption and at the time of the halt, assuming the previous constraint is observed.

While some implementations described herein are cast in terms of adding or removing clock cycles to effectively alter execution of a motion plan, this is not intended to be a limiting example. In other implementations, the altering of the motion plan can include modifying a rate at which portions of a motion plan are received at the CNC machine, causing a mechanical delay in implementation of motion plan instructions, introducing a digital element that buffers instructions to slow them and reduce the output rate, or the like.

Figure 11:
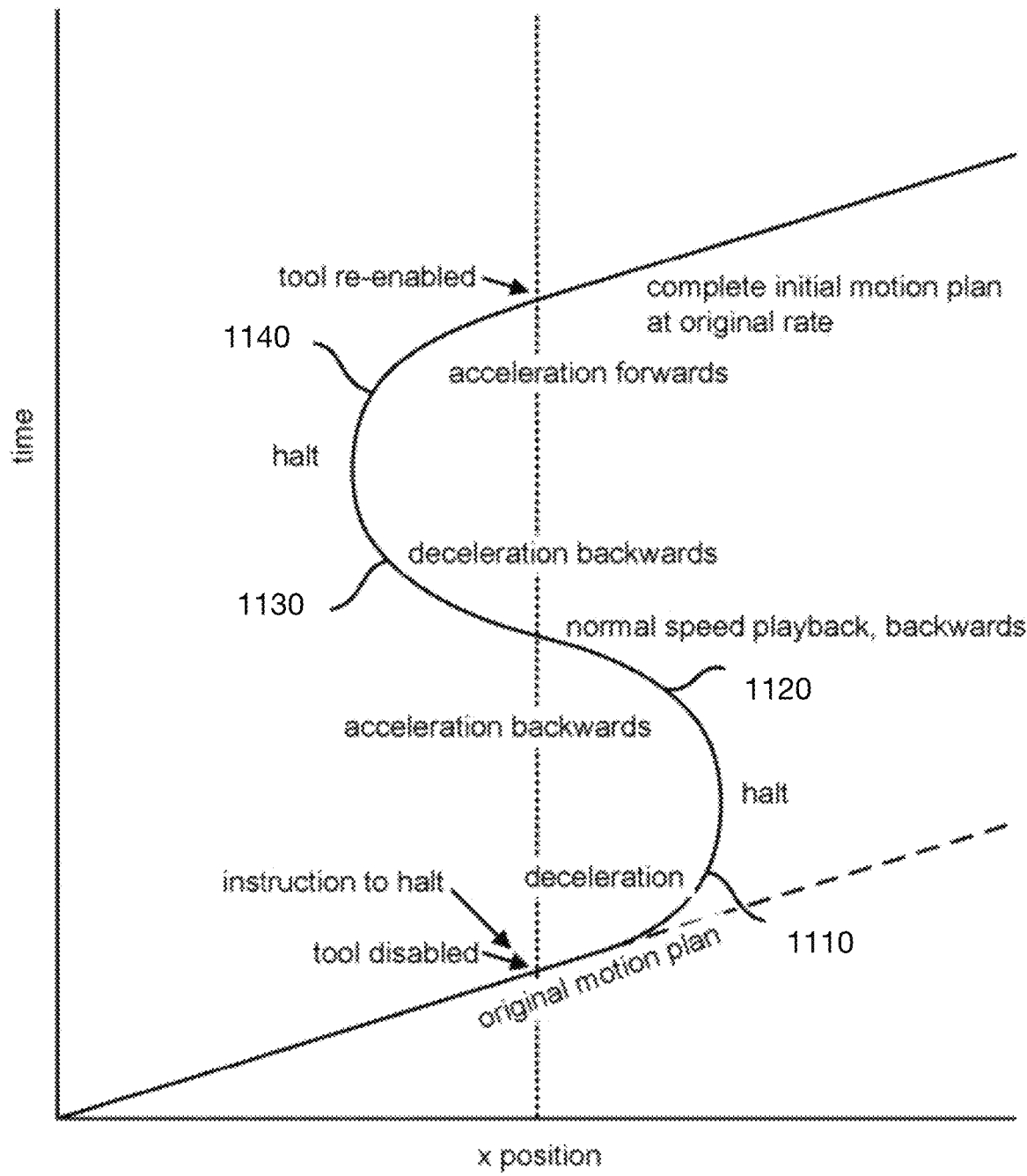
FIG. 11 is a diagram illustrating a resumption of operations in a CNC machine, consistent with some implementations of the current subject matter.
Figure 12:
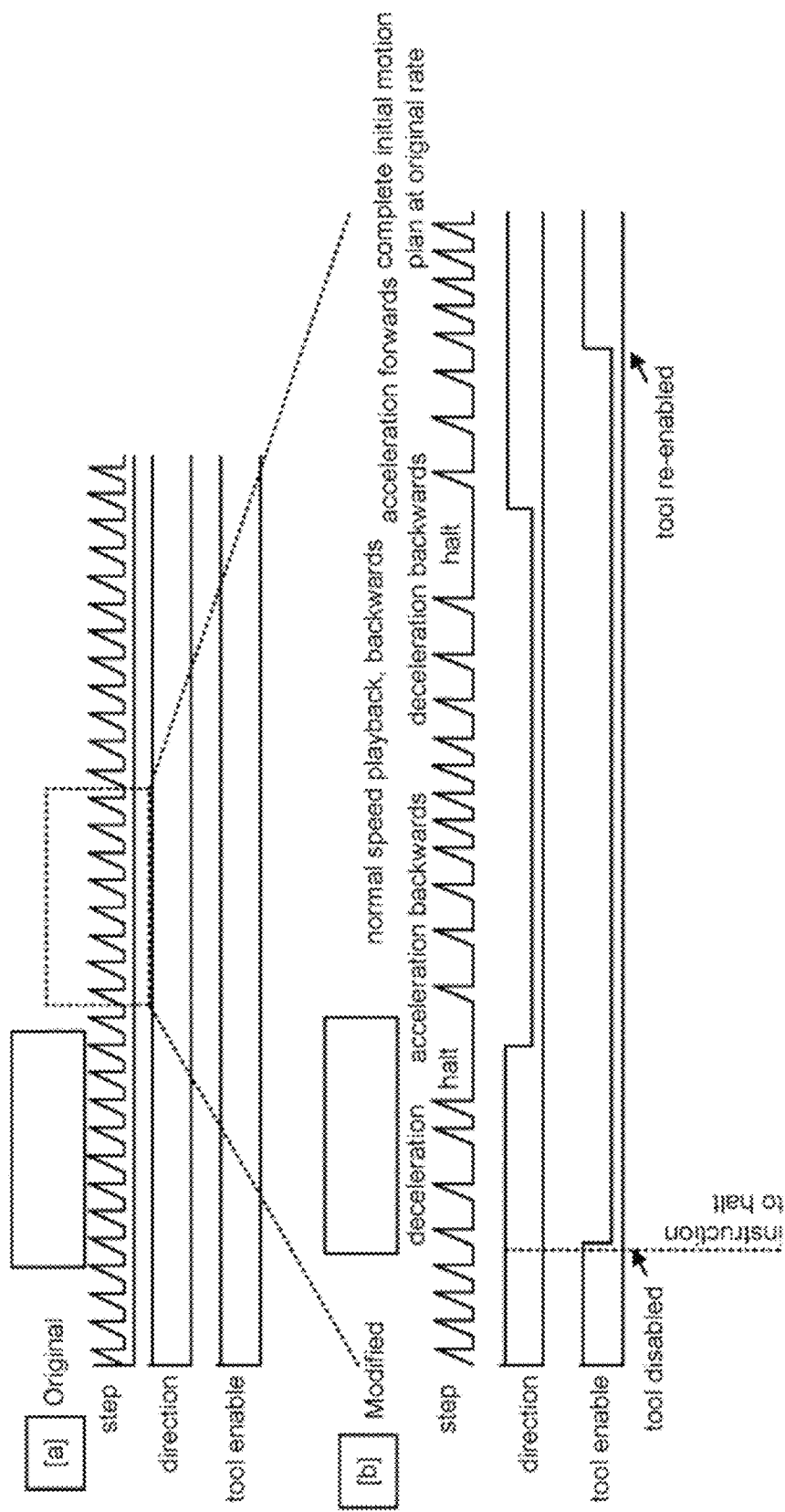
FIG. 12 is a diagram illustrating an altered sequence of pulsed operation described by a motion plan, consistent with some implementations of the current subject matter.

FIG. 11 is a diagram illustrating a resumption of operations in a CNC machine, consistent with some implementations of the current subject matter. FIG. 12 is a diagram illustrating an altered sequence of pulsed operation described by a motion plan, consistent with some implementations of the current subject matter.

In some implementations, precise resumption of operations following a pause can be achieved without additional calculations by playing a portion of the motion plan in reverse, effectively using a negative delay factor. In other implementations, the portion of the motion plan that can be played in reverse can be the portion of the motion plan that was executed at an altered rate to cause a deceleration of a movable component. This can involve copying and mirroring some portions of the delays or time constants applied to the commands for the movable component.

In FIG. 11, the X-axis position of a movable component is shown as plotted against time. Initially, an example original motion plan causes a movable component to have a constant speed on the X axis. However, the machine receives an instruction to halt, and the tool, for example a laser, is immediately disabled. The movable component decelerates, halts, accelerates in the reverse direction, halts again, then accelerates to a point where the motion plan can resume normally, enables the tool, and completes the original motion plan.

In some implementations, motion plan playback can be accelerated (as opposed to just decelerated as described with reference to FIG. 10) by altering the time constant such that is it shortened across a portion of the operating instructions. Shortening of the time constant can be achieved via deletion of clock cycles assigned to operating instructions, removal of repeated instructions, acceleration of the clock frequency, and other means. However, in some cases, this can cause the CNC machine to exceed its operating parameters, for example accelerating too quickly or requesting that the motors move faster than their maximum rated speed.

In the example shown in FIG. 11, a constant velocity movable component is interrupted by receiving an instruction to halt. In some implementations, a resumption of the motion plan can be performed by a combination of playing the altered time constants in a forward or reversed order, and commanding the step taken at each time to be either the original direction or in a reversed direction. FIG. 11 illustrates a deceleration 1110, an acceleration backwards 1120, a deceleration backwards 1130, and an acceleration forwards 1140. The deceleration 1110 can be similar to that described in FIG. 10, where the time constant can be increased to cause a deceleration, which can include an eventual halt, of the movable component. The time for which the movable component is halted is arbitrary and may be zero. To resume operation according to the original motion plan, the deceleration can be played back in reverse, but with the commands to the stepper motor (and/or any other systems) also being issued to cause the movable component to accelerate 1120 backwards in a direction opposite to the original motion plan. When the playback is complete, the movable component should have the same speed as called for in the original motion plan at the time of interrupt, albeit in the opposite direction. Then, a second deceleration 1130 can occur by applying the previous alteration of the time constant, but this time to the movable object which is moving in the reversed direction. This can cause a deceleration substantially identical to that in 1110, resulting in a second halt. Again, the duration of the second halt is arbitrary, and need not be the same as the prior halt. After the second halt, the motion plan can be resumed by accelerating 1140 the movable component. This acceleration 1140 can include, for example, stepping the movable component in the desired direction and, alternatively, reversing the alteration of the time constant in 1110 or replaying the alteration of the time constant in 1120. After the second acceleration 1140, the movable component should have the same velocity as it did before receiving the instruction to halt. The tool, for example the laser, can be reengaged to resume normal operation. FIG. 12 shows plots corresponding to the example of FIG. 11. These plots include pulses to cause steps to be taken, the direction of the movable component, and whether the tool is enabled. It should be noted that steps and stepper motors are used only as an example; other systems under control, such as actuators driven by analog signals (for example galvanometers) or other systems (such as a cooling fan that may be enabled/disenabled) may have their on/off times delayed or accelerated, and/or their operating speed accelerated/decelerated, depending on the desired system behavior.

In some implementations, there may be latency to reengage a tool, for example, a laser turn-on time, a spin-up of a drill bit, etc. In these implementations, the tool can be reengaged to allow sufficient time for the operation of the tool to also be the same as it was when the instruction to halt was received. In either speeding up or slowing down operations, mechanisms to resize waveforms accurately may be used, such as accumulating rounding error and compensating for it in later clock cycles, dithering to improve temporal resolution, etc. For example, if a series of pulses lasting 5 clock cycles is to be extended by 50%, the system may alternate between 7 and 8 clock cycle pulses so as to produce an average pulse length extension of 50%.

Figure 13:
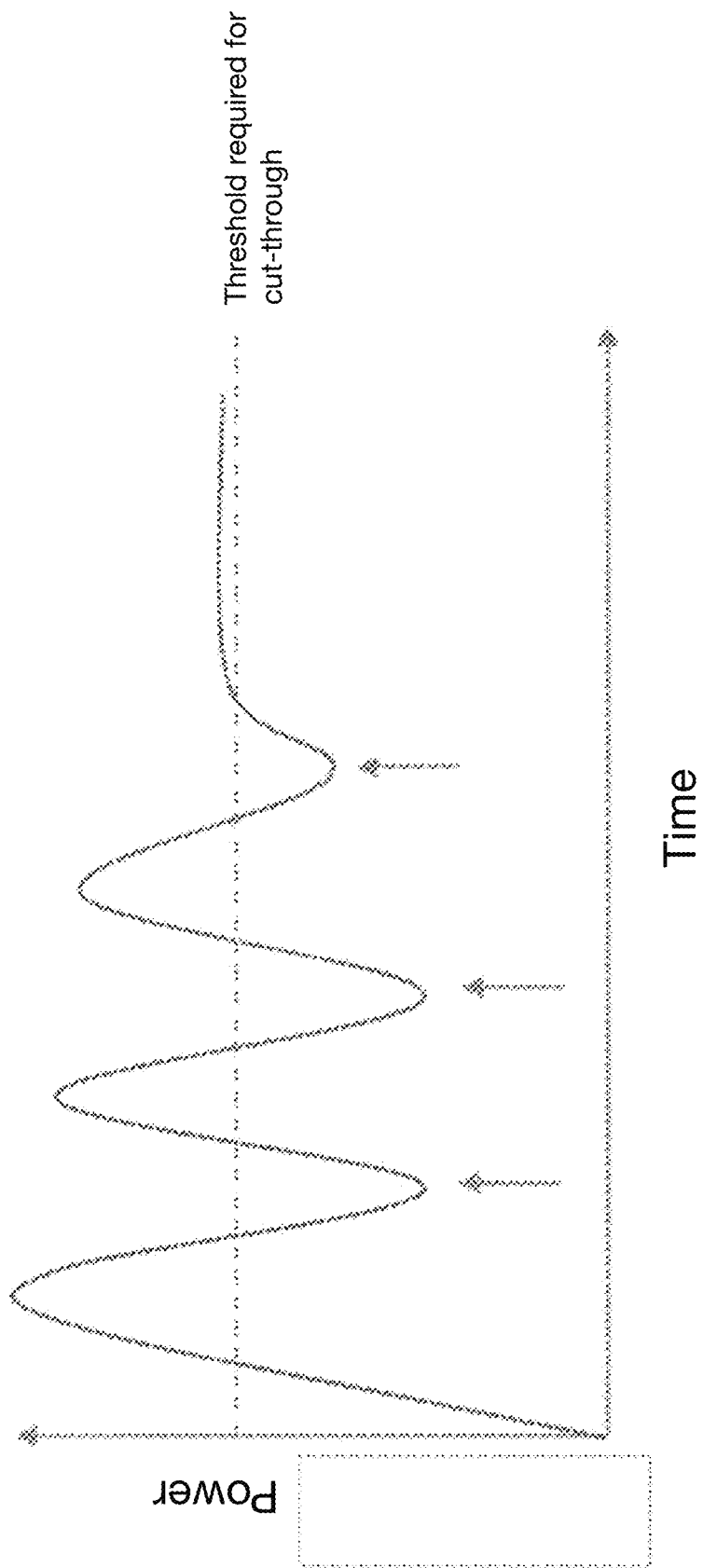
FIG. 13 is a diagram illustrating correcting for fluctuations in laser power output, consistent with some implementations of the current subject matter.

FIG. 13 is a diagram illustrating correcting for fluctuations in laser power output, consistent with some implementations of the current subject matter. In some cases, a laser with unstable power output (e.g., temporary spikes, or dips in laser power, such as from wall voltage sag), can create a risk of incomplete material cut-through. In some implementations, the desired effect on the material (e.g., cut-through), can still be successful despite output power fluctuations, provided the movement of the laser beam across the material can be slowed or sped up to compensate accordingly to keep power-per-unit-time values within operating parameters. However, the nature of the output instability may offer very little time for such calculated compensations to take place, unless real-time adjustments can be deployed which circumvent the need for motion plan re-calculation. In some implementations, sensor feedback may be used to measure power output, compare output to expected values, and shorten or lengthen the delay factor accordingly via insertion or removal or clock cycles as appropriate. Sensors that can be used for such purposes include, optical sensors monitoring beam emission or an effect on the material, current or voltage sensors tied to the laser output, or the like.

An example of a laser with fluctuating power is shown in FIG. 13. At some times, the laser power is over the threshold to cause cut-through, and at other times it is below the threshold (shown by the arrows). While the failure to cut-through is one off-normal condition to be corrected, too much power due to fluctuations can also be undesirable. In both cases, the modification of playback speed of the motion plan, for example by skipping or doubling clock cycles, can be altered to slow down or speed up the movable component, and hence stabilize the delivered power to the material to a level slightly above the threshold required for cut-through. In FIG. 13, when the power output is below the threshold, the movable component can be slowed in order to provide a longer energy deposition time, to compensate for the reduced output power detected by the sensors. While the above is discussed in the context of a laser cutter and cut-through, similar adjustments can also be performed with regard to engraving, milling, or the like.

Motion Plans with Built-In Headroom

As previously mentioned, speeding up a motion plan may create physical or mechanical incompatibilities, for example, by producing instructions that exceed the maximal velocities or forces that may be safely exerted by the CNC machine. In some implementations, this can be rectified by creating a standard motion plan that has tighter constraints to allow for subsequent speed-ups. This built-in headroom can then tolerate shortening the time-constant for the purpose of accelerating playback up to the amount used as a parameter during initial calculation (e.g., 50% increased playback). This can ensure that the resulting motion plan does not cause parameters of the operation of the CNC machine to fall outside their allowable range when a permissible degree of accelerated playback is requested.

In some implementations, this can include modifying a requested motion plan to perform substantively the same operations, patterns, power deposition, and the like, but at a predetermined reduction of execution rate under normal (non-accelerated) operation. For example, instead of the motion plan being created to cut a pattern at the maximum possible speed, the speed over some portions can be reduced. The reduction can be, for example, 5%, 10%, 25%, 50%, etc. The reduction can also be based on a physical parameter, such as a speed of a movable component in terms of m/s, rotations/min, or the like. This allows for the possibility of accelerating playback without exceeding maximum limits of motion parameters.

Motion Plans Supporting User-Configurable Modes

When requesting a motion plan, the user may desire a particular mode of operation (e.g., quiet mode, low-vibration mode, etc.) that imply particular output targets (e.g., not-to-exceed accelerations or reduced rate of material removal). To optimize for such preferences, the motion plan must select tradeoffs that typically relate to parameters like speed, focus, duration, and power. Conducting these optimizations at the level of the motion plan carries the advantage of configuring system-wide adjustments; for example, to achieve a quiet mode of operation, the motion plan may choose a strategy that lowers laser power such that the material removal rate is also lowered, resulting in additional noise-reducing effects (e.g., reductions to the heat generated in the tube and lowering Laser Generated Air Contaminants (LGAC) generation, which in turn permit fan motor reductions, etc.). It is likely that multiple strategies are possible to achieve the desired mode; in the present example, an alternative approach to achieving quiet operation may come from doubling head speed and instructing two passes to compensate for the reduced power per unit time, rather than a single pass, of the laser over the material. Alternately, the system may determine that slower head speed is desirable to reduce motor noise and decrease power to compensate for the increased power per unit time. The motion plan can pre-calculate the ways the desired effect may be achieved and alter the power dissipation and material removal rate accordingly.

For example, when the CNC machine receives a command to operate quietly, it may opt for a processing approach that removes material more slowly. For example, it may slow motion and reduce power. This may be accomplished by the motion planner as it calculates the motion plan. Using the same techniques as discussed previously, it may also be accomplished after the motion plan is complete by reducing the playback speed of the actuators and tool system, although in this case the tool's removal rate would need to be reduced so that, for example, laser power per unit time remains constant even as it is slowed. In this example, playback might be reduced in speed so that something that would have taken 1 second instead takes 1.1 seconds, a delay factor of 1.1; the tool's setting (for example laser power) might be reduced to 1/1.1, or 91%, as well to compensate for the reduced speed. In some cases, the pre-determined factor can also be a number below 1.0 as well, to speed up the execution of the motion plan. In either case, the power output of the laser or other tool can be correspondingly adjusted to provide the desired effect at the material. For example, if a laser is moving at half-speed, the laser power can be reduced by a factor of two in order to have the energy delivered to the material be constant. The increased time to fully execute the motion plan can result in the fans having more time to clear the interior of the CNC machine of contaminants, or enabling them to run at a lower speed to achieve quieter operation.

Because a server can be a more powerful computer than a remote computer, for example a computer in the CNC machine itself, more detailed motion planning calculations can be performed at the server. The server can contain data on the physics of the CNC machine 100 that will be doing the fabrication, for example, cutting/layering parameters, machine information, material restrictions, etc. Advanced computational methods can be used to generate the motion plan, for example optimizing the motion of the head to not only generate an accurate set of instructions, but instructions that are executed in a minimum amount of time given a particular CNC machine. Conversely, the instructions may be optimized to minimize noise created by fans (by generating less heat, smoke, or debris by operating more slowly), they may be optimized to create minimum vibration (for a machine on an unstable surface, like a card table), they may be optimized for maximum accuracy and precision at the cost of speed, and/or they may be optimized for maximum speed at the expense of accuracy. The particular path chosen by the machine in moving from machining operation to machining operation is a complex problem and can be likened to the "travelling salesman" problem which has been proven to be NP-complete. Depending on the desired outcome, different optimizations can be used. For example, a nearest neighbor approach can be used to perform one set of motions, move to the location of the next set of motions, execute those, and so on. While being a simple algorithm, this may not be optimal when considering the fact that the motors have a finite acceleration and also given the feedback response of the cutters, pourers, etc. More sophisticated algorithms such as the Christofides algorithm can be used but the complexity of the calculation makes it best-suited to computation on the server, rather than requiring a powerful computer to be installed with every CNC machine.

Also, time-varying features associated with adding or subtracting material 140, such as head acceleration, variable laser burn, dulling of cutting surfaces, variations in flow rates of deposition materials, etc. can be calculated and accounted for when generating the motion plan by software on the server.

Figure 14:
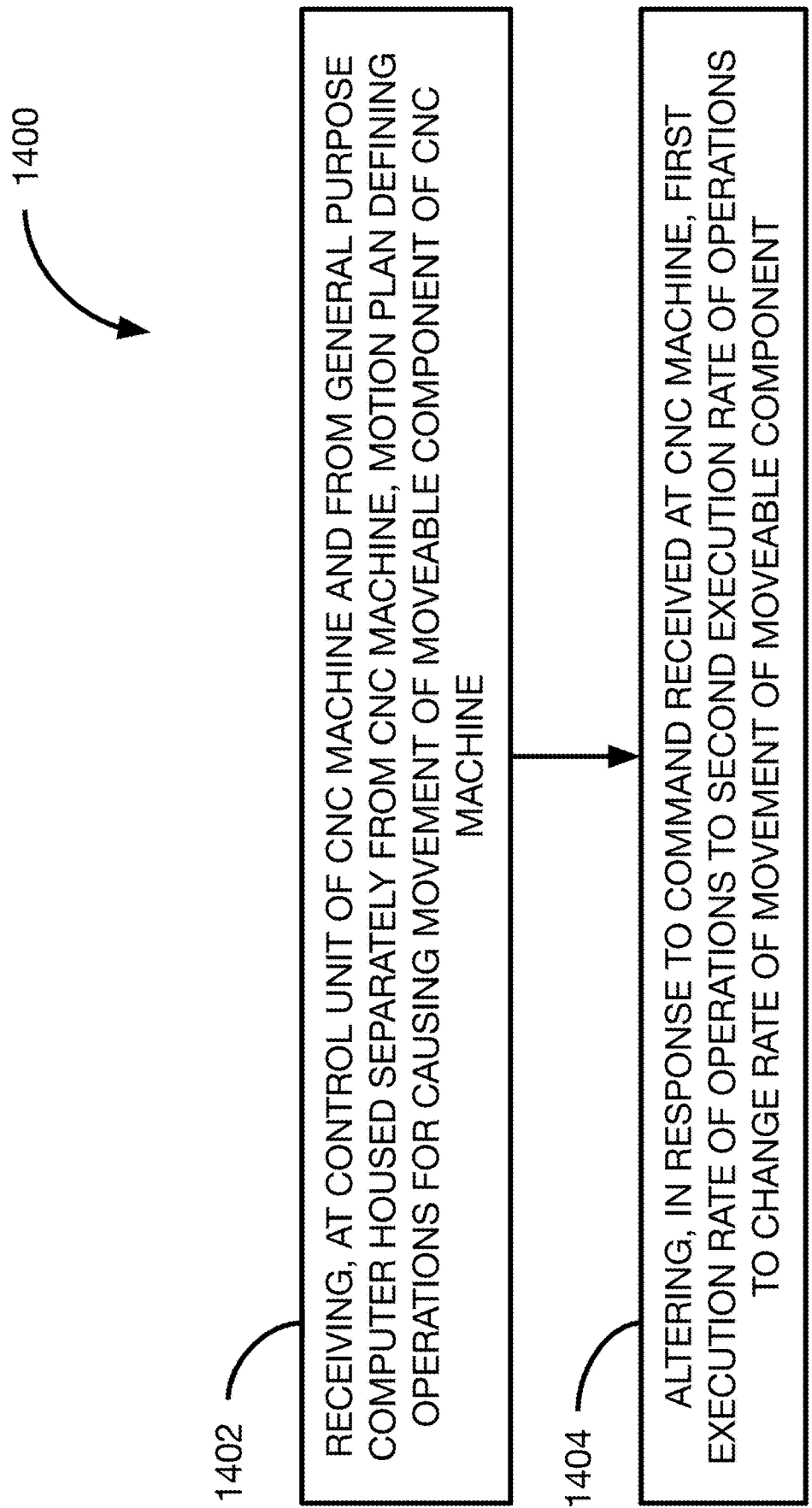
FIG. 14 is a flowchart illustrating a process for altering a rate of executing a motion plan, consistent with some implementations of the current subject matter.

FIG. 14 is a flowchart illustrating a process 1400 for altering a rate of executing a motion plan, consistent with implementations of the current subject matter. Referring to FIG. 14, the process 1400 can be performed by a CNC machine such as, for example, the CNC machine 100.

A control unit at the CNC machine 100 can receive, from a general purpose computer housed separately from the CNC machine 100, a motion plan defining operations for causing a movement of a moveable component of the CNC machine 100 (1402). As noted, in various implementations of the current subject matter, the CNC machine 100 can receive a motion plan that defines operations for execution by the CNC machine 100. For instance, the CNC machine can execute these operations by moving a moveable component such as, for example, a moveable head capable of delivering electromagnetic energy (e.g., laser), a drill bit, a cutting instrument, a 3D printer head, a printer head, and/or the like.

In response to a command received at the CNC machine 100, the CNC machine 100 can alter a first execution rate of the operations to a second execution rate of operations to change a rate of movement of the moveable component (1404). In some implementations of the current subject matter, the CNC machine 100 can decelerate and/or accelerate the rate at which the operations included in the motion plan are executed. As such, the second execution rate can be faster and/or slower than the first execution rate. As noted, the CNC machine 100 can alter the first execution rate to the second execution rate by introducing a delay factor, which may be a positive value that decelerates execution and/or a negative value that accelerates execution. Various techniques may be used to introduce the delay factor including, for example, by altering a playback of a signal line, altering an existing clock and signal, and/or the like.

In various implementations of the current subject matter, a method for altering a rate of executing a motion plan can include: receiving, at a control unit of a CNC machine and from a general purpose computer that is housed separately from the CNC machine, a motion plan defining operations for causing movement of a moveable component of the CNC machine; and altering, in response to a command received at the CNC machine, a first execution rate of the operations to a second execution rate of the operations to change a rate of movement of the movable component.

The CNC machine can deliver electromagnetic energy to effect a change in a material within an interior space of the CNC machine. The command can be initiated by a user. The command can be a halt command. The altering of the first execution rate to the second execution rate can include bringing the movable component of the computer-numerically-controlled machine to a stop in response to the halt command received at the computer-numerically-controlled machine. The movable component can be brought to a halt at least by sending commands to the movable component at a slower rate near an end of a motion of the movable component. Alternatively and/or additionally, the command can be a start command. The altering of the first execution rate to the second execution rate can include resuming an operation of the moveable component of the CNC machine in response to the start command received at the CNC machine.

The first execution rate can be altered to the second execution rate at least by adding a delay between one or more operations in the motion plan to change the rate of movement of the movable component. The one or more operations of the motion plan, including the delay, can be executed in a reversed order to accelerate the movable component. The delay can be added by repeating at least one instruction per signal line transition, skipping a number of pulses per signal line transition, and/or slowing the frequency of clock pulses. The alteration can be based at least on an image of the movable component. The image can be acquired with a camera in the computer-numerically-controlled machine.

Laser Fabrication with Beam Detection

As noted, the computer numerically controlled machine 100 may include a source configured to generate and/or emit a beam of electromagnetic energy, for example, in the form of a laser beam. The beam of electromagnetic energy may be delivered to a destination such as, for example, a portion of the material 140 positioned in the working area of the computer numerically controlled machine 100. Delivering the beam of electromagnetic energy to the portion of the material 140 may effect one or more changes in the material 140 including by, for example, cutting and/or engraving the material 140. In some implementations of the current subject matter, the beam of electromagnetic energy may travel directly from the source to the destination. Alternatively, the computer numerically controlled machine 100 may further include the head 160 including one or more optical, electronic, and mechanical components configured to cause the beam of electromagnetic energy to be delivered to the destination. Electromagnetic energy emitted by the source can be routed to the head 160 using one or more optical elements including, for example, mirrors, lenses, and/or the like. For example, a beam of electromagnetic energy from the source may be routed by a first optical element to enter the head 160 where a second optical element may further route the beam of electromagnetic energy for delivery to the material 140 positioned in the working area.

Nevertheless, at least a portion of the path of the electromagnetic energy between the source and the destination may be unprotected. The beam of electromagnetic energy may therefore be susceptible to one or more interferences (e.g., errant pieces of the material 140) while traversing the unprotected portion of the path from the source to the destination. These interferences may alter the power of the beam of electromagnetic energy including by diverting at least a portion of the beam of electromagnetic energy away from its intended path. Moreover, the unprotected portion of the path traversed by the electromagnetic energy may not be covered by a material capable of attenuating the electromagnetic energy. As such, in the event the beam of the electromagnetic energy is subject to interferences along the unprotected portion of the path, there would be no containment to prevent errant electromagnetic energy from causing severe damage. Accordingly, in some implementations of the current subject matter, the computer numerically controlled machine 100 may further include a beam detector configured to detect an interference of the electromagnetic energy.

Moreover, one or more actions may be performed in response to the beam detector detecting an interference of the electromagnetic energy. For example, the computer numerically controlled machine 100 may include a controller configured to disable the source of the electromagnetic energy and/or lock the lid 130 of the computer numerically controlled machine 100 (e.g., by engaging an interlock system) in response to the beam detector detecting the interference of the electromagnetic energy. The controller at the computer numerically controlled machine 100 may also generate an alarm (e.g., an audio alarm, a visual alarm, a haptic alarm, and/or the like) when the beam detector detects an interference of the electromagnetic energy. Alternatively and/or additionally, the controller at the computer numerically controlled machine 100 and/or a cloud-based server communicatively coupled with the computer numerically controlled machine 100 may respond to the interference of the electromagnetic energy by at least sending, to the user, a notification message (e.g., by email, short message service (SMS) message, and/or the like). Furthermore, in response to the beam detector detecting an interference of the electromagnetic energy, the controller at the computer numerically controlled machine 100 may generate and send, to the cloud-based server, a report including data collected by one or more sensors (e.g., cameras, microphones, gyroscopes, accelerometers, and/or the like) onboard the computer numerically controlled machine 100 over a time period during which the interference of the electromagnetic energy occurred at the computer numerically controlled machine 100.

The beam detector may be disposed at various locations along the path traversed by the beam of electromagnetic energy from the source to the destination including, for example, at one or more locations before and/or after the unprotected portion of the path where the beam of electromagnetic energy is susceptible to interferences. For example, in some implementations of the current subject matter, the beam detector may be disposed at the head 160 of the computer numerically controlled machine 100. The beam detector disposed at the head 160 of the computer numerically controlled machine 100 may be configured to detect an interference of the beam of electromagnetic energy traversing through an unprotected portion of the path between the source of the beam of electromagnetic energy and the head 160 and/or between the head 160 and the destination of the beam of electromagnetic energy (e.g., the material 140 positioned in the working area of the computer numerically controlled machine 100).

Nevertheless, it should be appreciated that the beam detector may be detected at a different location than the head 160 of the computer numerically controlled machine 100. For example, in some implementations of the current subject matter, the beam detector may be disposed at any location outside of the source of the electromagnetic energy in order to detect an interference of the beam of electromagnetic energy traversing through an unprotected portion of the path between the source and the destination of the beam of electromagnetic energy (e.g., the material 140 positioned in the working area of the computer numerically controlled machine 100).

Figure 15:
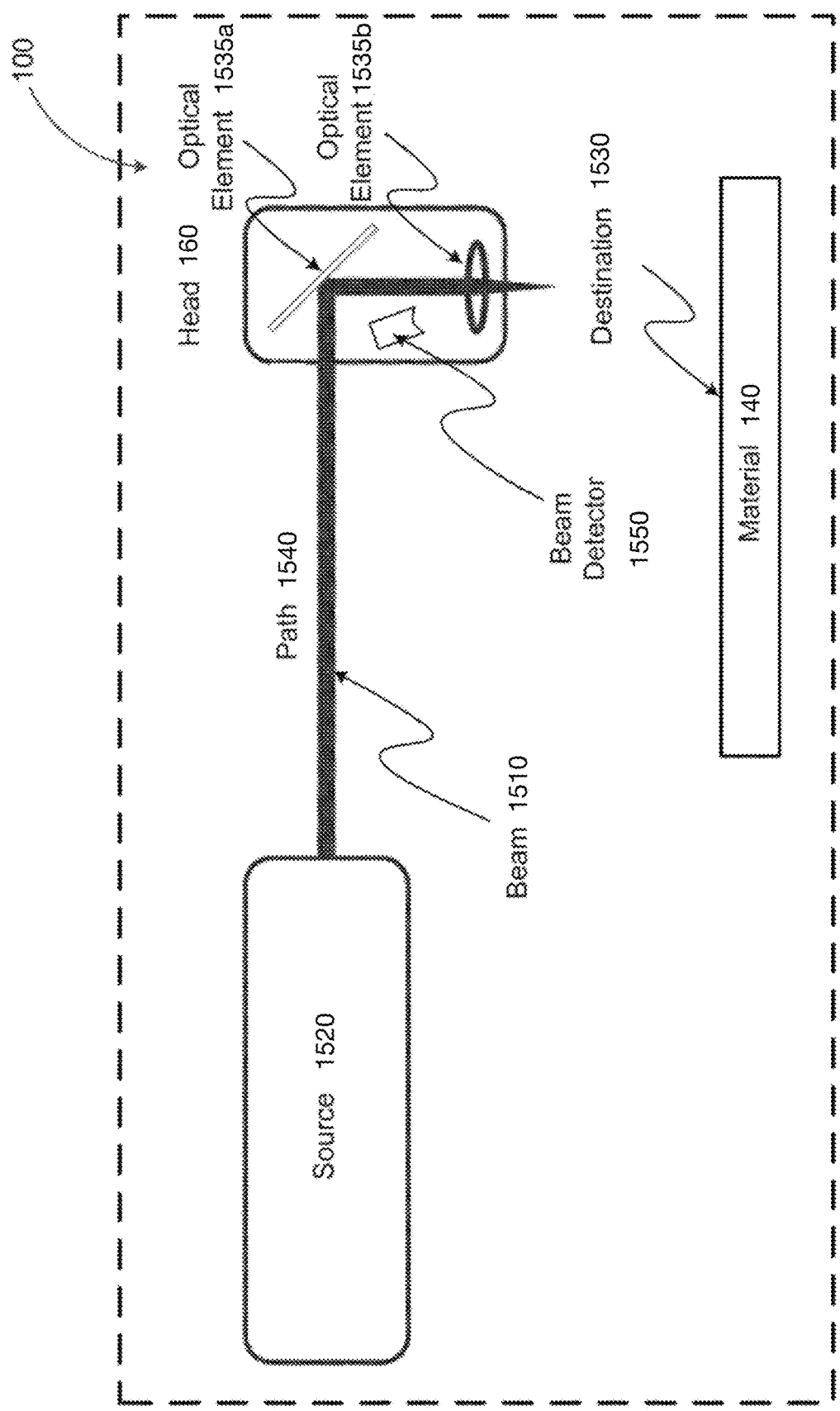
FIG. 15 depicts a block diagram illustrating a beam of electromagnetic energy traveling from a source of the electromagnetic energy to a destination of the electromagnetic energy in a computer numerically controlled machine, consistent with implementations of the current subject matter.

To further illustrate, FIG. 15 depicts a beam 1510 of electromagnetic energy traveling from a source 1520 of the electromagnetic energy to a head 160 of the electromagnetic energy in the computer numerically controlled machine 100, consistent with implementations of the current subject matter. Referring to FIGS. 1, 2, and 15, the source 1520 may be configured to generate and/or emit an electromagnetic energy, for example, by generating and/or emitting the beam 1510. Meanwhile, the head 160 may be the head 160 of the computer numerically controlled machine 100. As such, the head 160 may include one or more optical, electronic, and mechanical components configured to cause the beam 1510 to be delivered to the material 140 in order, for example, to cut and/or engrave the material 140. For example, FIG. 15 shows the head 160 as including a first optical element 1535a and a second optical element 1535b. The first optical element 1535a may be one or more mirrors configured to change a path 1540 of the beam 1510 incident upon the first optical element 1535a including by directing the beam 1510 towards the second optical element 1535b. Meanwhile, the second optical element 1535b may be one or more lenses configured to focus the beam 1510 for delivery to the material 140.

Once the beam 1510 exits the source 1520, the beam 1510 may traverse the path 1540 in order to reach a destination 1530, which may be at least a portion of the material 140 positioned in a working area of the computer numerically controlled machine 100. The path 1540 may be a three-dimensional volume within an interior space of the computer numerically controlled machine 100. Moreover, least a portion of the path 1540 may be unprotected such that the beam 1510 may be susceptible to one or more interferences capable of altering the power of the beam 1510 including by diverting the beam 1510 away from its intended path. To detect an interference of the beam 1510, the computer numerically controlled machine 100 may include a beam detector 1550.

In the example shown in FIG. 15, the beam detector 1550 may be disposed at the head 160 of the computer numerically controlled machine 100. However, as noted, it should be appreciated that the beam detector 1550 may be disposed at a different location along the path 1540 of the beam 1510. Moreover, the computer numerically controlled machine 100 may include multiple beam detectors disposed at different locations along the path 1540 of the beam 1510.

In some implementations of the current subject matter, the beam detector 1550 may measure a power of the beam 1510 at the head 160 (and/or at a different location along the path 1540 of the beam 1510). For example, the beam detector 1550 may measure the power of the beam 1510 by at least sampling the beam 1510 at the head 160 (and/or at a different location along the path 1540 of the beam 1510). An interference of the beam 1510 may be detected when the power of the beam 1510 being less than a threshold value.

One or more actions may be performed in the event the beam detector 1550 detects an interference of the beam 1510. For example, a controller at the numerically controlled machine 100 may disable the source 1520 to prevent further generation and/or emission of electromagnetic energy at the source 1520. The source 1520 may be disabled in order to minimize the damage caused by errant electromagnetic energy that may be generated when the beam 1510 is diverted as a result of the interferences along the path 1540. Alternatively and/or additionally, the controller at the computer numerically controlled machine 100 may respond to the beam detector 1550 detecting an interference of the beam 1510 by engaging the interlock system and locking the lid 130 of the computer numerically controlled machine 100. Locking the lid 130 may prevent a user from accessing the interior space of the computer numerically controlled machine 100 when errant electromagnetic energy may be present within the computer numerically controlled machine 100.

The controller at the computer numerically controlled machine 100 may also generate an alarm (e.g., an audio alarm, a visual alarm, a haptic alarm, and/or the like) when the beam detector 1550 detects an interference of the beam 1510. Alternatively and/or additionally, the controller at the computer numerically controlled machine 100 and/or a cloud-based server communicatively coupled with the computer numerically controlled machine 100 may respond to the interference of the beam 1510 by at least sending, to the user, a notification message (e.g., by email, short message service (SMS) message, and/or the like). Furthermore, in response to the beam detector detecting an interference of the beam 1510, the controller at the computer numerically controlled machine 100 may generate and send, to the cloud-based server, a report including data collected by one or more sensors (e.g., cameras, microphones, gyroscopes, accelerometers, and/or the like) onboard the computer numerically controlled machine 100 over a time period during which the interference of the beam 1510 occurred at the computer numerically controlled machine 100.

It should be appreciated that the beam detector 1550 may also be configured to perform one or more actions in response to detecting an interference of the beam 1510. For example, the beam detector 1550 may be configured to modulate the power of the beam 1510 output by the source 1520 in response to the detecting the interference of the beam 1510.

In some implementations of the current subject matter, the one or more actions that are performed in response to the beam detector 1550 detecting an interference of the beam 1510 and the triggers associated with the actions may be configured based on one or more safety thresholds. For example, the source 1520 of the beam 1510 may be disabled in response to the beam detector 1550 determining that the power of the beam 1510 exceeds a maximum permissible exposure (MPE). Alternatively and/or additionally, the source 1520 of the beam 1510 may be disabled within a threshold quantity of time when, for example, the power of the beam 1510 is determined to exceed the maximum permissible exposure (MPE).

FIG. 16A depicts a block diagram illustrating an example configuration of the beam detector 1550, consistent with implementations of the current subject matter. Referring to FIGS. 1-2, 15, and 16A, the beam 1510 from the source 15120 may be collimated such that the beam 1510 may exhibit minimal spread as the beam 1510 propagates, for example, from the source 1520 to the head 160. Nevertheless, at least some of the rays forming the beam 1510 may scatter and diverge from the primary beam 1510. Accordingly, in the example shown in FIG. 164A, the beam detector 1550 disposed at the head 160 may be configured to measure the power of the beam 1510 by at least measuring a power of the divergent rays scattered from the beam 1510. Alternatively and/or additionally, the beam detector 1550 in the example shown in FIG. 16A may be configured to measure the power of the beam 1510 by at least measuring a power of the backscatter electromagnetic energy generated when the beam 1510 interacts with the second optical element 1535*b*.

Figure 16B:
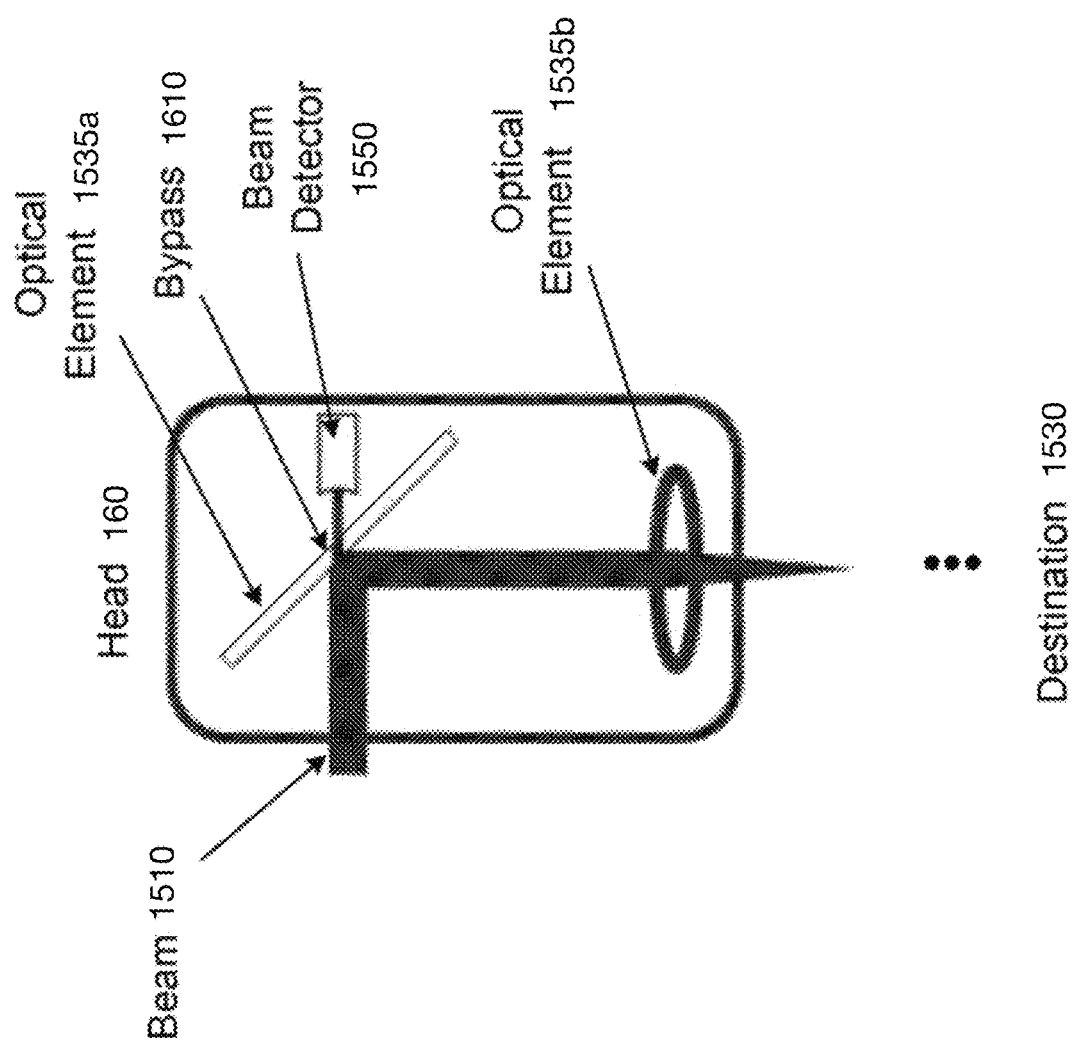
FIG. 16B depicts a block diagram illustrating another example configuration of a beam detector, consistent with implementations of the current subject matter.

FIG. 16B depicts a block diagram illustrating another example configuration of the beam detector 1550, consistent with implementations of the current subject matter. As shown in FIG. 16B, in some implementations of the current subject matter, the one or more optical elements the computer numerically controlled machine 100 may include a bypass that enables the beam detector 1550 to sample a portion of the beam 1510 interacting with the one or more optical elements. For example, FIG. 16B shows the first optical element 1535*a* as including a bypass 1610, which may be an aperture such as pinhole, a slit, and/or the like.

The bypass 1610 may be configured to enable a portion of the beam 1510 incident upon the first optical element 1535*a* to pass through the first optical element 1535*a* instead of being directed towards the second optical element 1535*b*. In doing so, the bypass 1610 may enable the portion of the beam 1510 to reach the beam detector 1550, which may be positioned and/or oriented relative to the first optical element 1535*a* to receive the portion of the beam 1510 passing through the bypass 1610. Accordingly, the beam detector 1550 may measure the power of the beam 1510 by at least measuring a power of the portion of the beam 1510 that passes through the bypass 1610. It should be appreciated that the bypass 1610 may be configured to divert a minimal portion of the beam 1510. For example, the portion of the beam 1510 diverted by the bypass 1610 may enable the beam detector 1550 to determine the power of the beam 1510 without diminishing the power of the beam 1510 delivered to the material 140.

Figure 16C:
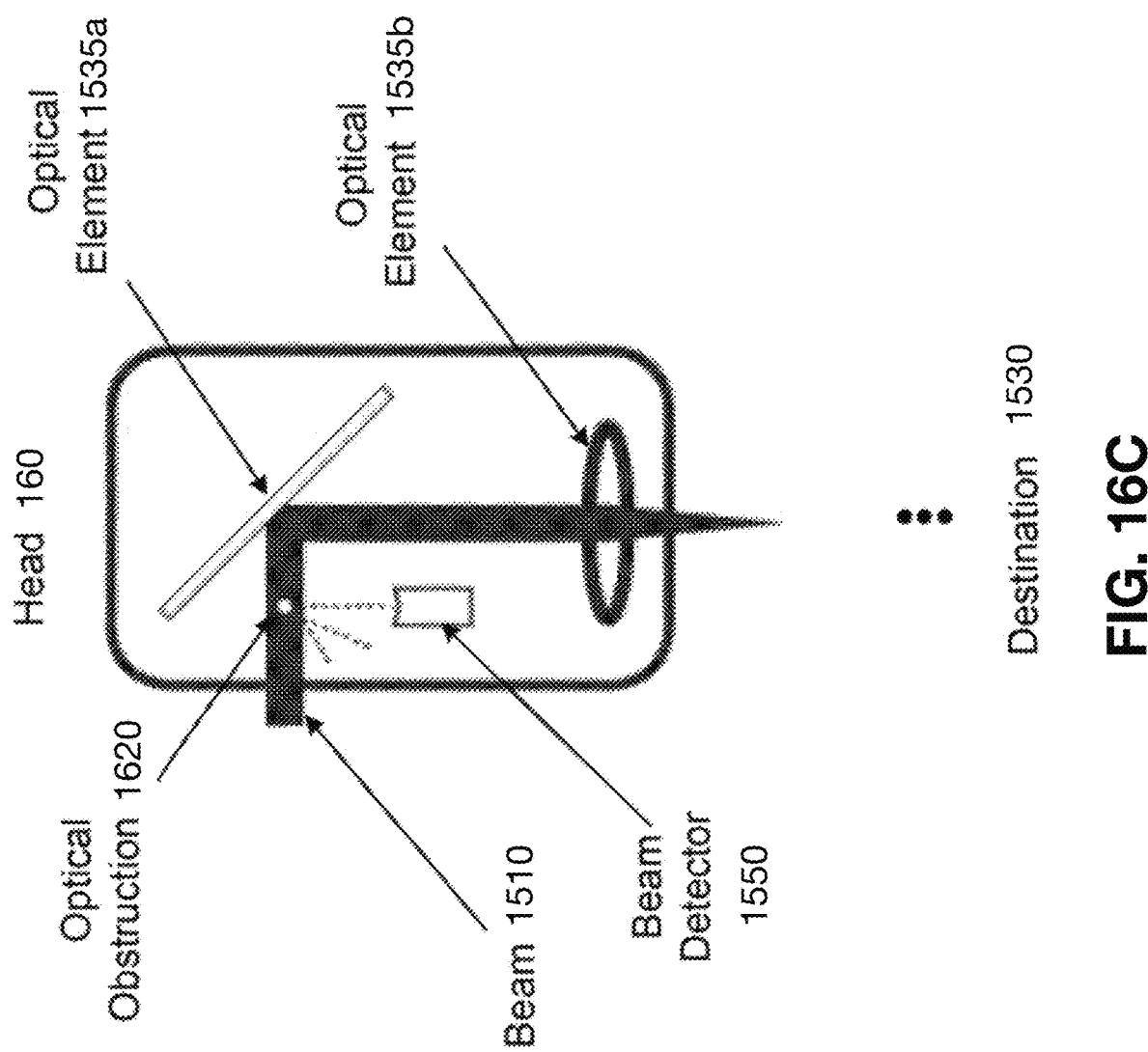
FIG. 16C depicts a block diagram illustrating another example configuration of a beam detector, consistent with implementations of the current subject matter.

FIG. 16C depicts a block diagram illustrating another example configuration of the beam detector 1550, consistent with implementations of the current subject matter. Referring to FIG. 16C, in some implementations of the current subject matter, an optical obstruction 1620 maybe inserted along the path 1540 of the beam 1510 in order to divert at least a portion of the beam 1510 for sampling by the beam detector 1550. That is, the beam detector 1550 may be configured to measure the power of the beam 1510 by at least measuring a power of a portion of the beam 1510 diverted to the beam detector 1550 by the optical obstruction 1620. In the example shown in FIG. 16C, the optical obstruction 1620 may be a wire configured to scatter a portion of the beam 1510 towards the beam detector 1550.

The optical obstruction 1620 may be configured to divert a minimal portion of the beam 1510 in order to avoid diminishing the power of the beam 1510 delivered to the destination 1530 (e.g., the material 140). Moreover, the optical obstruction 1620 may be a different type of obstacle capable of scattering a portion of the beam 1510.

Figure 16D:
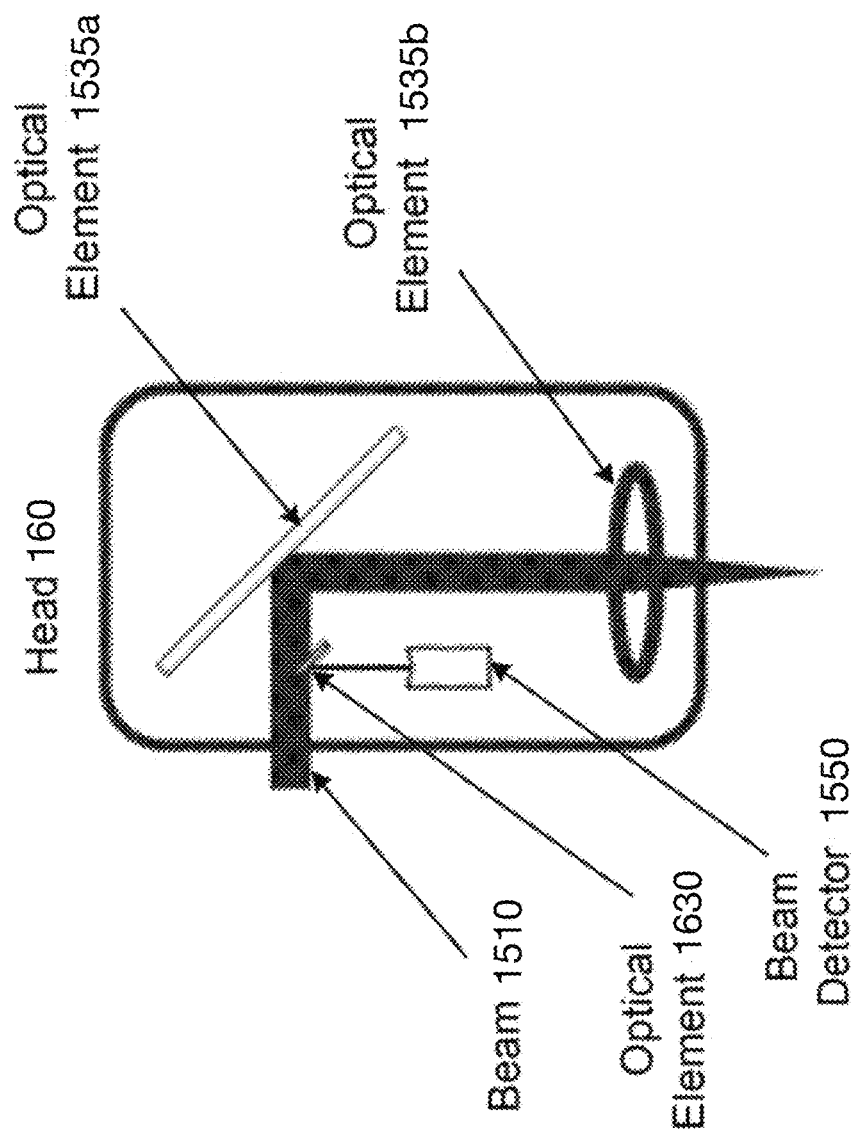
FIG. 16D depicts a block diagram illustrating another example configuration of a beam detector, consistent with implementations of the current subject matter.
Figure 16E:
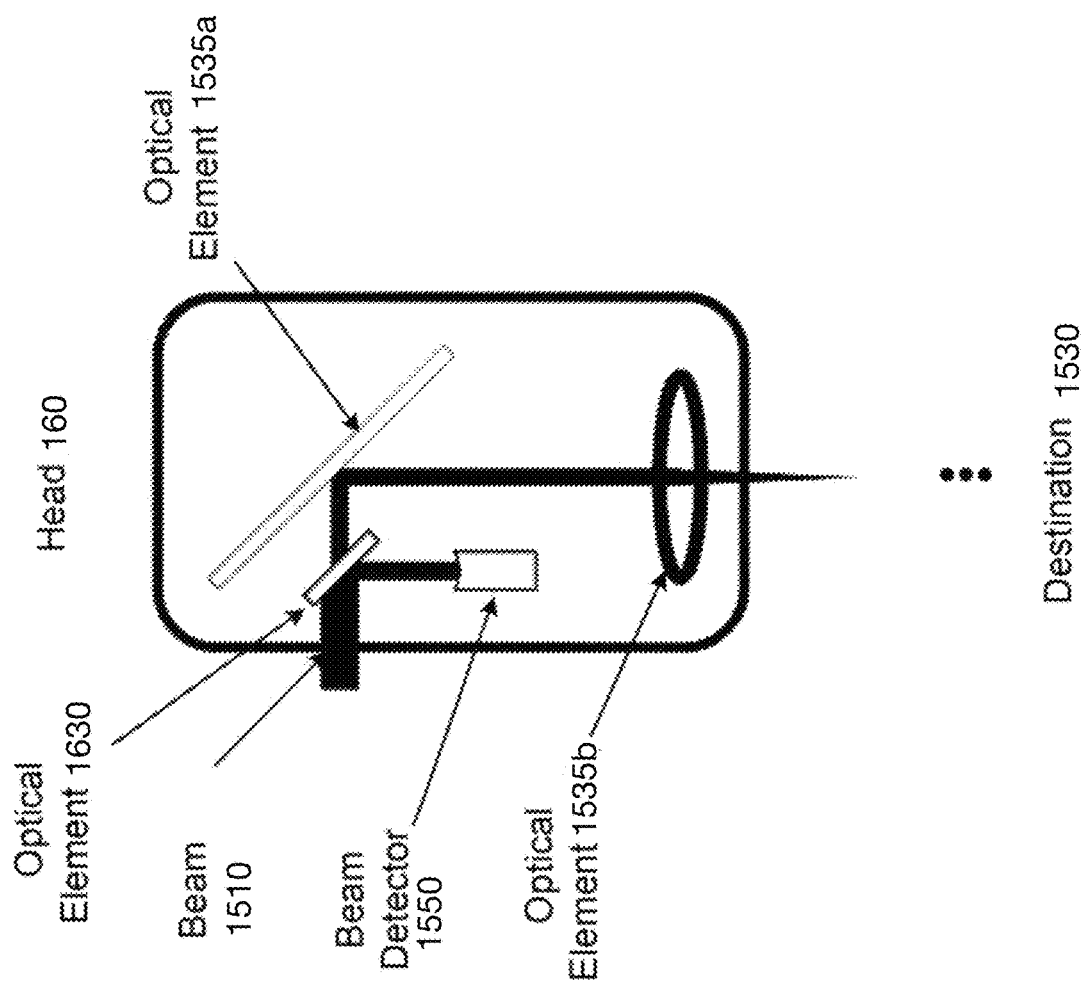
FIG. 16E depicts a block diagram illustrating another example configuration of a beam detector, consistent with implementations of the current subject matter.

FIGS. 16D-E depict block diagrams illustrating other example configurations of the beam detector 1550, consistent with implementations of the current subject matter. Referring to FIGS. 16D-E, a third optical element 1630 may be inserted along the path 1540 of the beam, 1510 in order to divert at least a portion of the beam 1510 for sampling by the beam detector 1550. In the example shown in FIG. 16D, the third optical element 1630 may be a lens configured to split the beam 1510 such that a portion of the beam 1510 is directed towards the beam detector 1550. Alternatively, FIG. 16E shows another example in which the third optical element 1630 may be slivered mirror configured to direct a first portion of the beam 1510 towards the beam detector 1550 while allowing a second portion of the beam 1510 to bypass (e.g., through the sliver) through the third optical element 1630 to reach the first optical element 1535*a*. The third optical element 1630 may be configured to divert a minimal portion of the beam 1510, which may enable the beam detector 1550 to determine the power of the beam 1510 without diminishing the power of the beam 1510 delivered to the destination 1530 (e.g., the material 140).

Figure 16F:
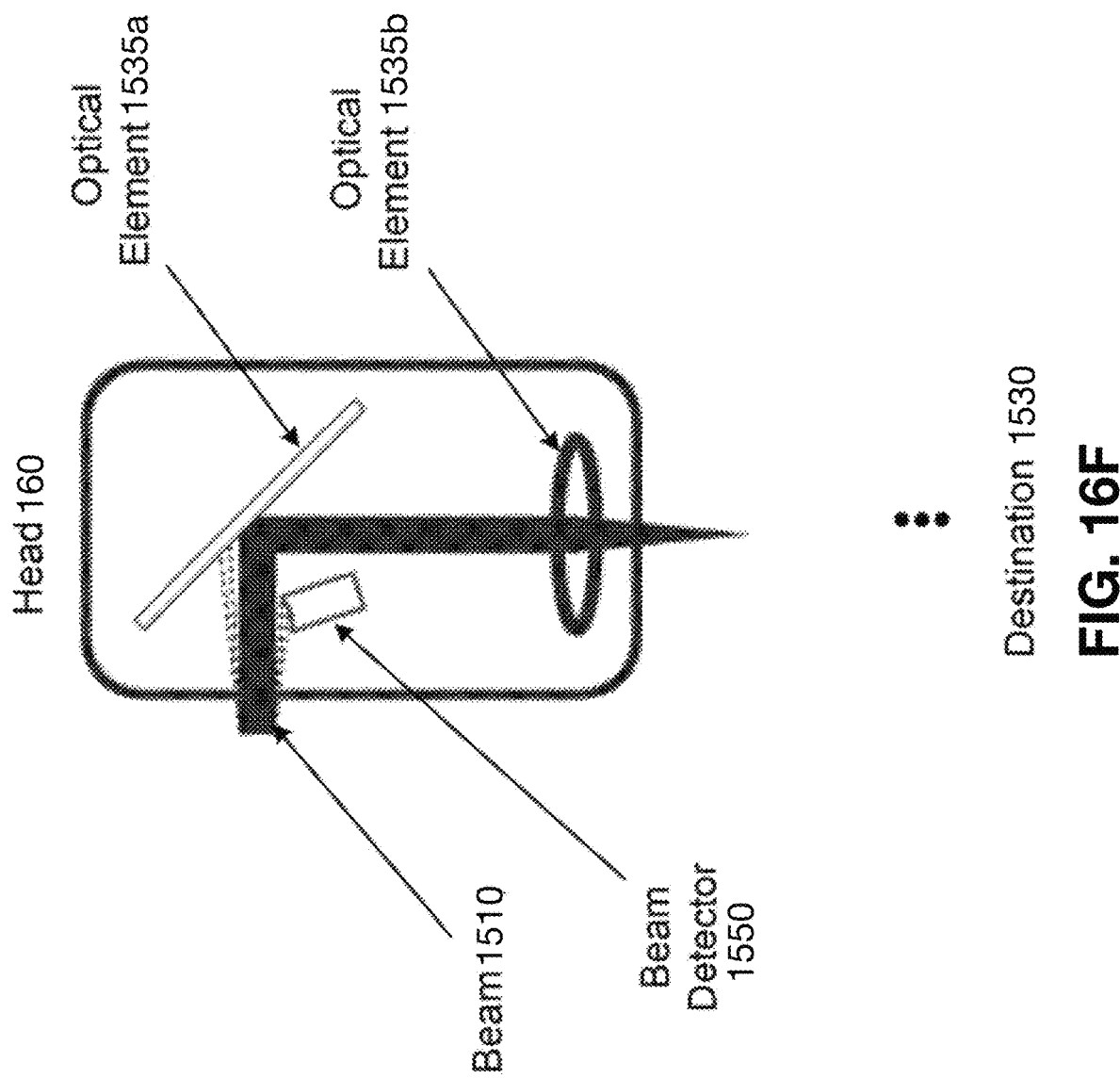
FIG. 16F depicts a block diagram illustrating another example configuration of a beam detector, consistent with implementations of the current subject matter.

FIG. 16F depicts a block diagram illustrating another example configuration of the beam detector 1550, consistent with implementations of the current subject matter. As noted, the beam 1510 from the source 1520 may be collimated but at least of the rays forming the beam 1510 may nevertheless diverge as the beam 1510 propagates from the source 1520 to the head 160. Accordingly, in the example shown in FIG. 16E, the beam detector 1550 may be positioned and/or oriented to measure the power of the beam 1510 by at least measuring a power of the divergent rays from the beam 1510.

FIG. 16G depicts a block diagram illustrating another example configuration of the beam detector 1550, consistent with implementations of the current subject matter. In some implementations of the current subject matter, the beam detector 1550 may measure the power of the beam 1510 by at least measuring a power of the backscatter electromagnetic energy that is generated when the beam 1510 interacts with the material 140. As noted, the head 160 of the beam 1510 may be the head 160 of the computer numerically controlled machine 100, which may include the second optical element 1535*b* (e.g., one or more lenses) configured to focus the beam 1510 for delivery to the material 140. Accordingly, the beam detector 1550 may be positioned and/or oriented relative to the head 160 including the second optical element 1535*b* to be able to measure the power of the backscatter electromagnetic energy from the material 140.

In some implementations of the current subject matter, the beam detector 1550 may include one or more sensors optimized for the wavelengths and/or frequencies associated with the beam 1510. For example, the one or more sensors may be optimized for the detection of wavelengths and/or frequencies in the far infrared (FIR) region of the electromagnetic spectrum (e.g., wavelength spectrum of 15-1000 micrometers and/or frequency range of 0.3-20 terahertz). The one or more sensors may be thermopiles although the beam detector 1550 may also include other types of sensors.

The signal detected by the beam detector 1550 may originate from the electromagnetic energy emitted by the source 1520 as well as from ambient noise such as, for example, heat, light, and/or the like. As such, in some implementations of the current subject matter, the beam detector 1550 may apply one or more techniques in order to remove, from the signal detected at the beam detector 1550, contributions from the ambient noise. For example, the signal may be filtered, for example, by applying a low pass filter and/or the like, to remove the effects of slow-changing ambient conditions such as heat, light, and/or the like. Alternatively and/or additionally, the beam detector 1550 may include a differential sensor formed from multiple sensors (e.g., dual thermopiles). A first sensor (e.g., thermopile) may be oriented towards the source 1520 of the electromagnetic energy while a second sensor (e.g., thermopile) may be oriented away from the source 1520 of the electromagnetic energy. The difference between a first measurement made by the first sensor and a second measurement made by the second sensor may correspond to contributions from ambient noise (e.g., heat, light, and/or the like). Accordingly, in order to determine the power of the beam 1510, the beam detector 1550 may be configured to at least subtract a value corresponding to the contributions from ambient noise.

In some implementations of the current subject matter, the source 1520 of electromagnetic energy may be configured to emit the electromagnetic energy (e.g., laser) in a series of pulses rather than a continuous signal. That is, the beam 1510 may be formed from a series of pulses of electromagnetic energy. Accordingly, the beam detector 1550 may be configured to detect the rising and/or falling edges of the pulses of electromagnetic energy. It should be appreciated that transients (e.g., signal oscillations) that occur at a known time may be more readily identified than a continuous signal.

In some implementations of the current subject matter, the beam detector 1550 may include a detection circuit configured to compare the power of the beam 1510 at a location along the path 1540 to an expected power of the beam 1510 at that location. For example, the beam detector 1550 may measure the power of the beam 1510 at the head 160. Furthermore, the beam detector 1550 may compare the power of the beam 1510 at the head 160 to an expected power of the beam 1510 at the head 160. The expected power of the beam 1510 at the head 160 (and/or a different location along the path 1540) may be determined based on the power of the beam 1510 at the source 1520 as well as the attenuation of the power of the beam 1510 as the beam 1510 propagates from the source 1520 to the head 160 (and/or a different location along the path 1540). An interference of the beam 1510 may be detected when a difference between the power of the beam 1510 at the head 160 and the expected power of the beam 1510 at the head 160 exceeds a threshold value.

In some implementations of the current subject matter, this threshold value may be determined based on one or more safety standards. The power of the beam 1510 may not exceed a maximum permissible exposure (MPE) corresponding to a highest power (or energy density) of a beam of electromagnetic energy that is determined to be safe (e.g., to the human eye, skin, and/or the like) for the type of beam 1510 (e.g., lasers). The maximum permissible exposure (MPE) associated with the beam 1510 may be determined based on a wavelength of the electromagnetic energy, a spatial coherence (e.g., degree of collimation) of the beam 1510, and/or an exposure time to the beam 1510. An interference of the beam 1510 may be detected when the power of the beam 1510 exceeds the maximum permissible exposure (MPE) associated with the beam 1510. For example, an interference of the beam 1510 may be detected when the difference between the power of the beam 1510 measured by the beam detector 1550 and the expected power of the beam 1510 at that location exceeds a threshold value determined based on the maximum permissible exposure (MPE) associated with the beam 1510.

In some implementations of the current subject matter, the controller at the computer numerically controlled machine 100 may perform one or more actions in response to the beam detector 1550 detecting an interference of the beam 1510. For example, the controller at the computer numerically controlled machine 100 may respond to the beam detector 1550 detecting an interference of the beam 1510 by at least disabling the source 1520. The source 1520 may be disabled in order to minimize the damage caused by errant electromagnetic energy that may be generated when the beam 1510 is diverted by one or more obstacles along the path 1540. Alternatively and/or additionally, the controller at the computer numerically controlled machine 100 may respond to the beam detector 1550 detecting an interference of the beam 1510 by at least locking the lid 130 of the computer numerically controlled machine 100. Locking the lid 130 may prevent a user from accessing the interior space of the computer numerically controlled machine 100 when errant electromagnetic energy may be present within the computer numerically controlled machine 100. Furthermore, the controller at the computer numerically controlled machine 100 may respond to the beam detector 1550 detecting an interference of the beam 1510 by generating an alert. The alert may be displayed to the user at the computer numerically controlled machine 100 and/or at a device (e.g., a computer, a smartphone, a wearable apparatus, and/or the like) communicatively coupled with the computer numerically controlled machine 100.

Figure 17:
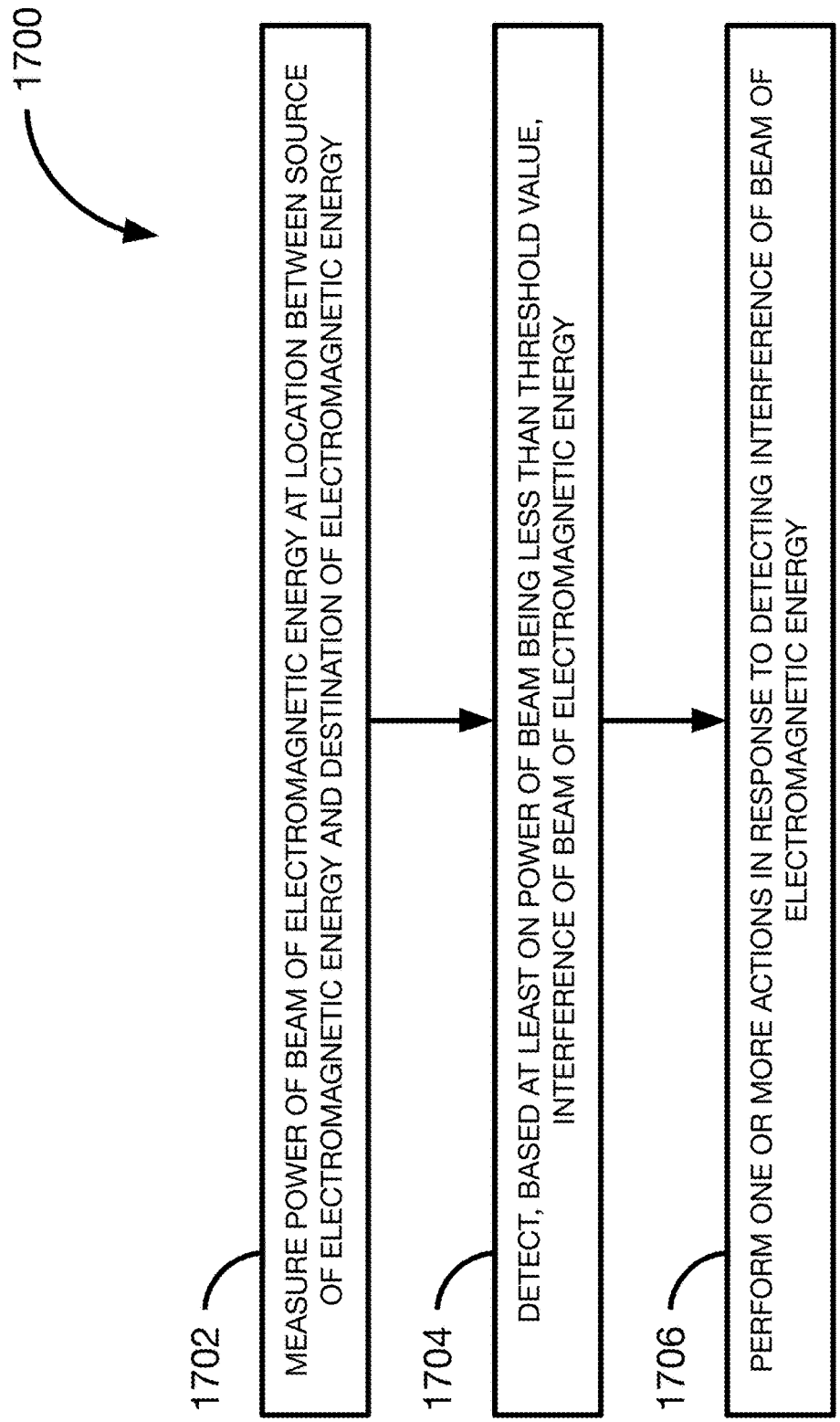
FIG. 17 is a flowchart illustrating a process for detecting an interference of electromagnetic energy in a computer numerically controlled machine, consistent with implementations of the current subject matter.

FIG. 17 is a process flow chart illustrating a process 1700 for detecting an interference of a beam of electromagnetic energy in a computer numerically controlled machine, consistent with implementations of the current subject matter. Referring to FIGS. 1,2, 15, 16A-F, and 17, the process 1700 may be performed by the computer numerically controlled machine 100 to at least detect the interference of the beam 1510.

At 1702, a beam detector at a computer numerically controlled machine may measure a power of a beam of electromagnetic energy at a location between a source of the electromagnetic energy to a destination of the electromagnetic energy. For example, the computer numerically controlled machine 100 may include the beam detector 1550 configured to measure the power of the beam 1510 at a location between the source 1520 and destination 1530 of the beam 1510 including, for example, at the head 160 of the computer numerically controlled machine 100 (and/or another location along the path 1540 of the beam 1510). In some implementations of the current subject matter, the beam detector 1550 may measure the power of the beam 1510 by sampling a portion of the beam 1510. For instance, the beam detector 1550 may measure the power of the beam 1510 by measuring a power of the divergent rays from the beam 1510. The beam detector 1550 may also measure the power of the beam 1510 by measuring a power of the backscatter electromagnetic energy generated by the beam 1510 interacting with the second optical element 1535b and/or the material 140. Alternatively and/or additionally, the beam detector 1550 may measure the power of the beam 1510 by measuring a power of a portion of the beam 1510 diverted to the beam detector 1550 by the bypass 1610, the optical obstruction 1620, and/or the third optical element 1630.

At 1704, the beam detector at the computer numerically controlled machine may detect, based at least on the power of the beam being less than a threshold value, an interference of the beam. For example, the beam detector 1550 may detect an interference of the beam 1510 based at least on the power of the beam 1510 being less than a threshold value. Alternatively and/or additionally, the beam detector 1550 may detect an interference of the beam 1510 if a difference between the power of the beam 1510 and an expected power of the beam 1510 exceeds a threshold value. In some implementations of the current subject matter, the expected power of the beam 1510 may be determined based on the power of the beam 1510 at the source 1520 as well as the attenuation of the power of the beam 1510 as the beam 1510 propagates from the source 1520 to the destination 1530 (and/or a different location along the path 1540).

At 1706, a controller at the computer numerically controlled machine may respond to the beam detector detecting the interference of the beam by performing one or more actions. In some implementations of the current subject matter, the controller at the computer numerically controlled machine 100 may perform one or more actions in response to the beam detector 1550 detecting an interference of the beam 1510. The one or more actions may include disabling the source 1520 to prevent the source 1520 from generating and/or emitting electromagnetic energy. Alternatively and/or additionally, the controller at the computer numerically controlled machine 100 may respond to the beam detector 1550 detecting an interference of the beam 1510 by engaging the interlock system and locking the lid 130 of the computer numerically controlled machine 100. Locking the lid 130 may prevent a user from accessing the interior space of the computer numerically controlled machine 100 when errant electromagnetic energy may be present within the computer numerically controlled machine 100.

The controller at the computer numerically controlled machine 100 may also generate an alarm (e.g., an audio alarm, a visual alarm, a haptic alarm, and/or the like) when the beam detector 1550 detects an interference of the beam 1510. Alternatively and/or additionally, the controller at the computer numerically controlled machine 100 and/or a cloud-based server communicatively coupled with the computer numerically controlled machine 100 may respond to the interference of the beam 1510 by at least sending, to the user, a notification message (e.g., by email, short message service (SMS) message, and/or the like). Furthermore, in response to the beam detector detecting an interference of the beam 1510, the controller at the computer numerically controlled machine 100 may generate and send, to the cloud-based server, a report including data collected by one or more sensors (e.g., cameras, microphones, gyroscopes, accelerometers, and/or the like) onboard the computer numerically controlled machine 100 over a time period during which the interference of the beam 1510 occurred at the computer numerically controlled machine 100.

Figure 18:
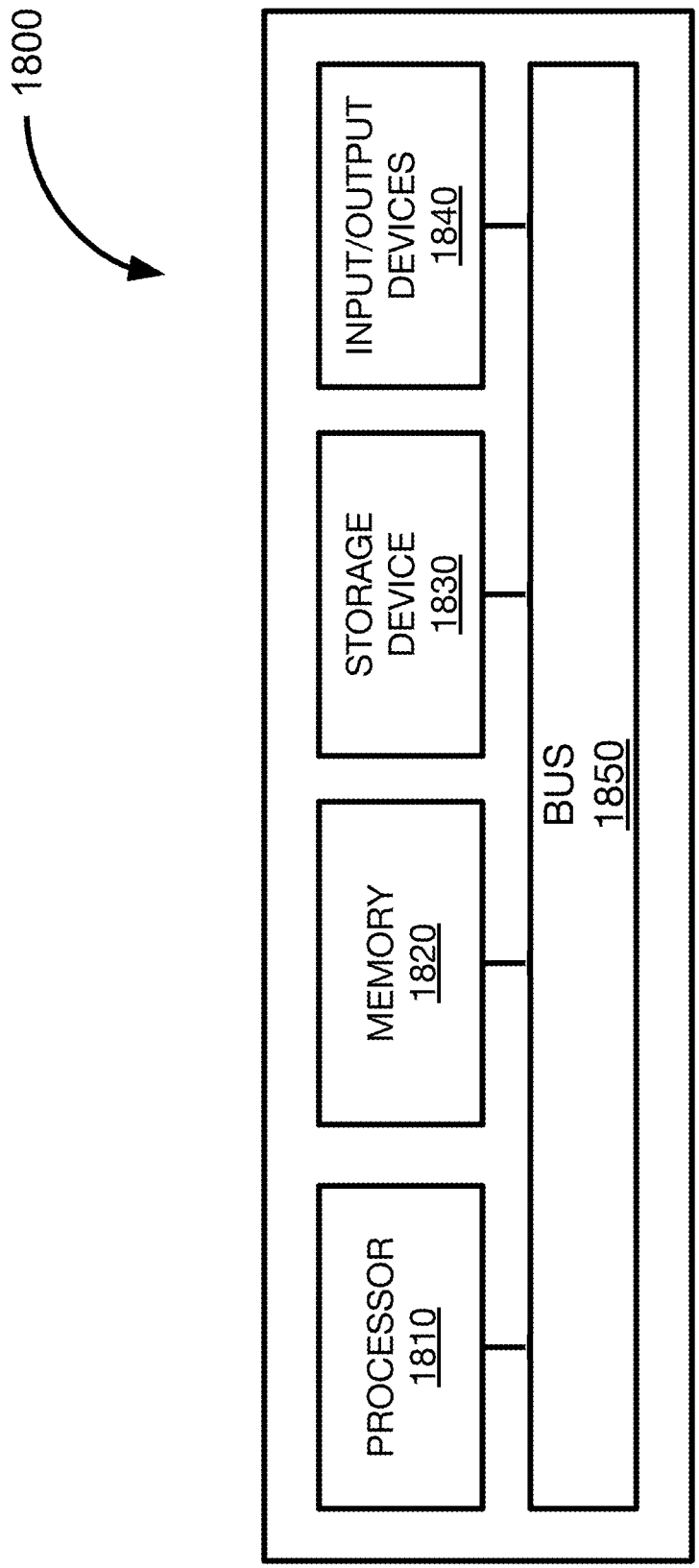
FIG. 18 depicts a block diagram illustrating a computing system, consistent with implementations of the current subject matter.

FIG. 18 depicts a block diagram illustrating a computing system 1800, consistent with implementations of the current subject matter. Referring to FIGS. 1,2, 15, 16A-F, 17, and 18, the computing system 1800 may implement the controller at the computer numerically machine 100 and/or any components therein.

As shown in FIG. 18, the computing system 1800 can include a processor 1810, a memory 1820, a storage device 1830, and an input/output device 1840. The processor 1810, the memory 1820, the storage device 1830, and the input/output device 1840 can be interconnected via a system bus 1850. The processor 1810 is capable of processing instructions for execution within the computing system 1800. Such executed instructions can implement one or more components of, for example, the pipeline engine 110. In some implementations of the current subject matter, the processor 1810 can be a single-threaded processor. Alternately, the processor 1810 can be a multi-threaded processor. The processor 1810 is capable of processing instructions stored in the memory 1820 and/or on the storage device 1830 to control at least some of the operations of the computer numerically controlled machine 100.

The memory 1820 is a computer readable medium such as volatile or non-volatile that stores information within the computing system 1800. The memory 1820 can store data structures representing configuration object databases, for example. The storage device 1830 is capable of providing persistent storage for the computing system 1800. The storage device 1830 can be a solid state drive, a floppy disk device, a hard disk device, an optical disk device, or a tape device, or other suitable persistent storage means. The input/output device 1840 provides input/output operations for the computing system 1800. In some implementations of the current subject matter, the input/output device 1840 can provide input/output operations for a network device. For example, the input/output device 1840 can include Ethernet ports or other networking ports to communicate with one or more wired and/or wireless networks (e.g., a local area network (LAN), a wide area network (WAN), the Internet).

Computer-numerically-controlled machines can direct energy at a material for the purpose of effecting a change in the material. In particular, laser cutters/engravers direct electromagnetic energy (a laser beam) to a material in order to cut or engrave it. The laser energy can be absorbed by the material which discolors, ablates, burns, melts, vaporizes, etc., to form holes, cuts, engravings, and the like. The laser energy can also cause the material to harden, cause a phase transition, or otherwise modify the physical characteristics of the material. The laser beam can be focused so that a maximum power density is achieved at the material.

Under normal circumstances, the laser will encounter either the material or the material on which the laser is resting. This can be a metal grating, allowing the bulk of the laser energy to pass through, with some additional structure that can resist the laser underneath the grating, for example, a metal plate. A grating can be used because if the material being affected rested on solid metal, the reflection of the beam could strike the back side of the material and cause unwanted effects. By the time the beam reaches the bottom of the grating, having passed its focal point, the beam will have already widened so the power density will have decreased.

However, there are circumstances that could cause the laser radiation to be diverted away from the material and what is underneath it. One cause can be a material that reflects laser radiation, for example copper for a carbon dioxide laser. Another cause could be that some form of damage to the laser cutter/engraver that causes the beam to move in an unexpected direction, for example a mirror that was intended to redirect the beam safely getting bumped out of alignment.

A person outside of the CNC machine could be injured if that person encountered laser radiation. For that reason, a number of government agencies regulate lasers to ensure that laser radiation is contained, for example, in the United States, the Center for Devices and Radiological Health, which is a branch of the Food and Drug Association. To aid in the containment of laser radiation, structures and materials can be incorporated into the housing of the CNC machine to further reduce the risk of unwanted laser reflections or burn-through.

Figure 19:
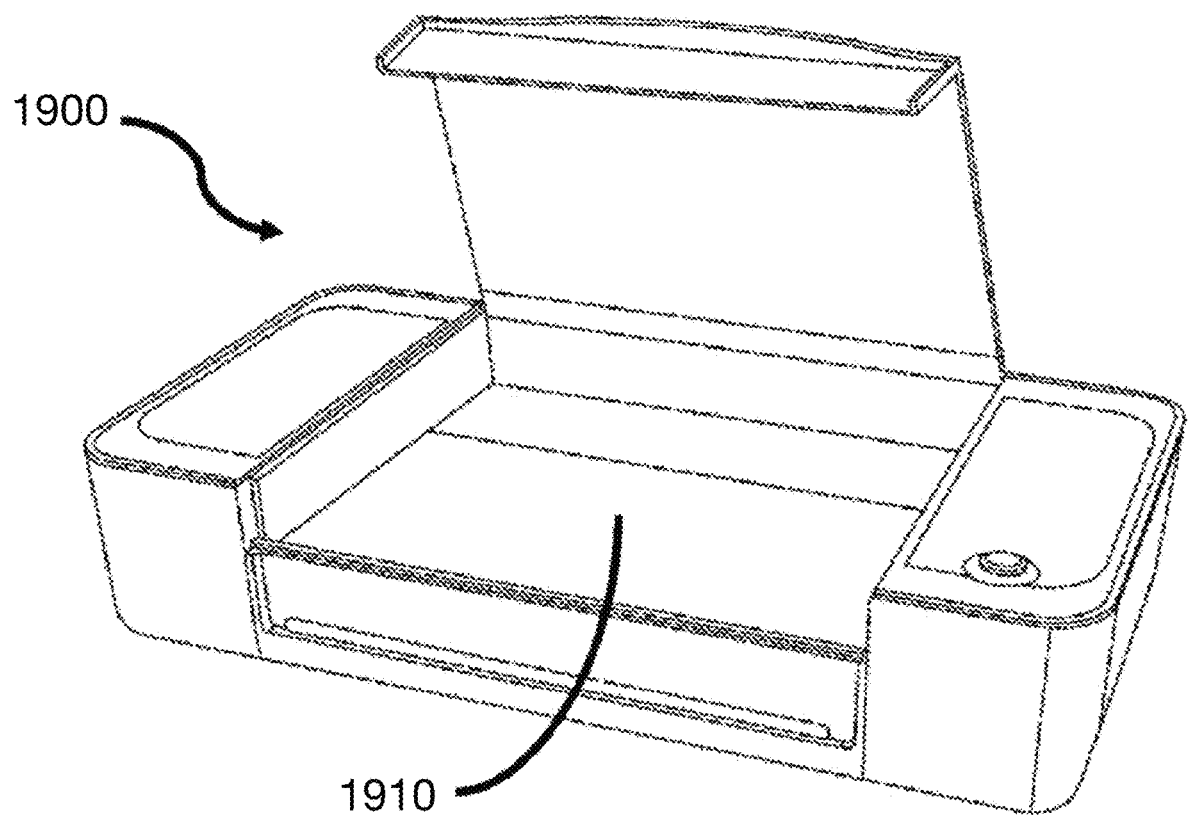
FIG. 19 is a perspective view of a housing of a CNC machine, consistent with some implementations of the current subject matter.
Figure 20:
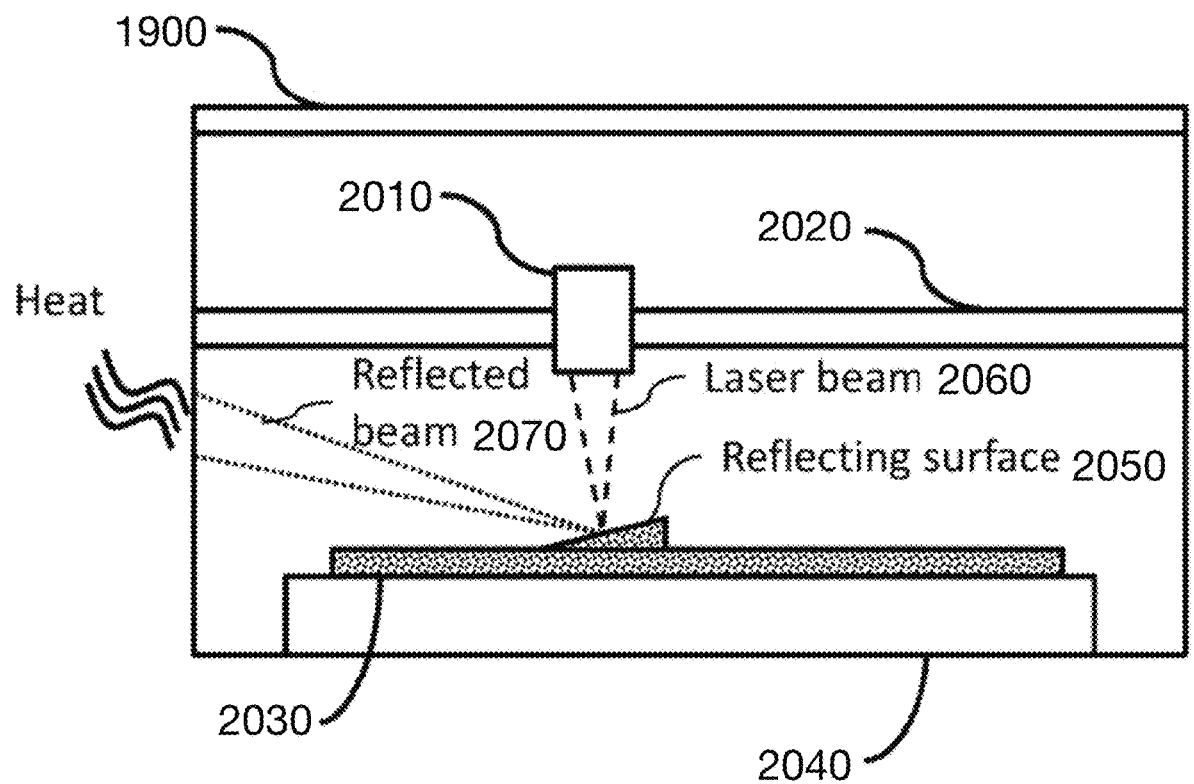
FIG. 20 is a diagram illustrating the absorption of laser radiation by the housing, consistent with some implementations of the current subject matter.
Figure 21:
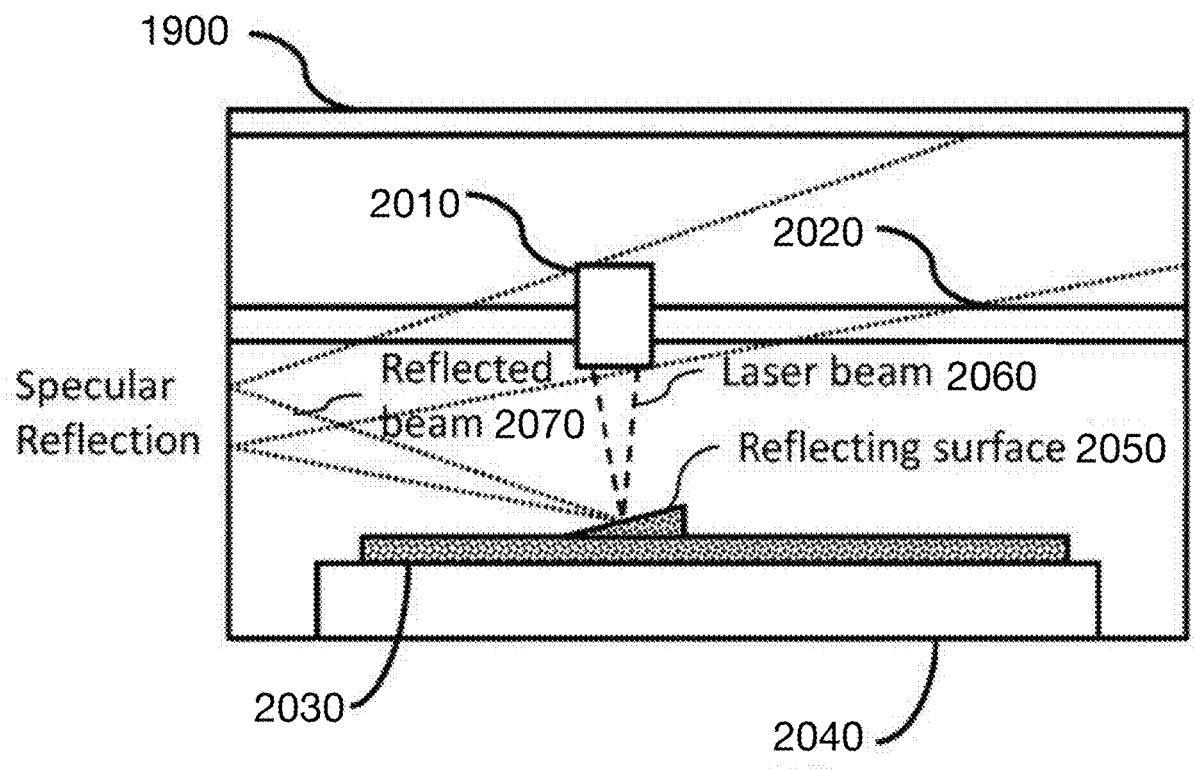
FIG. 21 is a diagram illustrating the specular reflection of laser radiation by the housing, consistent with some implementations of the current subject matter.
Figure 22:
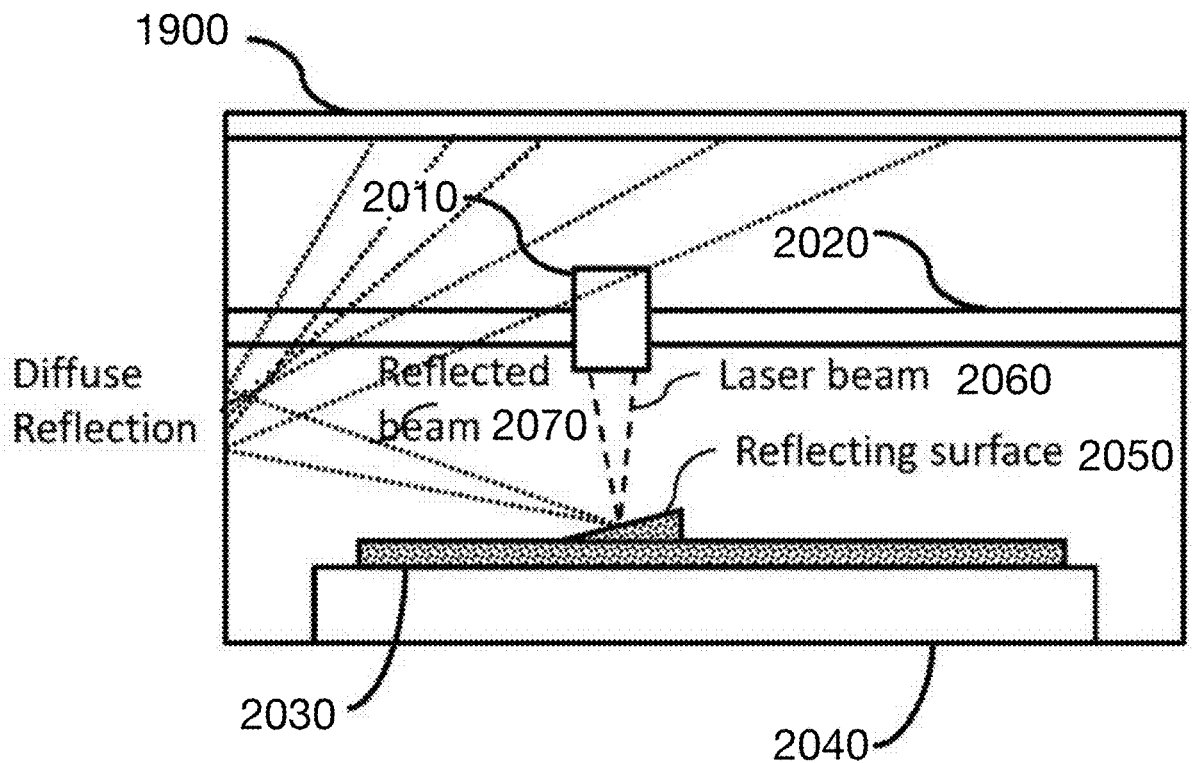
FIG. 22 is a diagram illustrating the diffuse reflection of laser radiation by the housing, consistent with some implementations of the current subject matter.
Figure 22:
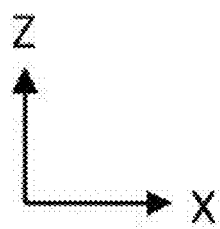

FIG. 19 is a perspective view of a housing 1900 of a CNC machine. FIG. 20 is a diagram illustrating the absorption of laser radiation by a housing. FIG. 21 is a diagram illustrating the specular reflection of laser radiation by the housing. FIG. 22 is a diagram illustrating the diffuse reflection of laser radiation by the housing. The dashed lines indicating focusing of the laser beam are shown in an exaggerated manner for illustrative purposes. Lasers are often used with housings, which can serve several purposes. First, housings can provide an aesthetic appearance to the device that is desirable. Second, housings can provide structural rigidity and support for interior components of the CNC machine. Third, housings can contain the laser radiation.

CNC Machine Housing

The CNC machine can include a housing with an interior space 1910 where the laser beam 2060 can operate on the material 2030. Though shown as open in FIG. 19, to illustrate the interior space, the housing can also be configured to restrict the laser beam to the interior space. For example, the housing can include closable apertures, laser-opaque windows, and the like such that typically no harmful laser light can escape. As shown in FIGS. 20-22, the housing can, for example, surround the laser, the material, and other components such as the laser head, gantry, turning optics, the support 2040, and the like. In the event that a reflecting surface 2050 is present that would cause an undesirable amount of laser light to be reflected from the material, the housing contains the reflecting laser light 2070. The reflective surface can be, for example, an imperfection on the material, a result of a prior cut or engraving, a natural contour or feature of the material, a foreign object or debris, etc.

Laser radiation can be contained through several basic strategies, some of which are described herein. First, as shown in FIG. 20, laser radiation can be absorbed. In order to absorb the energy, the material must be absorptive at the wavelength of the radiation, and must not vaporize, melt, or otherwise change in such a way as to stop absorbing the material. Second, as shown in FIG. 20, it can be reflected. In some cases, reflection can redirect the energy towards another area capable of absorbing the radiation. Because laser cutter/engravers sometimes pass the beam through a focusing lens, reflecting the beam (after the beam's focal point) may give it more room to spread out and thus reduce the power density, making it easier to absorb without damage. Third, as shown in FIG. 22, the beam can be diffusely reflected. This may not only redirect the energy, but also can reduce the beam power density by spreading the beam out even more quickly.

In some implementations, the structural material of the housing can serve all three purposes, structural, aesthetic, and radiation blocking, for example by fabricating the housing entirely from heavy sheet metal. However, in other implementations, the housing can advantageously be constructed of a structural material that is light, attractive, and/or inexpensive (but possibly not fully resistant to electromagnetic radiation from the laser), but which incorporates a protective material in the design that renders the housing safe against laser radiation. The protective material can be more resistant to the electromagnetic energy than the housing and thus render the housing safe against laser radiation.

One advantage of the composite construction is a smaller amount of laser-safe protective material can be used, with the remainder of the cheaper or lighter structural material used to provide structure or support for the rest of the CNC machine. The protective material can be applied to the housing at any place which could, in theory, receive laser light, for example reflections from the material being worked or from secondary reflections from other locations.

Internal Protective Material

Figure 23:
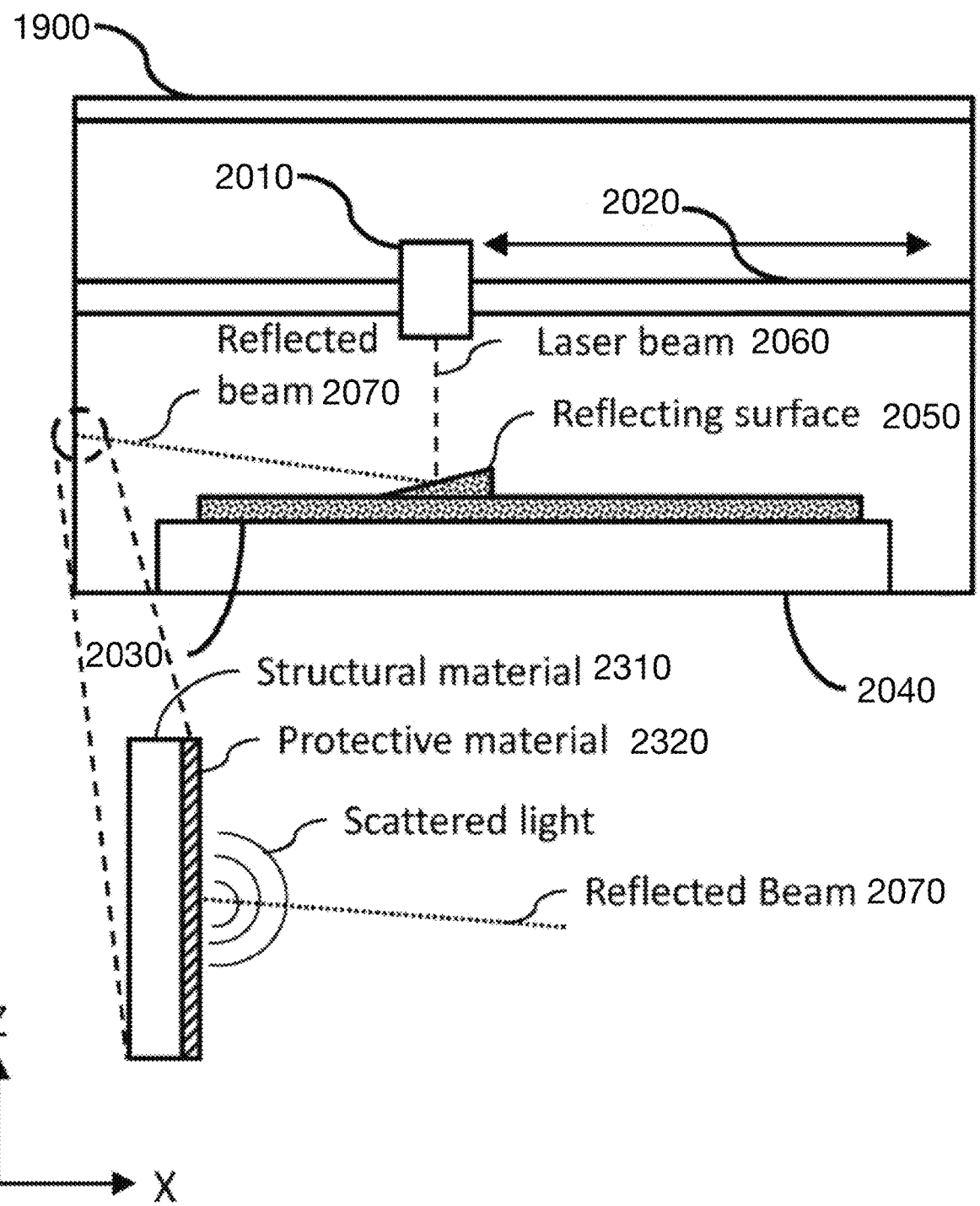
FIG. 23 is a diagram illustrating an expanded sectional view of the housing with an interior protective material, consistent with some implementations of the current subject matter.

FIG. 23 is a diagram illustrating an expanded sectional view of a housing with an interior protective material. The housing can, for example, be a single layer or composition of plastic or plastic doped with glass fiber. In some implementations, the housing can be of a composite construction. Here, the housing can be a composite of a structural material 2310 and a protective material 2320. The structural material can, for example, provide the primary mechanical support to the components of the CNC machine. Meanwhile, the protective material can be more resistant to electromagnetic energy (e.g., laser energy) than the structural material. As such, the protective material can be incorporated with the housing to dissipate, absorb, and/or scatter the electromagnetic energy (e.g., laser energy), thereby preventing the electromagnetic energy from escaping the housing. The dissipating, scattering, and/or absorbing has the effect of reducing a permeability of the housing to electromagnetic energy relative to the structural material alone (e.g., without the protective material).

In some implementations, the housing, which can include for example a top, sides, bottom, internal walls, or other structural components, can be constructed substantially of a material different than that of the protective material. In some implementations, the housing can be substantially constructed of polymers, commonly referred to in the art as plastics. As used herein, the term "substantially" in the context of the construction of the housing means that the case is for the most part, but not necessarily entirely, plastic. For example, one implementation of a housing can have a plastic shell with glass windows added to the sides, ports with metal mesh to protect fans, electrical feedthroughs, or the like. While implementations and designs of the housing can vary, the housing can generally refer to any combination of structural components or structures to which are added other components of the CNC machine (e.g., the laser, air filters, a material bed, etc.). In other implementations, "substantially" can refer to a housing being greater than 50% plastic in terms of interior surface area, exterior surface area, total surface area, mass density, cross sectional dimension, or the like. Because the top surface and lid of the case have different material requirements, such as a desire to be able to see through the lid, they are typically made of a different material than the rest of the case (e.g., glass) and so, while it may also be fabricated using the techniques shown here, are not included in the consideration of whether the case is substantially plastic.

While some implementations contemplate a housing constructed substantially of plastic incorporating a protective material, in other implementations specific or smaller portions of the housing can incorporate the protective material, or a different type of protective material. For example, in a location where the housing is especially thin, additional protective material can be applied to obtain the desired level of resistance to laser energy. Also, in implementations where the housing does not need protective material everywhere, then protective material can be added to the portions of the housing that can benefit from it. These portions can be, for example, plastic, wood, or the like. In such implementations, the housing is not substantially made of plastic. Also, in implementations where the need for protective material depends on the use or application of the CNC machine, the protective material may be added or removed to meet situational safety requirements. For example, a CNC machine capable of processing large or over-sized materials via the use of a material pass-through slot may employ the use of a detachable and/or semi-detachable protective material to increase the safety of use of the CNC machine when the material pass-through slot is not in use.

External Protective Material

Figure 24:
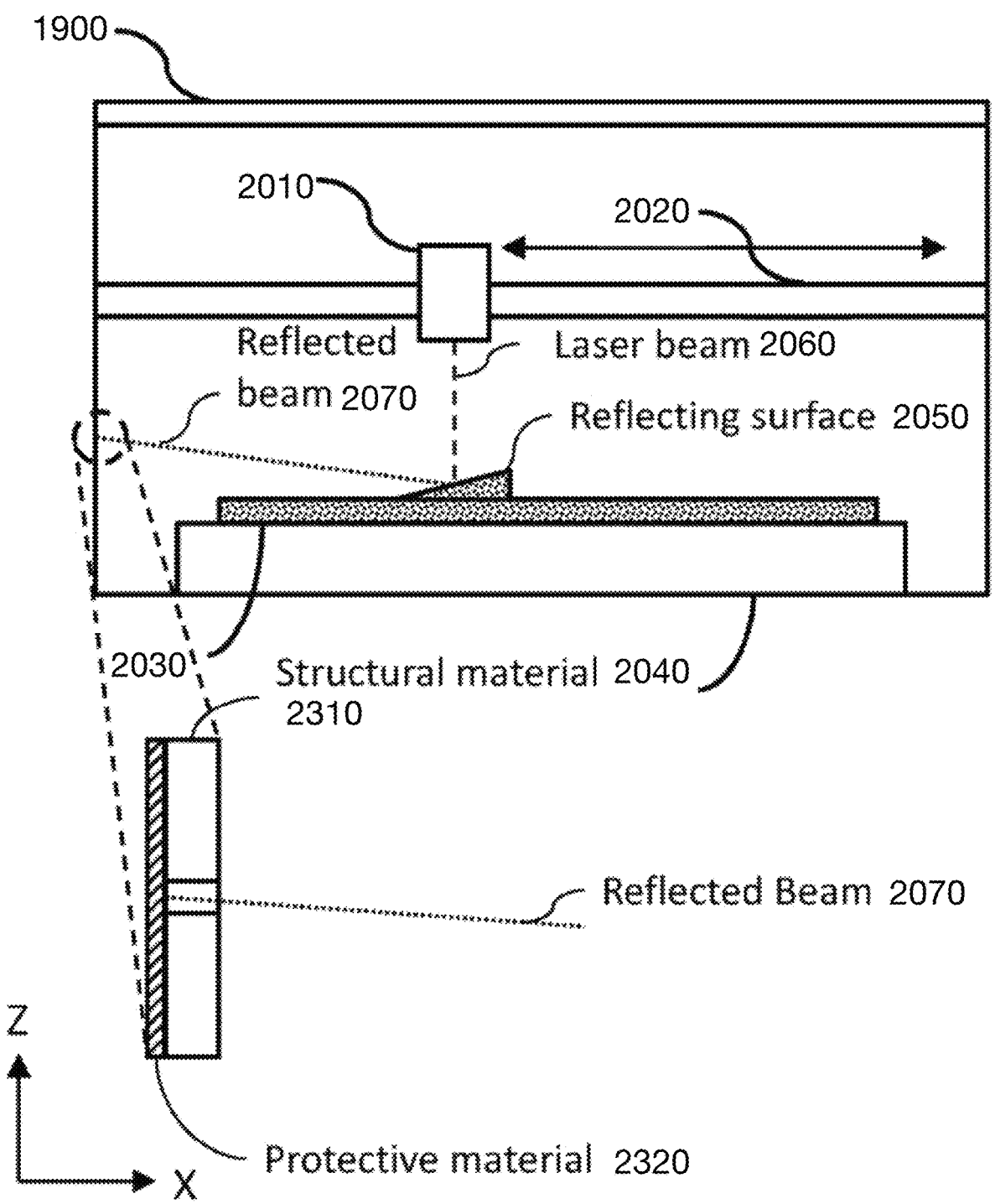
FIG. 24 is a diagram illustrating an expanded sectional view of the housing with an exterior protective material, consistent with some implementations of the current subject matter.

FIG. 24 is a diagram illustrating an expanded sectional view of the housing with an exterior protective material. In some situations, it may not be feasible to place the protective material on the inside of the housing. In some implementations, such as that shown in FIG. 24, the protective material can be on an external surface of the housing. As shown by the expanded view, a reflected laser beam can burn through the structural material but be stopped when reaching the protective material. Any implementations of the protective material described herein can be added to the exterior of the housing in such a manner. As with the internal protective material, an external protective material can have the effect of dissipating, scattering, and/or absorbing electromagnetic energy to thereby reduce a permeability of the plastic housing to electromagnetic energy relative to the structural material alone (e.g., without the protective material).

Figure 25:
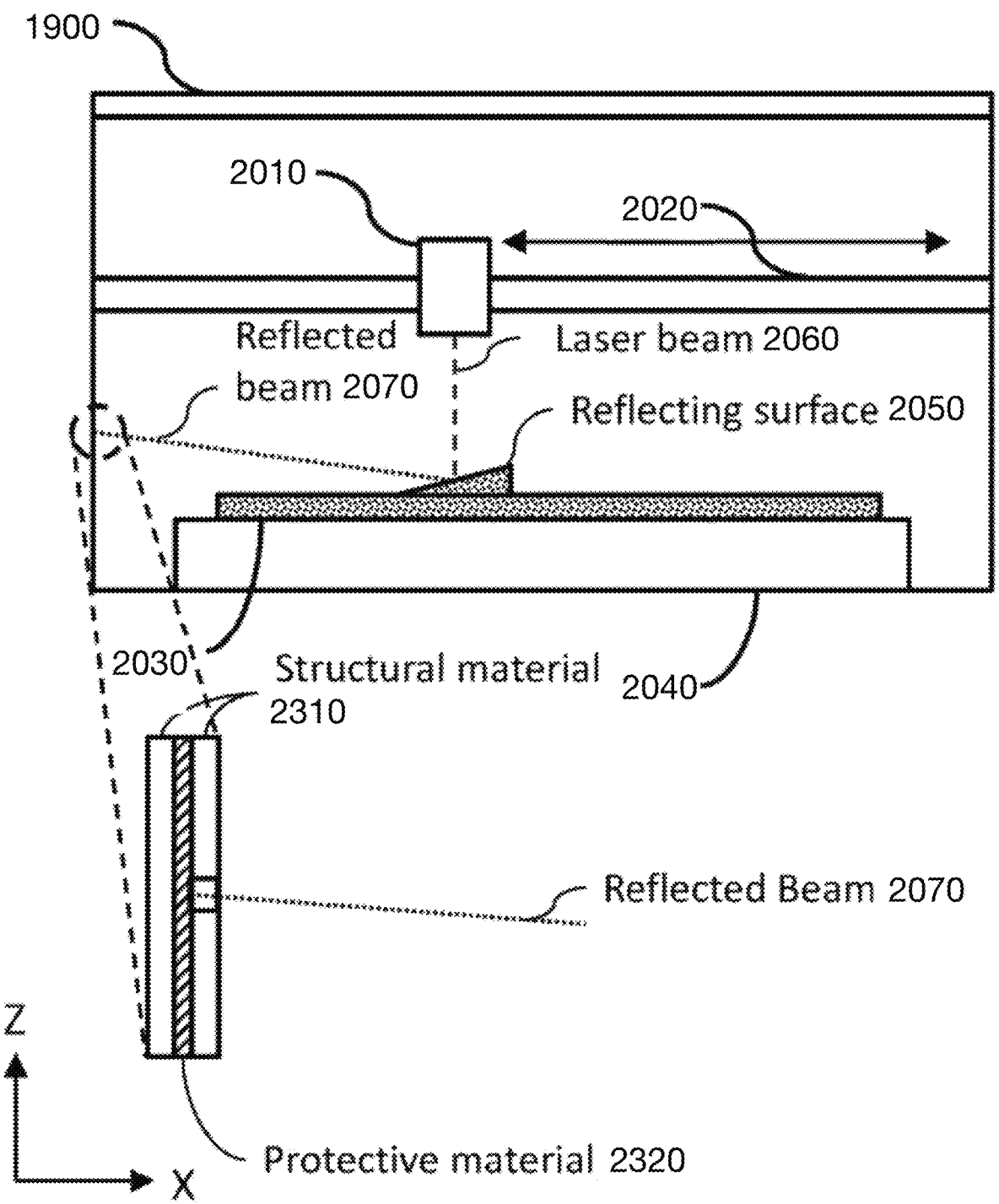
FIG. 25 is a diagram illustrating an expanded sectional view of the housing with protective material between an external structural material and an internal structural material, consistent with some implementations of the current subject matter.

FIG. 25 is a diagram illustrating an expanded sectional view of the housing with protective material between an external structural material and an internal structural material. The protective material, in some implementations, can be bracketed on either side by structural material. This can be done to conceal the protective material or to provide yet another layer to aid in confinement of the laser energy. The protective material can be co-molded with the structural material. That is, one side, either the interior or the exterior of the structural material can be molded. Then, the protective material can be molded to the existing structural material. Finally, another molding of structural material can be applied opposite the existing structural material such that the protective material is between the two structural materials. The structural materials can be the same type of structural material or they can be different types. Any combination of structural materials can be used, for example, plastic, wood, metal, etc. There can also be any number of layers of protective and/or structural materials. As shown in FIG. 25, a reflected beam 2070 can strike the structural material and, for example, burn through one layer of structural material 2310 before being stopped by the protective material.

Figure 26:
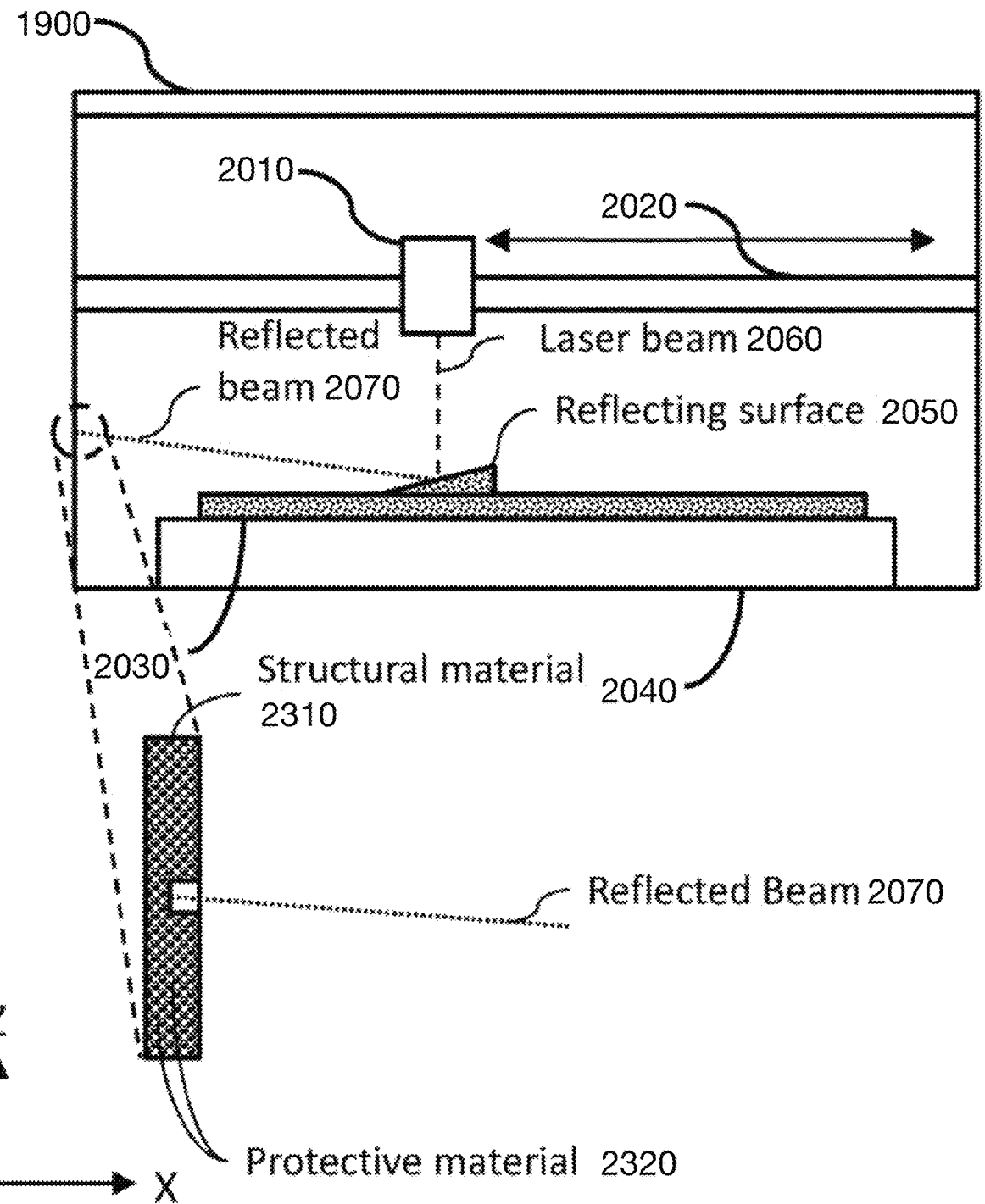
FIG. 26 is a diagram illustrating an expanded sectional view of the housing with protective material within a structural material, consistent with some implementations of the current subject matter.

FIG. 26 is a diagram illustrating an expanded sectional view of the housing with protective material within a structural material. In some implementations, the protective material can be dispersed throughout at least some of the structural material. The protective material can be an additive to the structural material that can, for example, be introduced during the molding of the structural material. The protective material, present within the structural material, can prevent the laser energy from completely penetrating the structural material. Some examples of protective material that can be placed within the structural material can include, for example, metal or ceramic fibers, spheres, particles, mesh, gratings, etc. The relative number density of the structural material and the protective material can vary. For example, the wall of the housing at a given location can be 90% structural material and 10% protective material. In other implementations, there can be up to 20%, 30%, 50%, 75%, or 95% protective material suspended in the structural material.

Metallic Protective Material

In some implementations, the structural material of the housing can be made of plastic while the protective material can be of generally metallic composition. For example, the protective material can be a metal or foil layer applied to a surface of the structural material. The metallic protective material can be significantly thinner than the structural material. Metallic protective materials can include, for example, adhesive-backed foil, metal plating, or sheet metal secured to the structural material.

In some implementations, the protective material can be adhesive-backed foil. The adhesive-backed foil can be a thin metal layer, such as copper, tin, aluminum, or steel, with an adhesive backing. The adhesive-backed foil can be cut or otherwise shaped to cover regions of the structural material that could possibly be penetrated by the reflected laser light. Adhesive-backed foil is generally inexpensive and can have a metallic layer that is sufficient to absorb and/or scatter the reflected laser light that strikes it. Adhesive backed foil can be cut or shaped to cover any desired surface or be replaced if damaged or worn. The thickness of the adhesive-backed foil can vary depending on the amount of laser energy to be dissipated, scattered, absorbed, etc. The adhesive-backed foil can have a metal layer of approximately, for example, 0.5, 1.0, 1.2, 1.5, 2.0, or 2.5 thousandths of an inch in thickness. The thickness of the protective material whether a foil, plating, or additive can be any of these values and can vary from location to location. Also, other thicknesses can be implemented that are sufficient to absorb or reflect the laser energy without significant damage to the protective surface. In other implementations, the heat conduction or reflection of the absorbed or reflected laser light can be sufficient to maintain the temperature of the protective material below a melting point of the protective material.

In other implementations, a plate of stamped metal can be manufactured and affixed in a permanent, semi-permanent, and/or detachable manner to the housing with fasteners, for example, screws, bolts, adhesive, etc. Also, a coating of chrome and/or other metal can be plated or deposited. The deposition coating can be by spraying, painting, or immersion. In some implementations, the deposition coating can contain a substrate with metallic particulates suspended within the substrate.

Protective material can be introduced as an additive to the structural material during an injection-molding process used to manufacture the housing. For example, aluminum, zinc, steel, tungsten, nickel, and lead. In some implementations, the protective material can be constructed as a grid, mesh, screen, honeycomb, or the like and incorporated either within the structural material (optionally with the structural material acting as a fill) or placed on an exposed surface of the structural material (whether on an internal or external surface). Another implementation can be to include the protective material as an "in-mold decoration." Here, the protective material can be applied to a carrier material in the mold. When the structural material is introduced to the mold, the protective material can adhere to the structural material and remain with the structural material when the housing is removed from the mold. In this way, the structural material can be chemically bonded to the structural material without the need for fasteners.

Non-Metallic Protective Material

The protective (or structural) materials can also be of a non-metallic composition. For example, the protective material can be sheets of glass, ceramic, heat-resistant plastic, silicone, vinyl, wood, and/or the like. Other examples of non-metallic protective materials can include metalloids such as carbon, boron, silicon, calcium carbonate, talc, and barium.

The exposed interior surface (whether of structural material as shown in FIG. 24 or protective material as in FIG. 23) can be generally reflective or glossy to allow laser energy to reflect at a lower power density (as shown in FIG. 21). In other implementations, the exposed interior surface can be matte to allow more of the laser energy to be absorbed (as shown in FIG. 20).

According to various implementations of the current subject matter, a CNC machine can include a light source and a housing. The light source can be configured to deliver electromagnetic energy at a location of a plurality of locations on a material at least partially disposed within the CNC machine. The housing can include at least one side part surrounding an interior space the housing and the at least one location on the material. The housing can include a structural material defining at least a portion of the interior space. The housing can further include a protective material protecting the side part. The protective material can reduce a permeability of the side part to the electromagnetic radiation relative to the structural material alone.

The housing can further include a bottom part of the CNC machine. The protective material can further reduce a permeability of the bottom part to the electromagnetic radiation relative to the structural material alone.

The protective material can include at least one of adhesive-backed metallic foil, metallic plating, a ceramic particle layer, a metallic particle layer, and/or a plastic layer that is more resistant to electromagnetic radiation than the structural material. The protective material can be disposed on an inner surface of the structural material. The protective material can be disposed on an outer surface of the structural material. The protective material can be disposed within the structural material. The protective material can be disposed between an external structural material and an internal structural material.

The protective material can include a metallic layer. The protective material can include a ceramic layer. The structure material can include plastic. The protective material can be detachable and/or semi-detachable. The protective material can be more resistant to the electromagnetic energy than the structural material.

The light source can include a laser. The laser can be capable of one or more of discoloring, ablating, and vaporize the material. The CNC machine can be capable of hardening, creating a phase transition, and/or modifying the physical characteristics of the material.

The light source can include a carbon dioxide laser. The electromagnetic energy can include infrared radiation.

The at least one side part can enclose at least half of the interior space of the housing.

According to various implementations of the current subject matter, a method for manufacturing a computer-numerically-controlled machine can include defining at least a portion of a side part with a structural material. The side part can be protected with a protective material. The protective material can reduce a permeability of the side part to electromagnetic radiation relative to the structural material alone. The housing can be formed to include the side part, which includes the structural material and the protective material. A light source can be configured to deliver the electromagnetic radiation to a material that is at least partially disposed within the housing.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

The invention claimed is:

1. A computer-numerically-controlled (CNC) machine comprising:
   an electromagnetic energy source configured to emit electromagnetic energy;
   a housing surrounding an enclosure;
   a moveable head configured to steer the electromagnetic energy to a working area within the enclosure;
   a beam detector disposed within the moveable head;
   at least one processor;
   at least one non-transitory computer-readable medium; and
   program instructions stored on the at least one non-transitory computer-readable medium that are executable by the at least one processor such that the CNC machine is configured to:
      emit, via the electromagnetic energy source, a beam of electromagnetic energy for delivery to the working area within the enclosure;
      measure, via the beam detector, a power of a portion of the electromagnetic energy within the moveable head;
      determine that the measured power of the portion of the electromagnetic energy is less than a minimum power; and
      based on the determination, perform one or more actions.

2. The CNC machine of claim 1, wherein the portion of the electromagnetic energy is reflected, from the beam of electromagnetic energy, to the beam detector via at least one object that is located between the electromagnetic energy source and the moveable head, and wherein the beam detector is oriented toward the at least one object to receive the portion of the electromagnetic energy.

3. The CNC machine of claim 1, wherein the portion of the electromagnetic energy is reflected, from the beam of electromagnetic energy, to the beam detector via at least one object that is located at an exit location of the moveable head, and wherein the beam detector is oriented toward the at least one object to receive the portion of the electromagnetic energy.

4. The CNC machine of claim 1, wherein the portion of the electromagnetic energy comprises backscatter electromagnetic energy.

5. The CNC machine of claim 1, wherein the beam detector is at least one of a first beam detector disposed within the moveable head at a first orientation or a second beam detector disposed within the moveable head at a second orientation different from the first orientation.

6. The CNC machine of claim 1, wherein the one or more actions comprise one or more of (i) generating an alert, (ii) powering off the electromagnetic energy source, or (iii) engaging an interlock system of the CNC machine.

7. The CNC machine of claim 1, wherein the program instructions that are executable by the at least one processor such that the CNC machine is configured to determine that the measured power of the reflected portion of the electromagnetic energy is less than the minimum power comprise program instructions that are executable by the at least one processor such that the CNC machine is configured to:
   determine that a difference between the power of the portion of the electromagnetic energy and an expected power of the portion of the electromagnetic energy is less than a threshold value.

8. A non-transitory computer-readable medium, wherein the non-transitory computer-readable medium is provisioned with program instructions that, when executed by at least one processor, cause a computer-numerically-controlled (CNC) machine to:
   emit, via an electromagnetic energy source, a beam of electromagnetic energy for delivery to a working area within an enclosure surrounded by a housing of the CNC machine;
   measure, via a beam detector disposed within a moveable head of the CNC machine, a power of a portion of the electromagnetic energy within the moveable head;
   determine that the measured power of the portion of the electromagnetic energy is less than a minimum power; and
   based on the determination, perform one or more actions.

9. The non-transitory computer-readable medium of claim 8, wherein the portion of the electromagnetic energy is reflected, from the beam of electromagnetic energy, to the beam detector via at least one object that is located between the electromagnetic energy source and the moveable head, and wherein the beam detector is oriented toward the at least one object to receive the portion of the electromagnetic energy.

10. The non-transitory computer-readable medium of claim 8, wherein the portion of the electromagnetic energy is reflected, from the beam of electromagnetic energy, to the beam detector via at least one object that is located at an exit location of the moveable head, and wherein the beam detector is oriented toward the at least one object to receive the portion of the electromagnetic energy.

11. The non-transitory computer-readable medium of claim 8, wherein the portion of the electromagnetic energy comprises backscatter electromagnetic energy.

12. The non-transitory computer-readable medium of claim 8, wherein the beam detector is at least one of a first beam detector disposed within the moveable head at a first orientation or a second beam detector disposed within the moveable head at a second orientation different from the first orientation.

13. The non-transitory computer-readable medium of claim 8, wherein the one or more actions comprise one or more of (i) generating an alert, (ii) powering off the electromagnetic energy source, or (iii) engaging an interlock system of the CNC machine.

14. The non-transitory computer-readable medium of claim 8, wherein the program instructions that, when executed by at least one processor, cause the CNC machine to determine that the measured power of the portion of the electromagnetic energy is less than the minimum power comprise program instructions that, when executed by at least one processor, cause the CNC machine to:
   determine that a difference between the power of the portion of the electromagnetic energy and an expected power of the portion of the electromagnetic energy is less than a threshold value.

15. The CNC machine of claim 1, wherein the portion of the electromagnetic energy comprises divergent rays from the beam of electromagnetic energy.

16. The CNC machine of claim 1, wherein an interference of the beam of electromagnetic energy occurring at an unprotected portion of the beam of electromagnetic energy causes the power of the portion of the electromagnetic energy within the moveable head to be less than the minimum power.

17. A method carried out by a computer-numerically-controlled (CNC) machine, the method comprising:
   emitting, via an electromagnetic energy source, a beam of electromagnetic energy for delivery to a working area within an enclosure surrounded by a housing of the CNC machine;
   measuring, via a beam detector disposed within a moveable head of the CNC machine, a power of a portion of the electromagnetic energy within the moveable head;
   determining that the measured power of the portion of the electromagnetic energy is less than a minimum power ; and
   based on the determination, performing one or more actions.

18. The method of claim 17, wherein the portion of the electromagnetic energy comprises backscatter electromagnetic energy.

19. The method of claim 17, wherein the beam detector is at least one of a first beam detector disposed within the moveable head at a first orientation or a second beam detector disposed within the moveable head at a second orientation different from the first orientation.

20. The method of claim 17, wherein determining that the measured power of the portion of the electromagnetic energy is less than the minimum power comprises:
   determining that a difference between the power of the portion of the electromagnetic energy and an expected power of the portion of the electromagnetic energy is less than a threshold value.

* * * * *